US008497910B2

(12) United States Patent  (10) Patent No.: US 8,497,910 B2
Tanaka et al.  (45) Date of Patent: Jul. 30, 2013

(54) DIGITAL CAMERA HAVING COMMUNICATION FUNCTION

(75) Inventors: Masahide Tanaka, Osaka (JP); Tohru Matsui, Nara (JP)

(73) Assignee: NL Giken Incorporated, Osaka (JP)

( * ) Notice: Subject to any disclaimer, the term of this patent is extended or adjusted under 35 U.S.C. 154(b) by 1074 days.

(21) Appl. No.: 11/754,291

(22) Filed: May 27, 2007

(65) Prior Publication Data

US 2007/0291303 A1    Dec. 20, 2007

(30) Foreign Application Priority Data

Jun. 18, 2006 (JP) ................................ 2006-168207

(51) Int. Cl.
  *H04N 5/225* (2006.01)
  *H04N 5/76* (2006.01)
(52) U.S. Cl.
  USPC .............. 348/207.1; 348/231.9; 348/333.05
(58) Field of Classification Search
  USPC .................. 348/207.1, 211.2, 231.1, 333.12, 348/333.05, 333.1, 333.2, 333.5, 231.2–231.9
  See application file for complete search history.

(56) References Cited

U.S. PATENT DOCUMENTS

| 6,396,537 | B1 * | 5/2002 | Squilla et al. ................. | 348/239 |
| 6,636,259 | B1 | 10/2003 | Anderson et al. | |
| 7,150,029 | B1 | 12/2006 | Ebling et al. | |
| 2002/0021359 | A1 * | 2/2002 | Okamoto ...................... | 348/222 |
| 2002/0030746 | A1 * | 3/2002 | Shibutani ...................... | 348/207 |
| 2004/0145660 | A1 * | 7/2004 | Kusaka ....................... | 348/211.2 |
| 2006/0257133 | A1 * | 11/2006 | Shikata ......................... | 396/287 |
| 2007/0127833 | A1 * | 6/2007 | Singh ............................ | 382/254 |

FOREIGN PATENT DOCUMENTS

| JP | 2001-520491 A | 10/2001 |
| JP | 2002-044506 A | 2/2002 |
| JP | 2002-199120 A | 7/2002 |
| JP | 2002-314861 A | 10/2002 |
| JP | 2003-046931 A | 2/2003 |
| JP | 2004-032535 A | 1/2004 |
| JP | 2004-158943 A | 6/2004 |
| JP | 2004-200997 A | 7/2004 |
| JP | 2004-220420 A | 8/2004 |
| JP | 2004-304488 A | 10/2004 |
| WO | WO 99/20049 A1 | 4/1999 |

OTHER PUBLICATIONS

Japanese Office Action for corresponding JP Application No. 2006-168207, Mar. 2, 2011.
Prior art search report for JP Application No. 2006-168207, Mar. 12, 2009.
Japanese Office Action for related Japanese Patent Application No. 2006-168267, mailed Jan. 24, 2012, pp. 1-10.

\* cited by examiner

*Primary Examiner* — Aung S Moe
*Assistant Examiner* — Mekonnen Dagnew

(57) ABSTRACT

In a digital camera having a wireless communicator with a server, a storage controller treats full size image data and display size image data unequally if the full size image data has been already sent to the server. For example, the display size image data is not allowed to be replaced by new digital image data unless the digital camera is not in use over a prescribed time. Own image data and other's image data are treated equally. Image data received from outside and retrieved from inside memory are treated equally. Search key for own image data and related search keys existing in the outside are indicated in a comparable manner. The digital camera receives search key from neighboring advertiser to send it for Internet search of advertisement. Search key received from neighboring notable site is sent for Internet search of photographs of the notable site taken by others.

19 Claims, 23 Drawing Sheets

DIGITAL CAMERA HAVING COMMUNICATION FUNCTION

BACKGROUND OF THE INVENTION

1. Field of the Invention

This invention relates to a digital camera, and more specifically to a digital camera capable of communication function.

2. Description of the Related Art

Various types of digital cameras capable of communication function have been proposed in this field of art. For example, it is proposed that digital image data taken by the digital camera is sent to an outside server.

One reason of sending the digital image data to the outside server is caused by a limited capacity of the digital camera to store the digital image data. In other words, the digital camera would become free from the limitation to the image storing capacity if the taken image data is sent to the server for making it possible for the digital camera to delete the sent image data for securing a room for newly taken image data. Another reason of sending the digital image data to the outside is to share the taken images among a closed group or in open public for fun.

Also in the field of mobile phones capable of photo taking function, which is considered to be a type of digital camera capable of communication function, the similar sending or sharing of digital images by means of a picture archiving and communication system on Internet becomes popular as well as the direct sending of the digital image data between the mobile phones.

U.S. Pat. No. 6,636,259 and Japanese Laid-open Patent Application No. 2002-199 each disclose digital camera capable of communication function.

In terms of the sharing of the digital image data, on the other hand, various proposals have been also made from the side of picture archiving and communication systems on Internet, which provide services for accepting uploaded digital image data from the creator thereof or allowing anyone to download digital images of others open to the public.

In this field of art, however, proposals relating to the sending of the digital image data have not been fully enjoyed as a function of digital cameras easy to use.

SUMMARY OF THE INVENTION

An object of this invention is to provide a digital camera capable of communication function easy to use.

Another object of this invention is to provide a digital camera in which the communication function is naturally incorporated into the conventional digital camera utility.

Still another object of this invention is to provide a digital camera with its usefulness broadened.

To achieve one of the above objects, this invention provides a digital camera comprising an image taking portion, a wireless communicator adapted to send digital image data derived from the image taking portion to outside of the digital camera and to receive digital image data from outside of the digital camera, a display, and an image storage portion adapted to store digital image data derived form the image taking portion and digital image data received through the wireless communicator. The digital image data stored in the image storage includes full size image data depending on the image taking portion and display image data in a size suitable for displaying on the display. And, the digital camera according to this invention further comprises a storage controller adapted to treat the full size image data and the display image data unequally in the image storage portion if the full size image data has been already sent to outside of the digital camera.

For example, the storage controller is adapted to allow the full size image data to be replaced by new digital image data in the image storage portion more easily than the display image data. In more specifically, the storage controller is adapted to allow the display image data to be replaced by new digital image data under a condition.

The new digital image data includes, for example, digital image data derived form the image taking portion or digital image data received through the wireless communicator, or the both.

In the above digital camera according to this invention, the full size image data which has been already sent to outside of the digital camera is needless to be kept in the image storage portion at all. On the contrary, the display image data, which is basically to be replaced by new image data sometime, is kept as long as it is highly expected to be played back again. For example, display image data for a picture newly taken by the digital camera is protected from being replaced by new image data unless the digital camera is not in use over a prescribed period of time, e.g. more than three hours, after the date changes. This is also true for display image data newly received through the wireless communicator for playback. Thus, playback of the image highly expected soon is possible without receiving the same through the wireless communicator. This is the reason why the full size image data and the display image data are treated unequally in the image storage portion.

According to a detailed feature of this invention, the storage controller is adapted to treat the digital image data received through the wireless communicator the same as the digital image data derived form the image taking portion. Thus, the display is equal regardless of whether the digital image data is own or of others.

According to another detailed feature of this invention, the digital camera further comprises a display controller adapted to treat the digital image data received through the wireless communicator the same as the digital image data retrieved from the image storage portion. Thus, the display is equal regardless of whether the wireless communicator is used or not.

According to still another detailed feature of this invention, the digital camera further comprises a capacity indicator adapted to indicate information relating to the room for the image storage portion to store new digital image data, wherein the capacity indicator is adapted to make an indication if an extra room for the new digital image data can be secured by replacing the stored display image data. Thus, the user is informed of the deletion of the display image data in advance.

This invention also provides a digital camera comprising an image taking portion adapted to capture an image, a wireless communicator adapted to send digital image data derived from the image taking portion to outside of the digital camera and to receive digital image data from outside of the digital camera, a display, an image storage portion adapted to store digital image data derived form the image taking portion and digital image data received through the wireless communicator, and a storage controller adapted to control the digital image data in the image storage portion in relation to the sending and receiving of the digital image data through the wireless communicator. The digital camera according to this invention further comprises a search key affixing controller adapted to affix a search key to the image data as an attribute thereof, and a search key indication controller adapted to indicate the affixed search keys and related search keys on the display in a comparable manner. The related search keys are received through the wireless communicator among search keys existing outside the digital camera. And, the related search keys include a search key related to the affixed search key and a search key identical with the affixed search key if any.

In the above digital camera according to this invention, search key affixation to the own digital image data is facilitated since the affixed search keys and related search keys existing outside the digital camera are indicated on the display in a comparable manner. In other words, the user who wants own digital image hit in search by others can edit the own search key affixation by consulting with the comparison with the related search key indication.

According to a detailed feature above of this invention, the search key indication controller is adapted to indicate on the display a search key which is in common between the affixed search keys and related search keys. This informs the user of whether or not the affixed search key is popular.

According to another detailed feature above of this invention the search key affixing controller is adapted to copy one of the related search keys as a new affixing search key. Thus, the user can easily adopt a popular search key.

The above various features relating to the indication of the affixed search keys and related search keys on the display in a comparable manner are also useful if they are applied to a personal computer.

According to still another detailed feature above of this invention, the digital camera further comprises a manual operating portion, wherein the search key affixing controller is responsive to the manual operating portion in affixing the search key. Or, alternatively, the search key affixing controller is adapted to automatically affix the search key received through the wireless communicator. Thus, the initial affixation of the search key is possible by manual or automatic means.

This invention also provides a digital camera comprising an image taking portion, a wireless communicator adapted to send digital image data derived from the image taking portion to outside of the digital camera and to receive digital image data from outside of the digital camera, a display, an image storage portion adapted to store digital image data derived form the image taking portion and digital image data received through the wireless communicator, and a storage controller adapted to control the digital image data in the image storage portion in relation to the sending and receiving of the digital image data through the wireless communicator. The digital camera according to this invention further comprises a search controller adapted to receive search key from the neighborhood of the digital camera through the wireless communicator and to send it to an outside server on Internet through the wireless communicator to have it carry out the search on the sent search key.

In the above digital camera according to this invention, the neighboring information automatically comes in the form of the search key by means of approaching there, and is obtainable in detail as the form of search result.

According to a detailed feature above of this invention, the digital camera further comprises a search result controller adapted to receive search result form the outside server through the wireless communicator for displaying the received search result on the display. In more detail, the search result includes digital image data or Weblog relating to the search key.

The above feature according to this invention is typical applicable to a case that the neighborhood includes an advertiser, and that the search result includes the advertisement of the advertiser.

Another example of application of the above feature is a case that the neighborhood includes a notable site, and that the search result includes digital image data of photographs of the notable site taken by others, which may be of some help of taking a new photograph of the same notable site.

Other features and advantages according to this invention will be readily understood from the detailed description of the preferred embodiments in conjunction with the accompanying drawings.

DETAILED DESCRIPTION OF THE PREFERRED EMBODIMENTS

Figure 1:
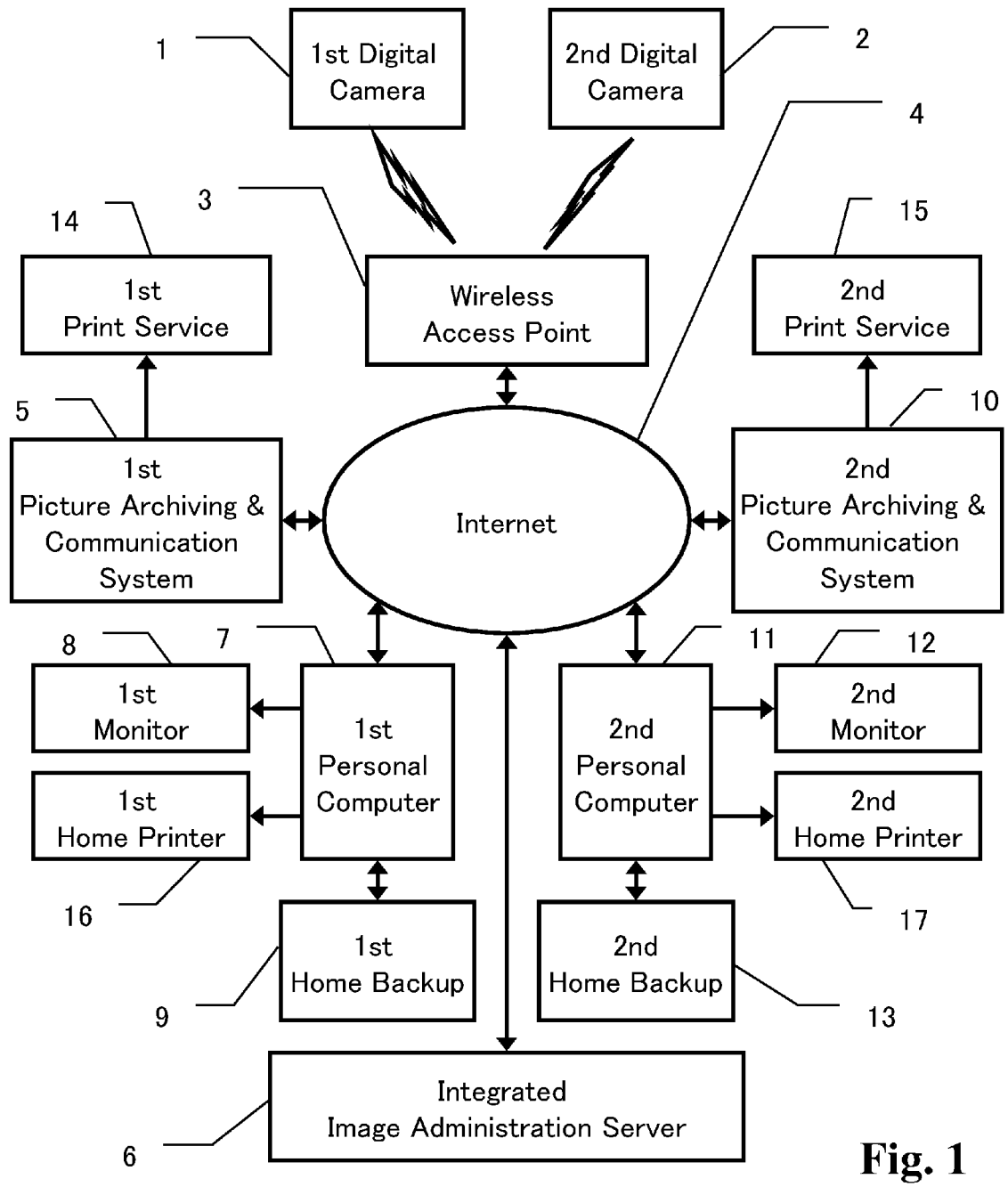
FIG. 1 is a block diagram of a digital camera system according to the first embodiment of this invention.

FIG. 1 is a block diagram of a digital camera system according to the first embodiment of this invention. The system in FIG. 1 includes the first digital camera 1 and the second digital camera 2 as the most simplified case. However, the system according to this invention may further includes a third or more digital cameras The first digital camera 1 and the second digital camera 2 have functions identical with each other. Therefore, the explanation is basically made only on the basis of the first camera 1 unless the first digital camera 1 and the second digital camera 2 cooperate with each other.

The first digital camera 1 has a local wireless communication function which automatically connects the first digital camera 1 with wireless access point 3 to access Internet 4 when the digital camera 1 comes into the communication range of access point 3. The connection is kept in constant connection until the first digital camera 1 goes out of the communication range. Alternatively, the first digital camera 1 is capable of accessing Internet 4 through a wired access point. If any access point is not available, the digital camera 1 can be in communication with a mobile phone by way of wired or wireless connection, the mobile phone connecting the digital camera 1 to Internet by means of the phone line The first digital camera 1 is capable of being charged by a power source at the access point through a wired connection or a wireless electromagnetic induction. For example, the first digital camera 1 is charged by and in communication with a wired access point by means of connecting the first digital camera 1 to a composite power and communication cable taken from under the table if the wired access point is a coffee shop. Or, the first digital camera 1 is charged by a wireless access point by means of putting the first digital camera 1 on a table with an electromagnetic induction charger build onto the table if the wireless access point is another type of coffee shop. In this case, a wireless communication is possible since the table is located within the communication range of the access point.

Thus, the first digital camera 1 in constant connection to Internet 4 is to automatically send digital image taken by the first digital camera 1 to the first picture archiving and communication system 5 in accordance with a contract which has been made between the first digital camera 1 and the first picture archiving and communication system 5.

The digital image sent to and kept by the first picture archiving and communication system 5 can be retrieved by the first digital camera 1 for display in response to a playback operation at the first digital camera 1. In other words, the playback operation automatically causes the first digital camera 1 to access the contracted web page provided by the first picture archiving and communication system 5 through Internet 4 to thereby download the image in a size suitable for display on the monitor of the first digital camera 1.

Provided that the original of the image in full size is kept by the first picture archiving and communication system 5, the full size image data itself is not retrieved by the first digital camera 1 for keeping it on the digital camera 1 side, but the image data in the reduced size suitable for display on the monitor of the first digital camera 1 is temporarily downloaded every time when the playback operation is done to access the first picture archiving and communication system 5. In other words, the first digital camera 1 serves as a browser of the reduced size of image data provided by the first picture archiving and communication system 5. The reduced size of image data once downloaded is not positively deleted after the playback but is kept as long as the capacity of the memory is available in case a possible communication failure when the same image will be desired to be displayed again. The oldest one of such image data unless protected, however, is to be replaced by a newly downloaded image if the capacity of the memory will be full.

Upon the playback of the image, the first digital camera 1 can access integrated image administration server 6 to search among a great number of thumbnails for identifying the desired image, and then jump to the corresponding image kept by the first picture archiving and communication system 5 in place of directly accessing to the first picture archiving and communication system 5. This is possible by assigning a URL to each image data. The image search on integrated image administration server 6 and its cooperation with the first picture archiving and communication system 5 will be explained later in detail.

The first picture archiving and communication system 5 keeps not only the digital images but also Weblog created on the digital images. Further, not only the provider of the digital image but also anyone of the audience of the digital image can write in the Weblog an opinion or thought on the image.

The digital image kept in the first picture archiving and communication system 5 can be retrieved though the first personal computer 7 located in the home of the person who owns of the first digital camera 1, the image being displayed on the first monitor 8 connected to the first personal computer 7. The first computer 7 also accesses the contracted web page provided by the first picture archiving and communication system 5 through Internet 4. Thus, the first personal computer 7 also serves as a browser of the image data provided by the first picture archiving and communication system 5. In other words, full size image data itself is not retrieved by the first personal computer 7 for keeping it on the first personal computer 7 side, but the image data in the reduced size suitable for display on the first monitor 8 is temporarily downloaded every time when a playback operation is done by the first personal computer 7 to access the first picture archiving and communication system 5. However, the reduced size of image data suitable for display on the first monitor 8 once downloaded can be kept in the first computer 7 if an operation is done to do so Upon the playback of the image, the first personal computer 7 can also access integrated image administration server 6 to search among a great number of thumbnails for identifying the desired image, and then jump to the corresponding image kept by the first picture archiving and communication system 5 in place of directly accessing to the first picture archiving and communication system 5.

It is possible to send image data taken by the first digital camera 1 by way of the first personal computer 7 to the first picture archiving and communication system 5 thorough Internet 4, in place of sending the image data to the first picture archiving and communication system 5 directly form the first digital camera 1. This is possible, for example, by removing a memory card, which keeps the taken image data, from the first digital camera 1 to insert it into the first personal computer 7.

The first personal computer 7, which is a conventional personal computer, can be replaced by a larger size computer such as a home server or a home central controller. The first monitor 8, which is a conventional monitor for a personal computer, can be replaced by a monitor of a high definition television set. Further, the first personal computer 7 and the first monitor 8 can be combined with a television set as an integrated television set with the personal computer function.

As has been mentioned above, the image data retrieved for display is not kept within the first personal computer 7, but is downloaded every time when a playback operation is done by the first personal computer 7. The personal computer 7, on the other hands, in combination with the first home backup storage 9 downloads the full size image data from the first picture archiving and communication system 5 to keep it within the first home backup server 9.

In other words, the first personal computer 7 automatically downloads the full size image data from the first picture archiving and communication system 5 through Internet 4 when it receives to keep full size image data from the first digital camera 1. The downloaded image data is automatically stored in the first home backup storage 9 under the control of the first personal computer 7. And, every time when first digital camera 1 or the first personal computer 7 communicates with the first picture archiving and communication system 5 afterward on the image data bucked up in the backup storage 9, the history of the communication is automatically downloaded from the first picture archiving and communication system 5 to store it within the first home backup storage 9 in relation with the backed up image data. The typical communication of first digital camera 1 or the first personal computer 7 with the first picture archiving and communication system 5 is the playback of the image on the first digital camera 1 or the first monitor 8.

Further, every time when first digital camera 1 or the first personal computer 7 communicates with integrated image administration server 6, the history of the communication is automatically downloaded from integrated image administration server 6 to store it within the first home backup storage 9 in relation with the backed up image data. The typical communication of first digital camera 1 or the first personal computer 7 with integrated image administration server 6 is the search for a desired image among thumbnails.

The first home backup storage 9 is, however, one-way storage for storing data from the first personal computer 7 that downloads the image data or communication history data. In other words, the first personal computer 7 retrieves the image data or the communication history not from the first home backup storage 9, but from the first picture archiving and communication system 5 or integrated image administration server 6.

For the purpose of avoiding confusion, the reduced size of image data suitable for display on the first monitor 8 and kept within the first personal computer 7 is not bucked up by the first home backup storage 9 even if it is downloaded by the first personal computer 7.

The reason why the first home backup storage 9 is prepared in the home is a self-defend in case dada or service itself disappears due to some accident at the first picture archiving and communication system 5 or integrated image administration server 6. Thus, unless such accident occurs, the first digital camera 1 or the first personal computer 7 carries out the playback of the image as a browser functioning on the software in the first picture archiving and communication system 5, which is improved day by day.

Similarly, the first digital camera 1 or the first personal computer 7 carries out the administration or search of image data on the software in integrated image administration server 6, which is also improved day by day. However, the improved software itself of the first picture archiving and communication system 5 or integrated image administration server 6, such as new version of image processing, image keeping, image administration, and image searching, is not downloaded into the first personal computer 7 unless it directly relates to the digital camera 1 or the personal computer 7, such as new display layout on the monitor thereof.

The data stored in the first home backup storage 9 in relation to the image data, such as administration data, log and search history for image, is not an original as it is, but is modified with restoration of such data taken into consideration in case the first picture archiving and communication system 5 or integrated image administration server 6 is destroyed in contingency. For example, if the downloaded image data or the relating data is handled under a file format, or data structure, or directory structure specific to the first picture archiving and communication system 5 or integrated image administration server 6, such data is not stored in the first home backup storage 9 as it is, but is stored with such modification made that each image data can be separately handled in a manner free from the peculiar file format, or data structure, or directory the first picture archiving and communication system 5 structure. Further, administration data or the like associated with the image data is so modified that the associated data is separately attached to each image data with its data format converted into a simplified one such as a text file. Thus, image data can be easily located upon restoration by means of full-text search of the text file data attached to each image data.

The first home backup storage 9 is a product specialized for automatic backup function including a large-capacity storage. The first home backup storage 9 can be a multipurpose storage for backuping only the data created by an outside server such as the first picture archiving and communication system 5 or integrated image administration server 6, but also various data created by the first personal computer 7 in case of a hard disk crash or the like in the first personal computer 7.

As described above, the first digital camera 1 or the first personal computer 7 entrusts the functions of image processing, image keeping, image administration, and image searching to an outside server such as the first picture archiving and communication system 5 or integrated image administration server 6 according to this invention. In other words, the first digital camera 1 or the first personal computer 7 itself serves as a means for merely capturing and/or browsing images.

According to the above division of roles, the first digital camera 1 is developed with the cost focused on improvement of capturing function by optical system, sensor, and lighting system or the like, the cost for developing other functions being saved. On the other hand, the first picture archiving and communication system 5 is developed with the cost focused on improvement in image processing, image keeping, image administration, and image searching functions, the developing cost of which is not directly passed on to the price of the first digital camera 1. However, since the image capturing function is deeply relates to the image processing, image keeping, image administration and image searching functions, the first digital camera 1 and the first picture archiving and communication system 5 are efficiently developed in collaboration with each other.

The division of roles between the first picture archiving and communication system 5 and integrated image administration server 6 is also reasonable since the data administration or data searching function relates not only to the image data but also to general data which covers huge market based on computer technology, which should be assigned to integrated image administration server 6. On the other hand, the image processing or image keeping function should be assigned to the first picture archiving and communication system 5, which is specialized to handle the image data.

In FIG. 1, the second digital camera 2 and the relating system components including the second picture archiving and communication system 10, the second personal computer 11, the second monitor 12 and the second home backup storage 13 are similar to those for the first digital camera 1. So, the explanation for those components is omitted for avoiding duplication.

FIG. 1 shows that the first digital camera 1 and the second digital camera both access to wireless access point 3 in common. This is on the assumption that the owner of the first digital camera 1 (hereinafter referred to as "the first user") and the owner of the second digital camera 2 (hereinafter referred to as "the second user") travel with each other, which makes it possible for the first user and the second user to share the same access point. The following explanation will be made on this assumption. However, if the first user and the second user locate apart from each other, they of course connect Internet 4 through different access points.

FIG. 1 shows that the second user sends or retrieves image to or from the second from the second picture archiving and communication system 10. This is on the assumption that the first user makes a contract with the first picture archiving and communication system 5 while the second user with the second picture archiving and communication system 10. The following explanation will be made on this assumption. However, there is no problem if the first user and the second user make contract with the same picture archiving and communication system.

FIG. 1 shows only one integrated image administration server 6. This is on the assumption that the first picture archiving and communication system 5 and the second picture archiving and communication system 10 share the same integrated image administration server in the most simplified case of collaboration. The following explanation will be made on this assumption. However, this invention is not limited to a system which includes only one integrated image administration server, but is also applicable to a system including a plurality of integrated image administration servers in collaboration with number of picture archiving and communication systems.

The following explanation relates to the printing of the image data. The first picture archiving and communication system 5 and the second picture archiving and communication system 10 are connected to the first print service 14 and the second print service 15 through dedicated line connections, respectively. Thus, the first picture archiving and communication system 5 can accept an order of print from the first digital camera 1 or the first personal computer 7. Similarly, or the second picture archiving and communication system 10 can accept an order of print from the second digital camera 2 or the second personal computer 11. The connection to the first print service 14 or the second print service 15 may be by way of Internet in place of the dedicated line connections.

The first picture archiving and communication system 5 or the second picture archiving and communication system 10 has the first print service 14 or the second print service 15 make print in response to the accepted order. The print made by the first print service 14 or the second print service 15 is brought to the orderer by means of a delivery service.

According to the first embodiment in FIG. 1, a print can be made by the first home printer 16 or the second home printer 17 connected to the first personal computer 7 and the second personal computer 11, respectively. If the print is desired to be made in home, the first personal computer 7 of the second personal computer 11 downloads the image data of a desired print size to have the first home printer 16 or the second home printer 17 make the print.

Figure 2:
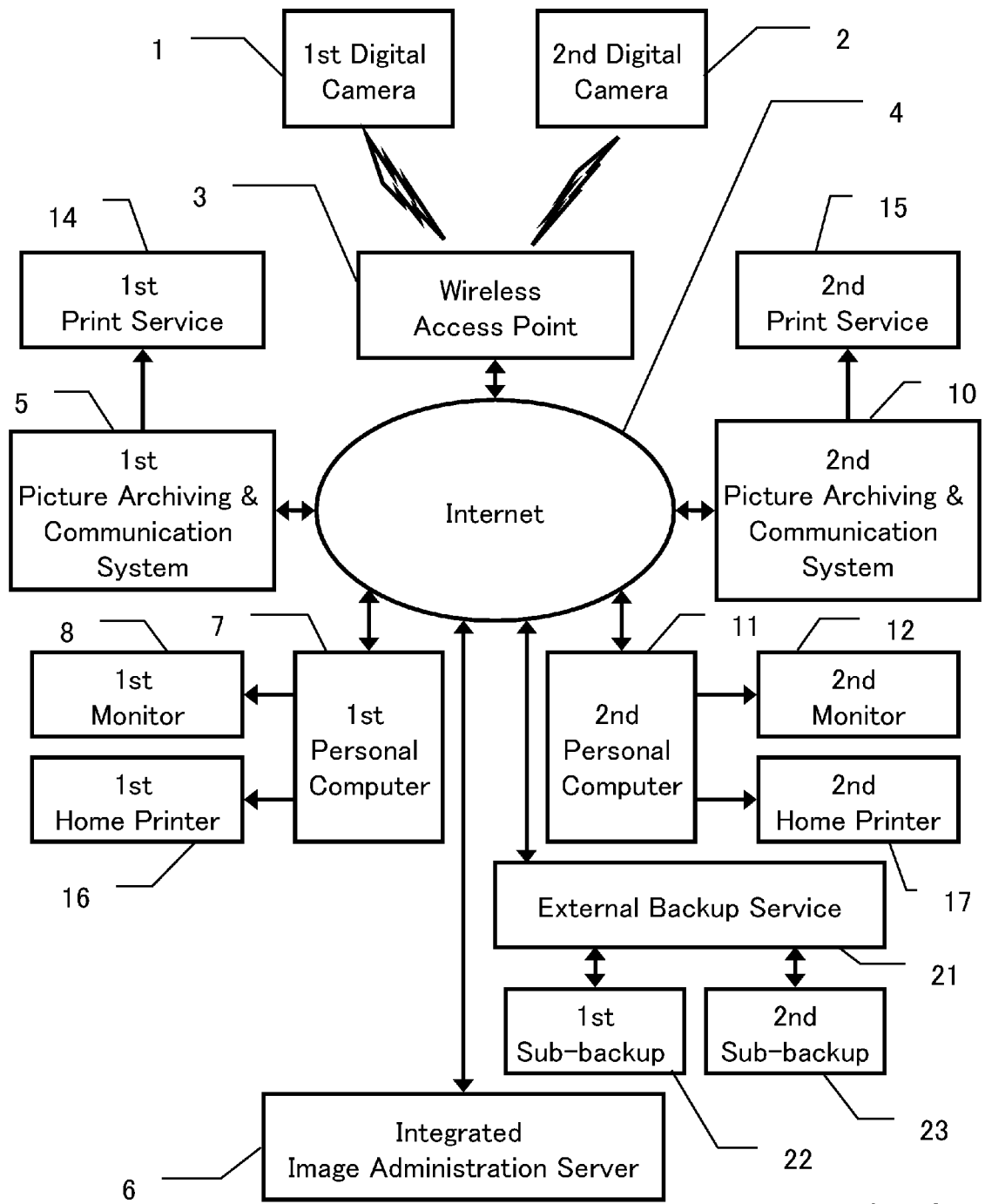
FIG. 2 is a block diagram of a digital camera system according to the second embodiment of this invention.

FIG. 2 is a block diagram of a digital camera system according to the second embodiment of this invention. Since the second embodiment in FIG. 2 is almost similar to the first embodiment in FIG. 1. So the same numeral is used for identifying the same system component throughout FIG. 1 and FIG. 2, duplicate explanation being omitted in FIG. 2.

The difference between the first and second embodiments is the components for backuping data. In other words, the first personal computer 7 and the second personal computer 11 of the second embodiment in FIG. 2 rely on external backup service 21 through Internet 4 in place of the first home backup storage 9 and the second home backup storage 13 in FIG. 1.

The function of external backup service 21 is basically similar to that of the first home backup storage 9 or the second home backup storage 13. So, the explanation is focused on the difference therebetween.

First, external backup service 21 is specialized for keeping home data with high privacy protection required outside the home. Therefore, external backup service is characterized by a high capacity of storage for a great number of homes, a high reliability against data disappearance and a high security against privacy violation.

For example, external backup service 21 adopts a cryptosystem of a friendly usability and a high reliability, which encourages the first personal computer 7 or the second personal computer 11 to send the private data to external backup service 21 through Internet 4.

Second, external backup service 21 is adopts an administration function for treating data from great number of personal computers, such as the first personal computer 7 or the second personal computer 11 without confusion.

Further, external backup service 21 can backup data sent through Internet 4 not only from the first personal computer 7 or the second personal computer 11, but also from the first picture archiving and communication system 5, or from the second picture archiving and communication system 10, or from integrated image administration server 6. In more detail, external backup service 21 can backup the image data kept by the first picture archiving and communication system 5, or by the second picture archiving and communication system 10, or by integrated image administration server 6 under the contract with and in response to the actual access by the first personal computer 7 or the second personal computer 11. Further the history of communication between the first personal computer 7 and the first picture archiving and communication system 5 or the like is directly sent from the first picture archiving and communication system 5 to the external backup service 21 for backup. The history of communication received by t external backup service 21 is stored therein in relation to the image data on which the communication has been made.

For the purpose of further strengthening the reliability against data disappearance, external backup service 21 is connected with private lines of high security to the first sub-backup 22 and the second sub-backup 23 or the like to each further automatically copy and keep the backup data, respectively. The first sub-backup 22 and the second sub-backup 23 or the like are located globally apart from each other so that some one will survive even if the others will be destroyed by a giant earthquake or the like.

As has been apparent, the second embodiment in FIG. 2 includes the first picture archiving and communication system 5, the second picture archiving and communication system 10, integrated image administration server 6 and external backup service 21, which each take its share of handling image data originated and utilized by the first digital camera 1 or the second digital camera 2. Thus, the digital image handling service to the owners of the digital cameras is improved in combination by the variety of features of system components.

Now, the function of integrated image administration server 6 is to be explained along with its cooperation with the first picture archiving and communication system 5 and the second picture archiving and communication system 10. The function to be explained includes not only the service for the first digital camera 1 or the second digital camera 2 alone, but also a service relating to a combination between the first digital camera 1 and the second digital camera 2 as well as a service for sharing image among a plurality of users. Since these functions are common to the first embodiment and the second embodiment, the following explanation will be made in accordance with the first embodiment in FIG. 1.

As has been mentioned, the image data taken by the first digital camera 1 is kept by the first picture archiving and communication system 5, which provides the image administration system to be utilized as an online album for the first user. The image administration system provided by the first picture archiving and communication system 5 includes function for automatically affixing to each kept image data a criterion for search, such as user ID, user nickname, trademark of camera, photo taking date and time, photo taking place including point and direction, information of the object, and image sending date and time etc. The system further makes it possible for user to manually add a criterion for search, such as title of the image or search tag to each image data to be kept. The automatically given criteria such as photo taking place or information of the object may be treated as the form of search tag or search key.

By means of such image administration system operable through the first camera 1 or the first personal computer 7, the first user can search into the kept images to hit an image or images to be played pack. The user can freely add, or delete, or change criteria for search an image on the occasion of playing back the image by operating the first digital camera 1 or the first personal computer 7 in accordance with the administration system provided by the first picture archiving and communication system 5.

The first picture archiving and communication system 5 can allow anyone to access the kept images under some condition or without any condition in accordance with the direction from the first digital camera 1 or the first personal computer 7. Further, some criteria for search relating to the image are laid open along with the image as long as the criteria meet the privacy condition allowed by the creator of the image.

Thus, the second user can also search for and access to the image of the first user kept in the first picture archiving and communication system 5 by operating the second digital camera 2 or the second personal computer 11. If the image is laid open without any condition, the second user even unacquainted with the first user can access to the image of the first user. If the image is laid open with some condition, on the other hand, the second user can access only to the images which are allowed by the first user under such condition.

The above is vice versa. Namely, the first user can search for and access to the image of the second user kept in the second picture archiving and communication system 10 by operating the first digital camera 1 or the first personal computer 7 as long as the first user meets the condition set by the second user. More detailed explanation will not be repeated for avoiding duplication.

The above is true for the images of the first user kept not only in the first picture archiving and communication system 5, but also in the second picture archiving and communication system 10. Similarly, the above is true for the images of the second user kept not only in the second picture archiving and communication system 10, but also in the first picture archiving and communication system 5. In summary, the first user or the second user can search for and playback its own images in private regardless of the picture archiving and communication system actually keeping the images, and can also search for and playback images of any other user as long as they are laid open.

As to integrated image administration server 6, it makes it possible to search for all images regardless of the picture archiving and communication systems. In other words, a borderless search for images is possible once integrated image administration server 6 is accessed. This will be explained in more detail in accordance with the most simplified case including the first picture archiving and communication system 5 and the second picture archiving and communication system 10.

Integrated image administration server 6 is a so-called search engine capable of making search into the images kept by the first picture archiving and communication system 5 and the second picture archiving and communication system 10 with respect to the criteria set by the user. For the efficiency of the search, integrated image administration server 6 functions based on criteria according to its own search system, such as user ID, user nickname, trademark of camera, photo taking date and time, photo taking place, information of the object, image sending date and time, title of the image and search tag, the search being to be done with respect to each criterion.

Since the search system with the criteria used therein is released by integrated image administration server 6 to the public and free, the first picture archiving and communication system 5 and the second picture archiving and communication system 10 can easily incorporate the search system. In other words, the first picture archiving and communication system 5, the second picture archiving and communication system 10 and integrated image administration server 6 share the same search system to constitute a tightly united system, which is extremely convenient for the first and second users. Further, the first picture archiving and communication system 5 and the second picture archiving and communication system 10 become free from cost for developing and establishing own search system and to concentrate to the development and establishment of the image keeping and processing system.

Integrated image administration server 6 searches into image data treated by not only the own search system, but also another search system provided by an independent picture archiving and communication system. This is done by means of conducting a full-text search into the data relating to image data treated by such an independent picture archiving and communication system regardless of its unique data structure. And, if the full-text search hits some data, integrated image administration server 6 converts the hit data into a data structure according to the own search system in indicating the result of search. Thus, the first picture archiving and communication system 5 or the second picture archiving and communication system 10 may not necessarily incorporate the search system provided by integrated image administration server 6, but may insist on its own search system if such a search system has already existed. However, it is of course true that the incorporation of the search system provided by integrated image administration server 6, which is a major portal site, may increase the ability for the picture archiving and communication system to pull in more customers due to the convenience, increased search efficiency, and less erroneous or miss search.

Integrated image administration server 6 displays the thumbnails of hit images in the same manner regardless of whether they are from the first picture archiving and communication system 5 or the second picture archiving and communication system 10. In other words, thumbnails of images derived from a plurality of picture archiving and communication systems are displayed under the control of integrated image administration server 6 as if they are the result of search into a single database system on integrated image administration server 6.

If a criterion for search set by the first user on integrated image administration server 6 hits an image uploaded from the first digital camera 1 and another image uploaded from the second digital camera 2, integrated image administration server 6 has the first digital camera 1 or the first personal computer 7 display thumbnails of the hit images in the same manner regardless of whether they are derived from the first digital camera 1 or the second digital camera 2. In other words, thumbnails of the owe image data and other's image data are displayed on the own digital camera as if they are all taken by the own digital camera.

If the user selects one of the hit thumbnails displayed on the first digital camera 1 or the first monitor 8 under the control of integrated image administration server 6, URL of the corresponding image data for display size is designated to jump to one of the first picture archiving and communication system 5 and the second picture archiving and communication system 10 that actually keeps the image data. Thus, the first digital camera 1 or the first personal computer 7 automatically accesses to the image data of the size suitable for display on the first digital camera 1 or the first monitor 8.

Figure 3:
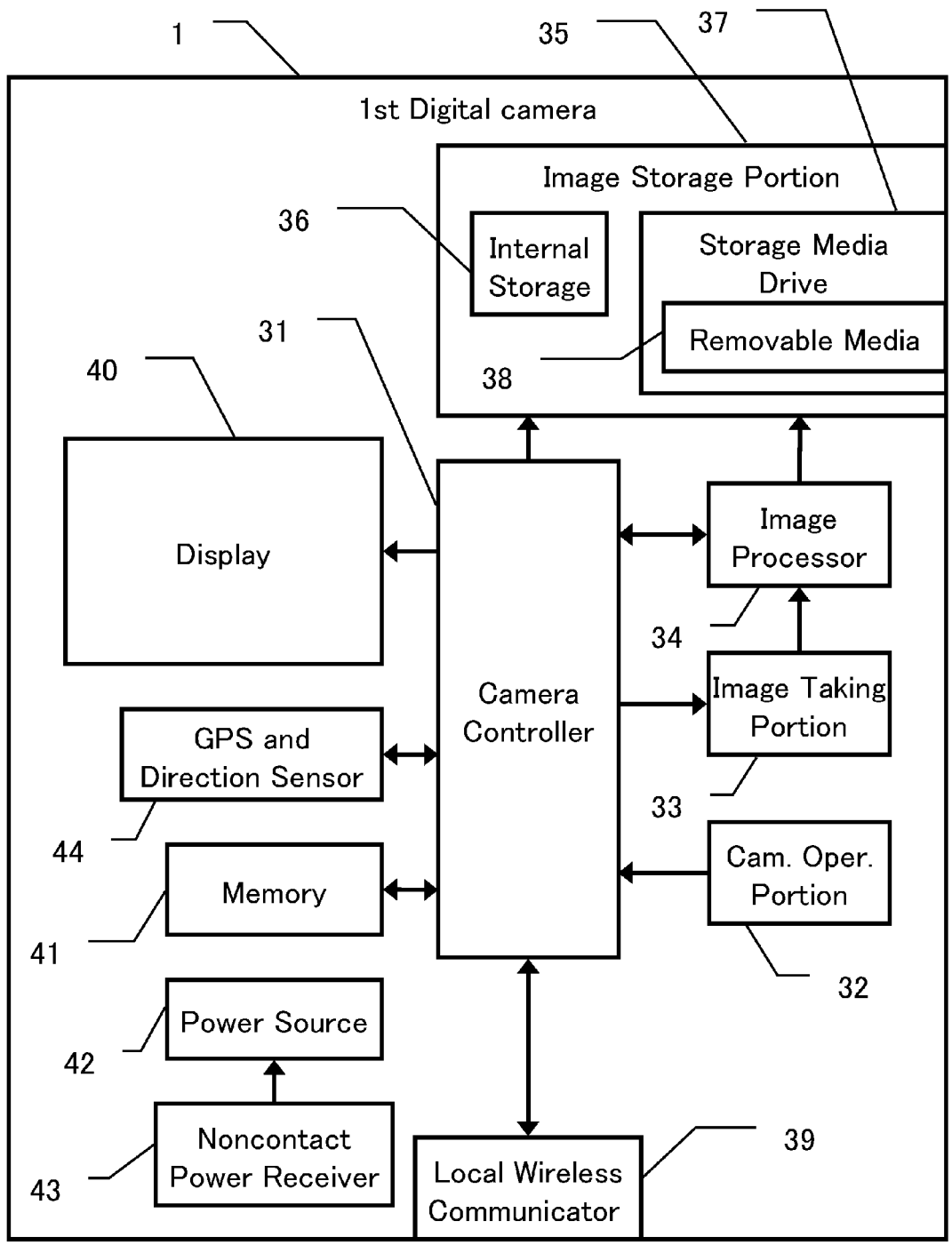
FIG. 3 is a block diagram of a digital camera of the first embodiment shown in FIG. 1.

FIG. 3 is a block diagram of a digital camera 1 of the first embodiment in FIG. 1. The structure in FIG. 3 is the same as that in the second digital camera 2 in the first embodiment, the first digital camera 1 and the second digital camera 2 in the second embodiment.

The first digital camera 1 controlled by camera controller 31 takes a photograph in response to an operation of a release button included in camera operating portion 32 in such a manner that an image captured by image taking portion 33 is processed by image processor 34 to be stored in image storage portion 35. The processed image data to be stored in image storage portion 35 includes main image data of full-size, a display image data in a size suitable for displaying on display 40, and thumbnail data. Thumbnail data generally stored as a part of the main image data can also be copied as a data to be separately treated in relationship to the main image.

The image data sorted in image storage portion 35 is normally kept at internal storage 36. Image storage portion 35 further includes storage media drive 37 for receiving removable storage media 38 such as memory disk or memory card, in which the image data is stored if internal storage 36 is full. The image data stored in removable media 38, however, will be transferred to internal storage 36 if a room for overwriting will be secured therein due to a sending of image data to the first picture archiving and communication system 5. The removable storage media 38 is also used in manually taking out image data outside the first digital camera 1. In other words, image data is coped from internal storage 36 into removable storage media 38, which is then taken out from storage media drive 37 for the purpose of insertion into a storage media slot of another device such as the first personal computer 7.

As has been explained, the image data which has been taken by first digital camera 1 is automatically sent to the first picture archiving and communication system 5 from local wireless communicator 39 through Internet 4 when the digital camera 1 comes into the communication range of access point 3. On the other hand, the image data to be taken by first digital camera 1 will be instantly sent to the first picture archiving and communication system 5 from local wireless communicator 39 through Internet 4 if the digital camera 1 has been already within the communication range of access point 3.

If the first digital camera 1 cannot come into the communication range of access point 3 in spite of little room left in image storage portion 35 for overwriting new image data, such a caution is made that the first user is recommended to manually connect the digital camera 1 to his or her mobile phone with local wireless communicator 39 to send the image in image storage portion 35 to the first picture archiving and communication system 5 through Internet 4 by way of the mobile phone. Alternatively, the first digital camera 1 is designed in response to such a case to automatically connect to and control the mobile phone to send the image in image storage portion 35 to the first picture archiving and communication system 5 through Internet 4 by way of the mobile phone.

In a case that the first user is visiting a notable site, wireless communicator 39 automatically receives information about the object to be photographed from automatic information communicator located at the object. The received information is automatically added to the image data as criterion for search when the image data is sent to the first picture archiving and communication system 5 from the first digital camera 1. Since the information is used as a tag in the search system, it is automatically affixed to the image data as a form of the tag.

The information about the object in the notable site can be a form of a barcode printed on the guide sign of the object. And, the barcode is automatically read by the first digital camera 1 if it is so directed that the guide sign is in the angle of the camera lens which focuses the image of the barcode on the image sensor in image taking portion 33, which can decode the barcode. Thus, the information to be added to the image as the tag for searching the image can be optically gotten by the camera image sensor in place of the wireless communicator 39.

Among image data, the main image data of full-size is automatically made deletable from image storage portion 35 to secure a room for internal storage 36 to accept new image data if the main image data has been sent to the first picture archiving and communication system 5. The main image data made thus deletable is not instantly deleted, but will be overwritten by a new image data. If desired, however, a manual setting is possible to set the main image data not to be automatically made deletable but is protected within image storage portion 35 even if the main image data has been sent to the first picture archiving and communication system 5. In this case, the main image data is kept with a mark indicating that it has been sent to the first picture archiving and communication system 5. The main image data with such a mark is prevented from being sent again in the first digital camera 1, or is rejected by the first picture archiving and communication system 5 even if erroneously sent. Further, in case that the main image data is erroneously accepted in duplicate, it will be afterward detected through the duplication check to neglect the redundant one form the result of search.

The display image data in a size suitable for displaying on display 40 for the taken photography, on the contrary, is automatically protected within image storage portion 35 under some reasonable condition and time limit even if the main image data has been sent to the first picture archiving and communication system 5. This makes it possible for the first user to play back the image again on the first digital camera 1 without accessing the first picture archiving and communication system 5. For example, the display image data for the photographs taken on the day are protected within image storage portion 35 unless the first digital camera 1 is not in use over a prescribed period of time, e.g. more than three hours, after the date changes, the display image data being made deletable from image storage portion 35 in automatic response to the lapse of the period to secure a room for internal storage 36 to accept new image data. If the first user wants to playback the display image data on the display 40 and the image data has been overwritten in image storage portion 35, he or she is to access to the first picture archiving and communication system 5 to retrieve the image data.

The display image data in a size suitable for displaying on display 40 is regularly prepared on the side of the first picture archiving and communication system 5 on the basis of the received main image data of full-size. So, the display image data is basically downloaded by the first digital camera 1 upon playback, though the display image data is once made by the first digital camera 1 when the photograph is taken.

Memory 41 stores the basic software for operation the first digital camera 1 as well as various data necessary in the camera operation. Memory 41 also stores data necessary for the first digital camera 1 to collaborate with the first picture archiving and communication system 5 and integrated image administration server 6

Power source 42 for powering the entire elements in the first digital camera 1 is of an ordinary type including a structure for receiving a rechargeable battery. Power source 42 is connected to noncontact power receiver 43, which receives power from noncontact power transmitter located at wireless access point 3 to charge the rechargeable battery in power source 42.

GPS and direction sensor 44 detects the location of the first digital camera 1 and the direction to which the lens of the first digital camera 1 is facing. The information detected by GPS and direction sensor 44 is automatically added to the image data as criterion for search when the image data is sent to the first picture archiving and communication system 5 from the first digital camera 1. Since the information is used as a tag in the search system, it is automatically affixed to the image data as a form of the tag.

GPS and direction sensor 44 is also capable of displaying on display 40 how to get to the nearest access point if the first digital camera 1 is outside the communication range of any access point.

It is possible for the first user to display on display 40 relevant photographs taken by others if such photographs are searched on criteria relating to the current location of the first digital camera 1 such as information gotten by one or combination of GPS and direction sensor 44, local wireless communicator 39 and image taking portion 33 reading the barcode. Further, not only the photographs but also Weblog created in relation to the photographs can be searched to be displayed on display 40. Thus, the user of the first digital camera 1 can get the latest travel information in the form of photograph and Weblog about the place where he or she now is. Further, is can be expected that someone uploads photographs and Weblog on neighborhood shops or cafes, the system according to this invention serves as an effective local advertising media for such shops and cafes.

Figure 4:
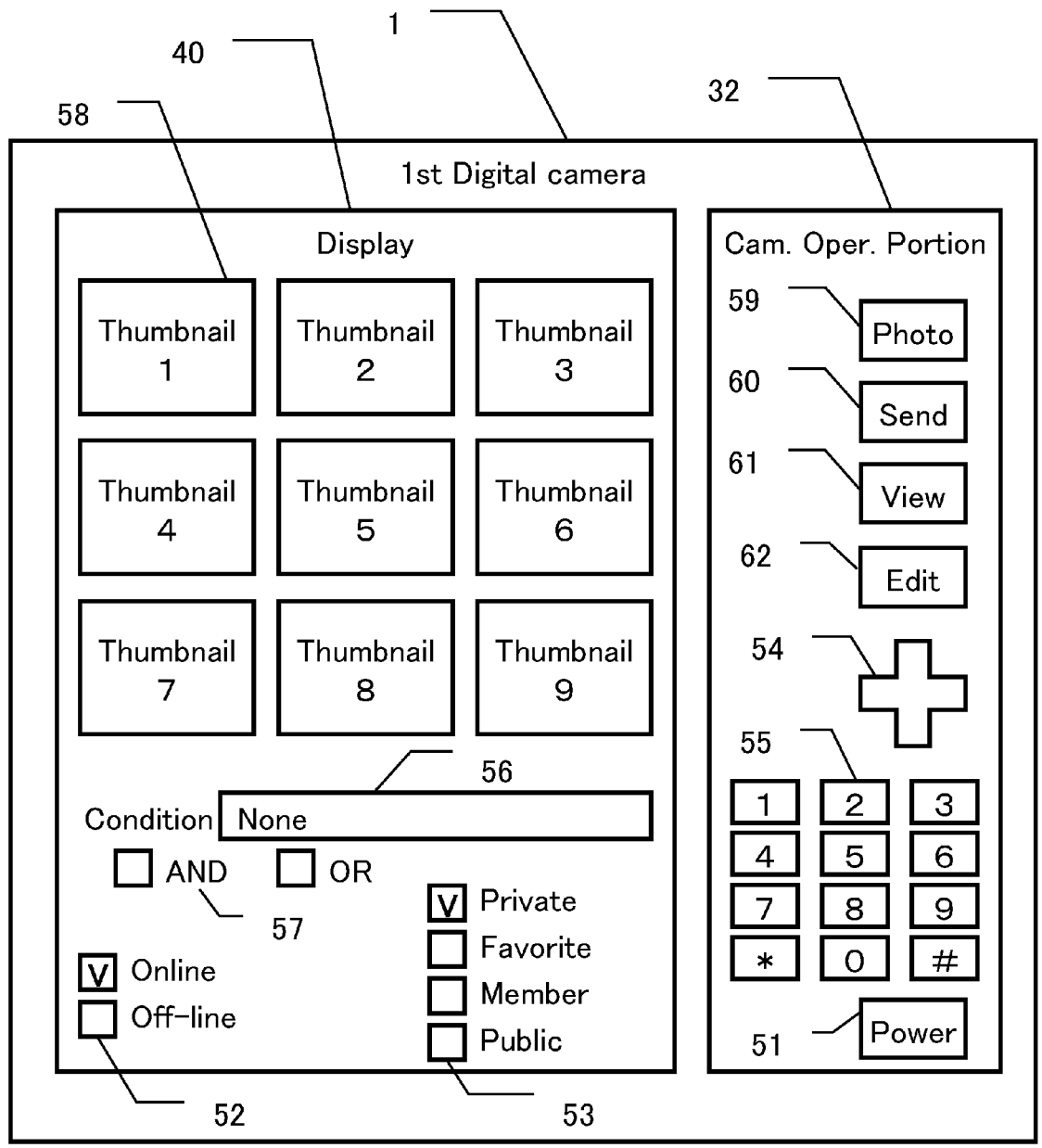
FIG. 4 is a schematic external view of a principal part of the digital camera in FIG. 3 to show camera operating portion and monitor in which thumbnails are shown for playback of the image.

FIG. 4 is a schematic external view of a principal part of the digital camera 1 in FIG. 3 to show camera operating portion 32 and display 40 in which thumbnails are shown for playback of the image. The following explanation will be made on the assumption that the first digital camera is set to automatically access to integrated image administration server 6 if the playback mode is selected in the first digital camera 1.

The first digital camera 1 is turned ON in the playback mode if power button 51 is operated. In other words, if power button 51 is operated, the first digital camera 1 is checked whether or not it is within the communication range of access point 3. If it is determined that the first digital camera 1 is in the communication range, the first digital camera 1 automatically accesses to integrated image administration server 6 through Internet 4, the first digital camera 1 afterward being kept in connection with integrated image administration server 6 until the first digital camera 1 goes out of the communication range of access point 3 or the first digital camera 1 is turned OFF by power button 51. Connection status is displayed by online/off-line indicator 52 in display 40. FIG. 4 shows that the first digital camera 1 is connected with integrated image administration server 6, which is indicated with online box automatically ticked at online/off-line indicator 52. The change in ticking between online box and off-line box at online/off-line indicator 52 can be made afterward by manually operating arrow key 54 or numeric keypad 55.

Scope section 53 is to show the scope of search conducted by integrated image administration server 6 to hit images to be played back. In other words, scope section 53 includes a private box for searching own images of the first user only, a favorite box for searching images taken by others and once selected by the first user, a member box for searching images of a closed member including the first user, and a pubic box for searching all published images without limitation, one of the boxes being for selection. The first digital camera 1 is turned ON in the playback mode with the private box automatically ticked as shown in FIG. 4 so as to limit the playback function to own images of the first user as in the case of ordinary digital cameras in the playback mode. The change in ticking among the four boxes at scope section 53 can be made afterward by manually operating arrow key 54 or numeric keypad 55.

Search condition box 56 is for inputting free criteria such as photo taking date and time, photo taking place, information of the object, image sending date and time, title of the image and search tag as well as the name of members in scope section 53 by means of manually operating arrow key 54 or numeric keypad 55. Criteria in combination should be separated with a space when input in search condition box 56. The combination of criteria may be possibly between different types such as "photo taking date and time" and "title of the image", or between the same type such as a plurality of tags. The manner of combination of criteria is set by ticking one of AND box or OR box at combination designator 57.

The first digital camera 1 is turned ON in the playback mode with "None" automatically input in condition box 56 and with no tick in any of the boxes at combination designator 57 as shown in FIG. 4. Thus, integrated image administration server 6 searches into all images with user ID of the first user to indicate thumbnails 58 on display 40 in the order of the date and time from the latest. Thumbnails which cannot be displayed on display 40 can be viewed by scrolling the display by arrow key 54.

If one of thumbnails 58 on display 40 is selected by arrow key 54 or numeric keypad 55, the connection jumps to the picture archiving and communication system which keeps image data corresponding to the selected thumbnail to display the image downloaded from the system with possible area of display 40 used.

If the first user wants under some condition to search into own image data which have been uploaded to the first picture archiving and communication system 5, arrow key 54 or numeric keypad 55 are to be manually operated to input desired criteria at search condition box 56 with one of AND box or OR box at combination designator 57 ticked. Arrow key 54 can be tilted to the left, right, top and bottom for selection of the indication elements on display 40 as well as pushed down for entering a command for some function. Thus, the pushing down of arrow key 54 with the input or selection of criteria for search completed causes the searching operation by integrated image administration server 6 to display thumbnails 58 on display 40 as the result of the search.

If the first user wants to search into image data of a group of closed members, arrow key 54 or numeric keypad 55 are to be manually operated to tick the member box at scope section 53, which causes condition box 56 to prepare a pull-down menu of options for group selection, the user being capable of selecting one in the menu by arrow key 54 or numeric keypad 55. The options in the pull-down menu are shown as a list of group names each consisting of closed members. Even if an operation to start the search is made with no group selected in error, integrated image administration server 6 would not respond, but displays an error message informing of incapability of search due to no group identification.

If the first user wants to limit search into the selected group of closed members, arrow key 54 or numeric keypad 55 are to be manually operated to input desired criteria at search condition box 56 with one of AND box or OR box at combination designator 57 ticked.

If arrow key 54 is pushed down with the input or selection of criteria for search completed, integrated image administration server 6 starts to search into the image data of the selected group, thumbnails 58 as the result of the search being displayed on display 40. In this case, integrated image administration server 6 searches into image data kept by the first picture archiving and communication system 5, the second picture archiving and communication system 10 and any other picture archiving and communication systems, the hit thumbnails being displayed in a uniform format and in a predetermined order such as date regardless of the picture archiving and communication systems which keep image data. Further, as long as the image data hit by the same criteria, the resultant thumbnails are displayed in a uniform layout and in a predetermined order regardless of whether they are taken by the first user or another in the selected group.

If the first user wants to search under some condition into image data published without limitation, arrow key 54 or numeric keypad 55 are to be manually operated to tick the public box at scope section 53. Further, arrow key 54 or numeric keypad 55 are to be manually operated to input desired criteria at search condition box 56 with one of AND box or OR box at combination designator 57 ticked.

If the first user wants to search under some condition into image data taken by others and once selected by the first user, arrow key 54 or numeric keypad 55 are to be manually operated to tick the favorite box at scope section 53. If the first user wants to further limit search into the favorite image data, arrow key 54 or numeric keypad 55 are to be manually operated to input desired criteria at search condition box 56 with one of AND box or OR box at combination designator 57 ticked.

If arrow key 54 is pushed down with the input or selection of criteria for search completed, integrated image administration server 6 starts to search into the favorite image data, thumbnails 58 as the result of the search being displayed on display 40. Also in this case, integrated image administration server 6 searches into image data kept by the first picture archiving and communication system 5, the second picture archiving and communication system 10 and any other picture archiving and communication systems, the hit thumbnails being displayed in a uniform format and in a predetermined order such as date regardless of the picture archiving and communication systems which keep image data.

In searching into image data published without limitation, such an automatic criteria input mode is possible that information of the object automatically gotten by GPS and direction sensor 44, or local wireless communicator 39 receiving in a notable site, or image taking portion 33 reading barcode as well as date and time information are automatically input at search condition box 56. According to such automatic input of criteria, integrated image administration server 6 can automatically hit images of the same object taken by others in the same season as the object which the first user is going to take. Such result of the automatic search may be some help of the first user in determining angle or composition of his or her own photograph to take.

In any case of searching into the image data of a closed member and the image data published without limitation, if one of thumbnails 58 on display 40 is selected by arrow key 54 or numeric keypad 55, the connection jumps to the picture archiving and communication system which keeps image data corresponding to the selected thumbnail to display the image downloaded from the system with possible area of display 40 used.

If photo button 59 is pushed in half, the first digital camera 1 is switched from the playback mode to the photo taking mode. If photo button 59 is pushed in full, on the other hand, photo taking is done in the photo taking mode. Send button 60 is to be pushed for manually sending the image data by way of the mobile phone when the first digital camera 1 is outside the communication range of any of wireless access points. View button 61 is for switching the first digital camera from the photo taking mode to the playback mode. Attribute edit button 62 is used upon editing the attribute such relating to the image kept by the first picture archiving and communication system 5. In other words, the attribute such as the title or tags of the image are made changeable if attribute edit button 62 is pushed. Attribute edit button 62 is also used upon editing images for making an electric album. If attribute edit button 62 is pushed in the condition of FIG. 4 in which "None" is in condition box 56 and private box is ticked at scope section 53, thumbnails of images to which attribute is provisionally affixed are searched and displayed. More detailed explanation as to the functions of the above buttons will be given later.

Figure 5:
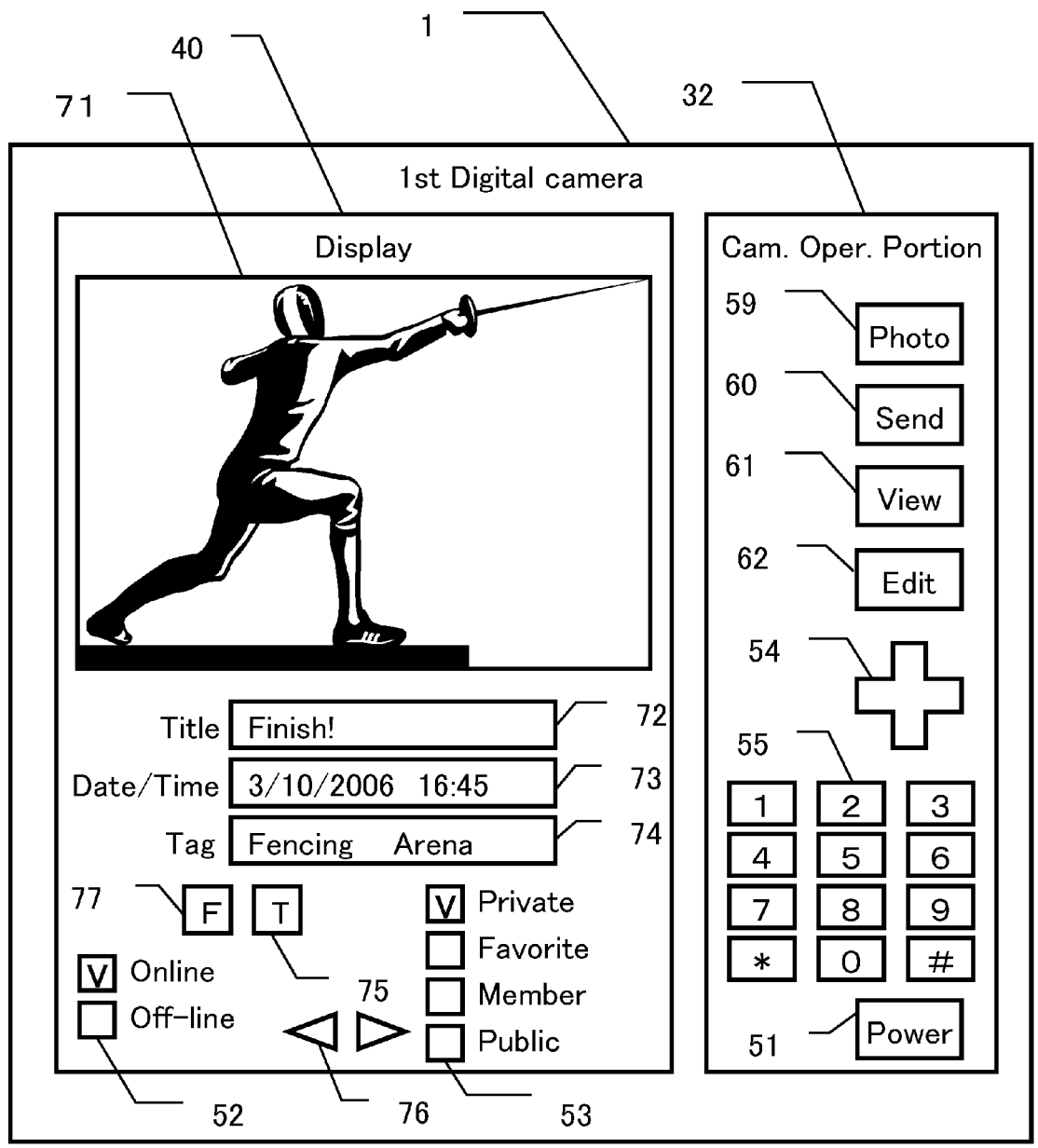
FIG. 5 is a schematic external view of a principal part of the digital camera in the playback mode, which is similar to FIG. 4 except for what is displayed on monitor.

FIG. 5 is a schematic external view of a principal part of the digital camera 1 in the playback mode, which is similar to FIG. 4 except for what is displayed on display 40. In other words, FIG. 5 shows a condition of display 40 when one of the hit thumbnails in FIG. 4 is selected by operating arrow key 54 or numeric keypad 55. So the same numeral is used for identifying the same element throughout FIG. 4 and FIG. 5, duplicate explanation being omitted in FIG. 5.

If one of thumbnails 58 on display 40 is selected in FIG. 4, the connection jumps to the picture archiving and communication system which keeps image data corresponding to the selected thumbnail to display image 71 downloaded from the system with possible area of display 40 used. Further, title box 72, photo taking date and time box 73 and tag box 74 shows their contents, respectively. If the area of box is insufficient to show the entire contents, an enlarged box opens in response to a manual operation of arrow key 54 or numeric keypad 55. Tag box 74 shows a apace-divided plurality of tags, some of the those tags such as "fencing" being manually affixed while other of tags such as "arena" being automatically afficed by receiving information at local wireless communicator 39 or GPS and direction sensor 44.

In the display above, the selected image is displayed in a uniform layout in FIG. 5 regardless of whether they are taken by the first user or another in the selected group.

In FIG. 5, scope section 53 of similar layout to that in FIG. 4 is displayed. However, the meaning of scope section 63 somewhat differs between FIG. 4 and FIG. 5. In other words, scope section 53 in FIG. 4 means the scope of search to hit a plurality of image data while section 53 in FIG. 5 means origin of the selected one image data.

Thumbnail button 75 is to be operated by arrow key 54 or numeric keypad 55 if the first use desires to return to the display in FIG. 4. One of a pair of image feed buttons 76 is operated by arrow key 54 or numeric keypad 55 in FIG. 5 to replace display image 71 by another image corresponding to the last thumbnail or the next thumbnail in the order of displayed in FIG. 4.

The above explanation has been made on a case the first digital camera 1 is set to be turned ON in the playback mode to display thumbnails 58 as in FIG. 4 if power button 51 is operated. According to the explanation, the display of image 71 in FIG. 5 is to be caused by a manual selection of one of the thumbnails in FIG. 4 through operation of arrow key 54 or numeric keypad 55.

The first digital camera 1, however, can be set to be turned ON in the playback mode to directly display image 71 as in FIG. 5 if power button 51 is operated. Also in such a setting, the first digital camera 1 automatically accesses to integrated image administration server 6 through Internet 4 to automatically tick online box at online/off-line indicator 52 if it is determined that the first digital camera 1 is in the communication range. Further, the first digital camera 1 is turned ON also in this setting with "None" automatically input in condition box 56 and with no tick in any of the boxes at combination designator 57 though condition box 56 and combination designator 57 in not overtly displayed in FIG. 5. In this setting, the latest of the own images hit by integrated image administration server 6 is automatically selected as display image 71 in FIG. 5.

If another image is desired to be displayed, image feed buttons 76 is operated to replace display image 71 in FIG. 5 or thumbnail button 75 is operated to change into the display in FIG. 4 in which reselection of thumbnail is possible.

If an image taken by another person is displayed on display 40 as display image 71, public box or member box is ticked at scope section 53. Favorite button 77 is to be operated if the first user wants to designate display image 71 as favorite. And display image 71 is easily registered as favorite image, favorite box at scope section 53 being automatically ticked in response to the operation of favorite button 77. Thus, display image 71 thus designated and registered will be hit if a search will be made with favorite box ticked as the searching condition.

Figure 6:
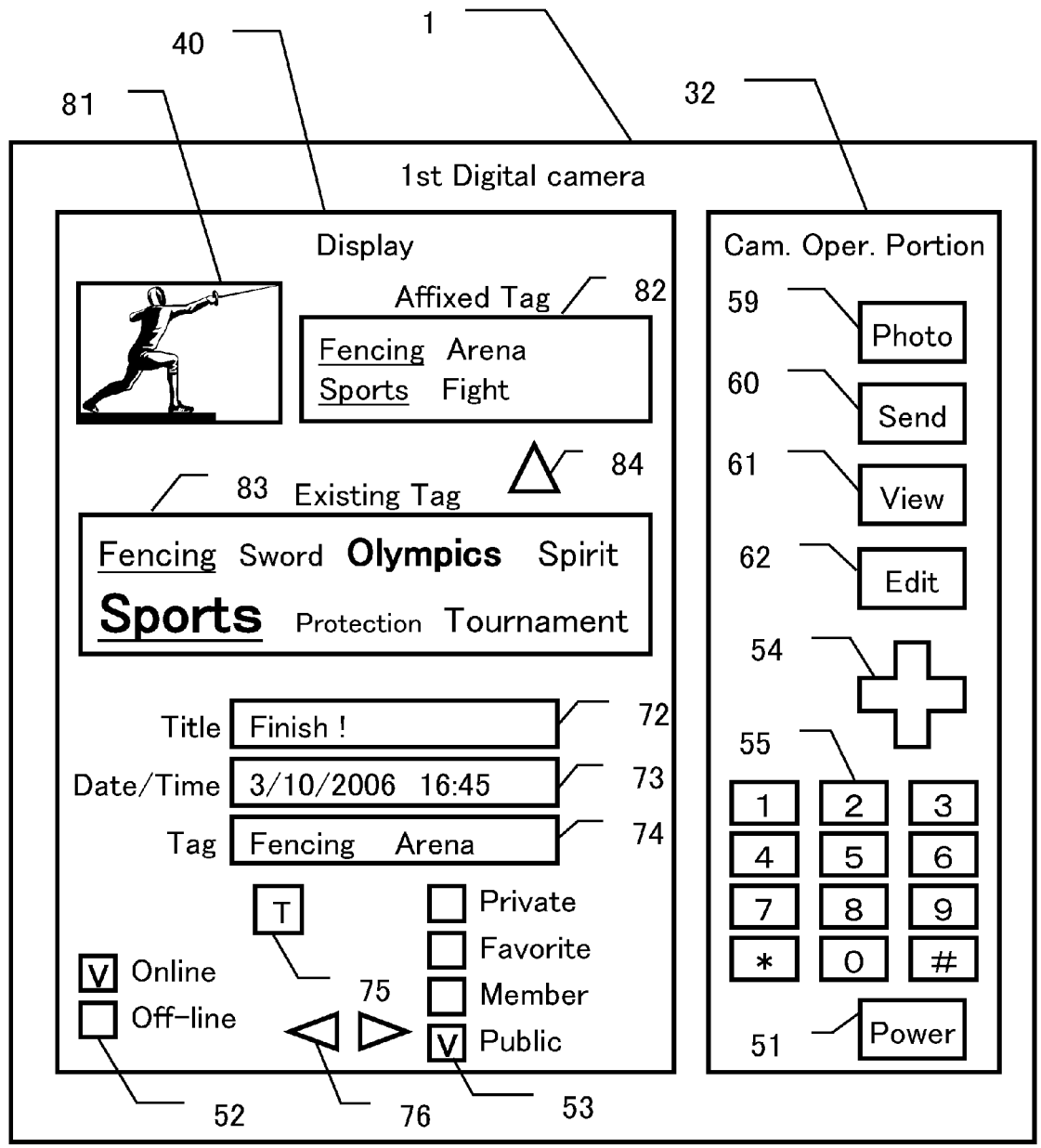
FIG. 6 is a schematic external view of a principal part of the digital camera in the playback mode, which is similar to FIGS. 4 and 5 except for what is displayed on monitor.

FIG. 6 is a schematic external view of a principal part of the digital camera 1 in the playback mode, which is similar to FIGS. 4 and 5 except for what is displayed on display 40. In other words, FIG. 6 shows display 40 in attribute edit mode caused by operation of attribute edit button 62 in FIG. 5 with display image 71 displayed. Favorite button 77 is not displayed in FIG. 6 for avoiding confusion. The same numeral is used for identifying the same element throughout FIG. 4 to FIG. 6, duplicate explanation being omitted in FIG. 6.

Display image 71 in FIG. 5 is displayed in FIG. 6 as reduced size image 81 with its attribute such as title, tags and scope section selection being made editable. In contrast, title, tags and scope section selection cannot be edited in FIG. 5 though favorite designation can be made.

In editing title of image 81 in FIG. 6, arrow key 54 or numeric keypad 55 is operated to rewrite title box 72.

Also in editing tags affixed to image 81 in FIG. 6, arrow key 54 or numeric keypad 55 is operated to rewrite tag box 74. Further, affixed tag window 82 and existing tag window 83 are prepared in display 40 for assisting the first user in editing tags for the purpose of boosting the chance for the own image laid open to the public to become popular. In this view point, public box is ticked at scope section 53. Though the advantage is less, however, affixed tag window 82 and existing tag window 83 can also be operable with member box or private box ticked at scope section 53.

All tags affixed to displayed image 81 are shown in affixed tag window 82. On the other hand, tags identical with or resembling or relating to any of tags in affixed tag window 82 are automatically searched and shown in existing tag window 83. Most of such tags in existing tag window 83 are not originated by the first user, but by others. Identical tags between affixed tag window 82 and existing tag window 83 are distinguished form other tags with underline or different color. For example, "fencing" and "sports" are underlined in both affixed tag window 82 and existing tag window 83 since they are identical with each other. Tags in existing tag window 83 are of different font size depending on their popularities which are determined by integrated image administration server 6 counting the frequency of affixing of each tag, respectively. For example, "sports" in the largest font size is the most popular tag, and "Olympics" is the second in FIG. 6.

The first user, who wants own image to be viewed by others as many as possible through integrated image administration server 6, can change tags with the relation of affixed tag window 82 to existing tag window 83 taken into consideration. For example, the first user can know from existing tag window 83 that there is no image uploaded by another with the tag, "fight" affixed to reduced size image 81. And, if the first user thinks that reduced size image 81 has less chance of being hit by others with the tag, "fight", the fist user may operate arrow key 54 or numeric keypad 55 to delete or replace the tag, "fight". Alternatively, the first user may leave the tag, "fight" undeleted since there is no limitation to the number of tags for one image.

Further, the first user can know from existing tag window 83 that other images uploaded with the tag, "sword" which relates to "fencing" and that "spirit" or "tournament" which may have some relation to "fight" have been affixed to some images of others. Thus, the first use can add at least one of "sword", "spirit" and "tournament" to affixed tag window 82 if he or she thinks such addition may boost the chance for reduced size image 81 of being hit by others. The addition of one of tags, e.g., "sword", in existing tag window 83 into affixed tag window 82 can be easily done by operating copy button 84 with "sword" selected in existing tag window 83 by arrow key 54 or numeric keypad 55.

On the other hand, the first user can know that many images are uploaded by others with the tag, "sports" which is very popular in existing tag window 83. Thus, if the first user thinks that reduced size image 81 has less chance of being selected among a great number of images which will be hit by others with the tag, "sports", the fist user may operate arrow key 54 or numeric keypad 55 to delete or replace the tag, "sports". Since the popular tag has double meaning that great number of images will be hit with the popular tag as well as that many persons will conduct search with the popular tag. So, it is also reasonable not to delete "sports", but rather to add a popular tag such as "Olympics" in existing tag window 83 into affixed tag window 82 to increase the chance for reduced size image 81 to be hit by others. Especially, the popular tags are useful in combination with other specific tag.

As has been understood, the display of both existing tag window 83 and affixed tag window 82 in a comparable manner, the indication with underline or different color of relationship between tags in existing tag window 83 and affixed tag window 82, and the copy of tag form existing tag window 83 to affixed tag window 82 are very useful assistance for tag edition.

The functions of causing the display layout on display 40 in the playback mode such as shown in FIG. 4 to FIG. 6 can also be effective even if the first digital camera 1 is not within the communication range of any access point. In other words, the display layout in the playback mode is controlled not only by integrated image administration server 6 online, but also by the display software downloaded form integrated image administration server 6 and installed in memory 41 of the first digital camera 1, which functions even if the first digital camera 1 is not connected to integrated image administration server 6.

Accordingly, if the display layout controlled by integrated image administration server 6 online is improved, the corresponding new display software is automatically downloaded to update the memory 41, which makes it possible for the first digital camera 1 to control the display in accordance with the most recent layout even in off-line state. Thus, the display layout in the playback mode of the first digital camera 1 continuously and automatically evolves after the first digital camera 1 is bought.

The substantially same display layout in the playback mode throughout the online state and the off-line state of the first digital camera 1 makes it possible for the first user to operate the first digital camera 1 in the same manner regardless of whither the first digital camera 1 is in online state or in off-line state. The above feature of this invention that operations in the online state are substantially the same as those in the off-line state, which is familiar in conventional digital cameras, is advantageous to remove the barrier otherwise getting in the way of the ordinary user to enjoy the digital camera within an online system.

As mentioned above, the basic display layout in the playback mode does not change throughout the online state and the off-line state. However, partial differences are naturally caused or intentionally made for avoiding confusion.

In FIG. 4 or FIG. 5 for example, the member box and the public box at scope section 53 are made unseen or pale with off-line box ticked at online/off-line indicator 52. Further, it is needless to say that the hit thumbnails or images displayed on display 40 are the result of searching into image data left in image storage portion 35 within the first digital camera 1.

In FIG. 6, on the other hand, the member box and the public box at scope section 53 are indicated in the normal manner for accepting edition even if the off-line box ticked at online/off-line indicator 52. In other words, the edition at scope section 53 as to the image 81 is possible even in off-line state. Existing tag 83, however, is not displayed with off-line box ticked at online/off-line indicator 52 since no information of existing tags is obtainable in off-line state. Further, the underline in affixed tag 82 for some tag, such as "fencing" is not indicated in off-line state.

The result of edition made during off-line state will be automatically transmitted to the first picture archiving and communication system 5 when the first digital camera 1 will come into the communication range of some access point. And, the searching result will be automatically updated with the new edition incorporated.

Figure 7:
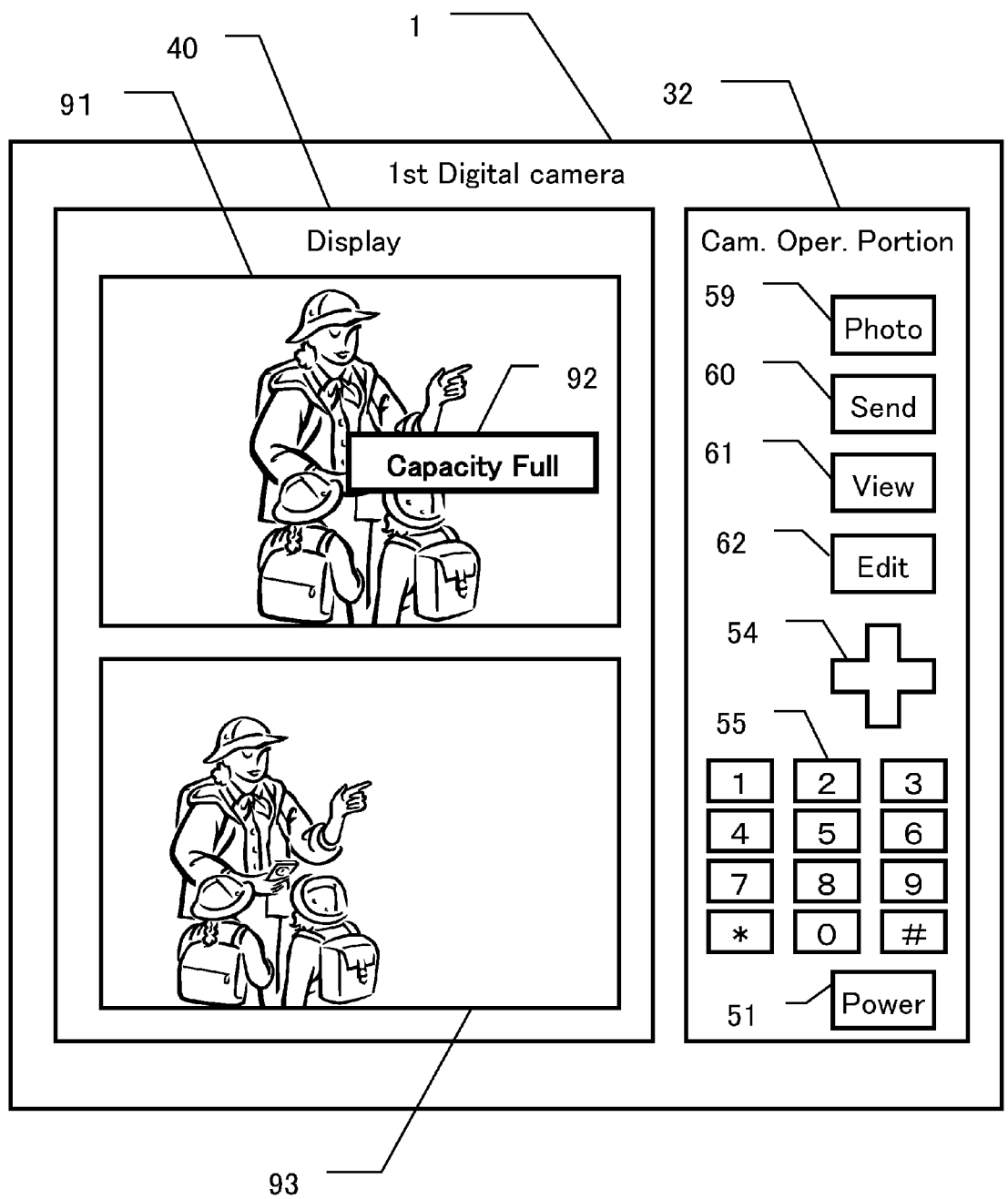
FIG. 7 is a schematic external view of a principal part of the digital camera in the photo taking mode, which is similar to FIGS. 4 and 5 except for what is displayed on monitor.

FIG. 7 is a schematic external view of a principal part of the digital camera 1 in the photo taking mode, which is similar to FIGS. 4 and 5 except for what is displayed on display 40. In other words, FIG. 7 shows display 40 in photo taking mode, which is caused by pushing photo button 59 in half in one of the conditions of FIG. 4 to FIG. 6 to switch the first digital camera 1 from the playback mode to the photo taking mode. Display 40 in the photo taking mode of FIG. 7 displays video image 91 which is currently taken by image taking portion 33. The same numeral is used for identifying the same element throughout FIG. 4 to FIG. 6, duplicate explanation being omitted in FIG. 6.

The video image 91 on display 40 in the photo taking mode helps the first user to decide the framing of the picture to be taken by the first digital camera 1. If the first user pushed photo button 59 in full with the framing satisfactory, the image data taken by image taking portion 33 corresponding to video image 91 is processed by image processor 34 to be recorded in image storage portion 35.

The image data store in image storage portion 35 is to be automatically transmitted form local wireless communicator 39 to the first picture archiving and communication system 5 by way of wireless access point 3.

If the first digital camera 1 cannot come into the communication range of access point 3 in spite of little room left in image storage portion 35 for overwriting new image data, caution 92 is overlapped on video image 91 in display 40 for informing the first user of the full capacity which needs a sending of the taken image data to secure room for the new image data. If the first user at the appearance of the caution 92 pushes send button 60, the digital camera 1 is automatically connected to his or her mobile phone with local wireless communicator 39 so that the mobile phone automatically calls a predetermined server on Internet 4 to send the image in image storage portion 35 to the first picture archiving and communication system 5.

Alternatively, the first digital camera 1 is so prepared in response to the case causing caution 92 to automatically connect to and control the mobile phone to send the image in image storage portion 35 to the first picture archiving and communication system 5 through Internet 4 by way of the mobile phone.

Caution 92 is made in two steps, the preliminary caution and emergent caution. The following description is for explaining these two steps of cautions.

A part of the capacity of image storage portion 35 is assigned to the display image data in a size suitable for displaying on display 40. An old display image data which can be overwritten will be replaced by a new display image data if the assigned capacity of image storage portion 35 is full. Since the display image data has been kept by the first picture archiving and communication system 5 for being downloaded upon request, it is basically needless to keep the display image data in image storage portion 35 in duplicate. However, above mentioned capacity is secured for keeping the display image data of high possibility of being viewed again in case the camera will go out of communication range of any access point. On the other hand, majority part of the capacity of image storage portion 35 is secured for recording main image data of full-size to be newly taken.

On the assumption of capacity assignment above, if the capacity secured for the main image data to be newly taken becomes full with no opportunity available for sending the already taken main image data to the first picture archiving and communication system 5, a preliminary caution such as "Capacity full, but additional 5 shots possible if replaceable display image data deleted" is given as caution 92. This means that the photograph itself can be taken by cutting into the capacity assigned to the display image data even though the already taken main image data is not sent at once by means of mobile phone connection. Thus, photo taking action can be continued with such a preliminary caution being made if the shutter chance is preferred than securing capacity assigned to the main image data.

On the other hand, if the capacity of image storage portion 35 becomes full with all available capacity assigned to the display image data consumed, an emergent caution such as "Capacity absolutely full!" to recommend the first user to send at once the already taken main image data to the first picture archiving and communication system 5 by means of mobile phone connection to secure capacity for new main image data to be taken.

In place of making the above mentioned two steps of cautions, it is possible to display two levels of indication of remaining capacity. In other words, in the first level of indication, the remaining capacity of image storage portion 35 assigned to the main image data is displayed. And, when the capacity assigned to the main image data becomes full to have to cut into the capacity assigned to the display image data, the indication is automatically switched from the first level to the second level to display the available capacity assigned to the display image data. For distinguishing the second level of indication from the first level, the color of indicating remaining capacity is changed.

In addition to the remaining capacity indication for image storage portion 35 in the first digital camera 1, the remaining capacity in the first picture archiving and communication system 5 secured for the first user under the contract with the first picture archiving and communication system 5 is to be indicated.

Above indication of the remaining capacity for image data and necessary caution about the remaining capacity will be explained later in more detail.

Display 40 in FIG. 7 further shows auxiliary window 93 for displaying the last taken image. Therefore, the first user can decide the new framing of the picture to be taken by means of comparing video image 91 with the latest taken image in auxiliary window 93.

If the setting of the first digital camera 1 is changed, it is possible to display in auxiliary window 93 the last image data appearing in the playback mode such as in FIG. 5 before switching to the photo taking mode. According to such a setting, the first user can compare video image 91 with the similar photograph of own or another searched in the playback mode to decide the framing of the picture to be taken by the first digital camera 1.

Figure 8:
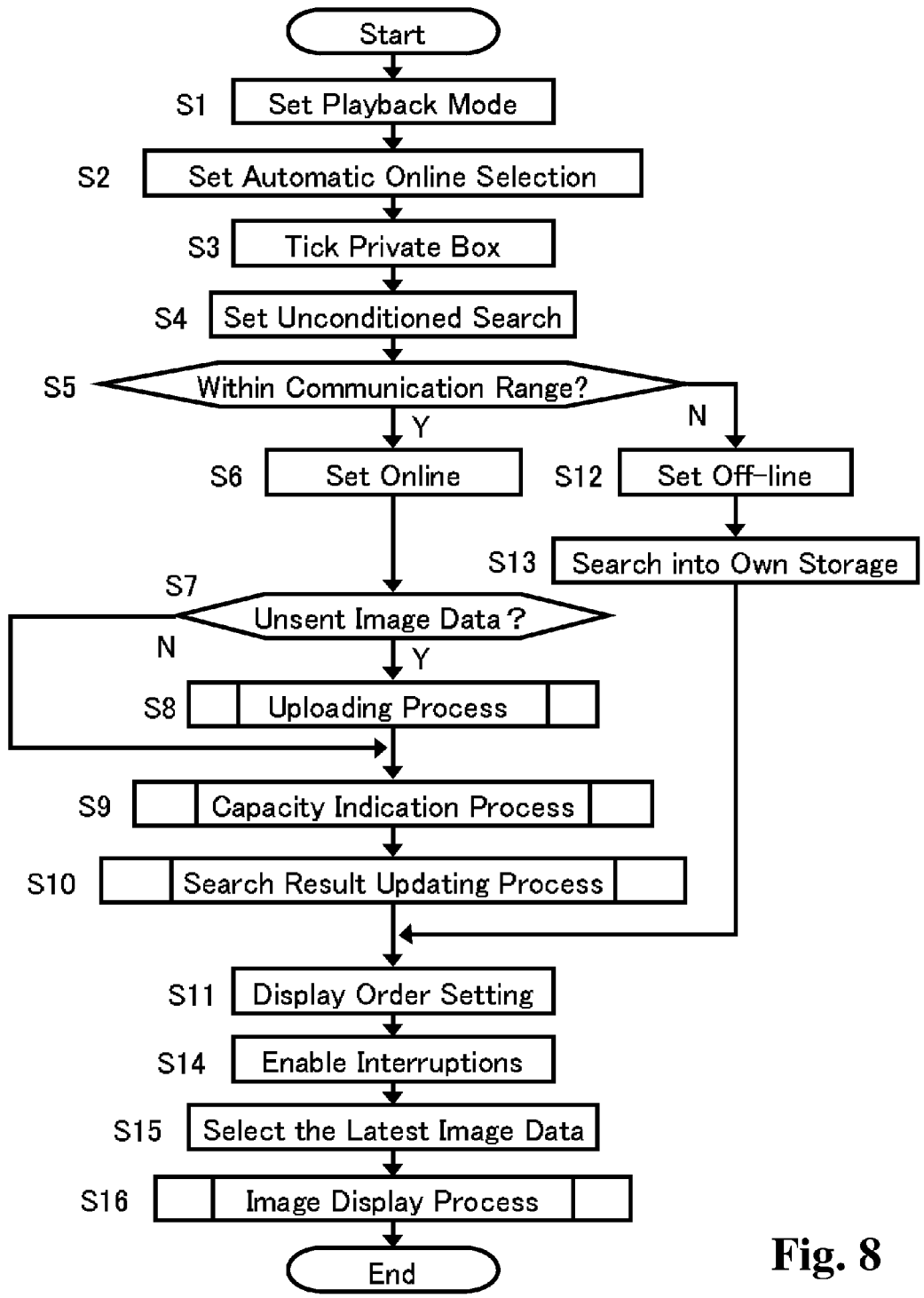
FIG. 8 is a flow chart of the basic function of camera controller in the first digital camera of the first embodiment in FIG. 3.

FIG. 8 is a flow chart of the basic function of camera controller 31 in the first digital camera 1 of the first embodiment in FIG. 3. The flow chart shows various functions when the first digital camera is turned ON.

The flow in FIG. 8 starts when power button 51 is operated to go to step S1, in which the playback mode is automatically set. The flow then goes to step S2, in which automatic online selection is set. The automatic online selection means the function of automatically switching between online/off-line settings, in which the online state is set in automatic response to the detection that the first digital camera comes into the communication range of a wireless access point, while the off-line state is set in automatic response to the detection that the first digital camera is not within the communication range of any wireless access point.

In manual online selection setting, on the contrary, the first digital camera 1 would not be switched to online state as long as the off-line box is ticked at online/off-line indicator 52 even if the first digital camera comes into the communication range of a wireless access point. So, if the online state is desired, online box at online/off-line indicator 52 is to be manually ticked with the first digital camera within the communication range of a wireless access point. Even if online box at online/off-line indicator 52 is manually ticked with the first digital camera outside the communication range of any wireless access point, the first digital camera would not respond to such manual operation, but makes a caution of outside the communication range for the first user to understand the reason why online/off-line indicator 52 cannot be changed.

If the first digital camera 1 is made online state through any course of the automatic or manual online selections, the ID and password is automatically sent from the first digital camera 1 to the first picture archiving and communication system 5 and integrated image administration server 6 to automatically make the first digital camera 1 into logon state with them.

After the automatic online selection setting in step S2, the flow advances to step S3 to automatically tick the private box at scope section 53. Further in step S4, the flow automatically sets the unconditioned search, in which "None" is automatically input in condition box 56 and with no tick in any of the boxes at combination designator 57. Thus, integrated image administration server 6 can search into all images with user ID of the first user In step S5, it is checked whether or not the first digital camera is within the communication range of any wireless access point. And, if it is detected that the first digital camera is within the communication range of some wireless access point, the flow advances to step S6 to set the first digital camera into online state.

Next, in step S7 it is checked whether or not image storage portion 35 keeps image data which has not been sent to the first picture archiving and communication system 5 yet. If there has been no chance for the first digital camera 1 to become online state after the photograph has been taken in off-line state, image storage portion 35 keeps such image data. In this case, the flow advances to step S8 to carry out the uploading process, in which the unsent image data is uploaded to the first picture archiving and communication system 5 through Internet. The flow then goes to step S9. On the other hand, if is not detected in step S7 that image storage portion 35 keeps unsent image data, the flow directly goes to step S9.

In step S9, the capacity indication process is carried out to update the change in the remaining capacity caused by step S8 or laps of predetermined time. The uploading process in step S8 and the capacity indication process will be explained later in more detail.

Next in step S10, the search result updating process is carried out to get the latest result of the search conducted by integrated image administration server 6 through Internet 4. Then the flow advances to step S11, in which the order of displaying the search result is set so that the hit thumbnails are displayed in the order of the photo taking date and time from the latest. The hit thumbnails include the image data uploaded in step S8. The display order set in step S11 can be set alternatively in the order of the photo taking date and time from the oldest, or the alphabetical order of the title or tag for the image data.

On the other hand, if it is not detected in step S5 that the first digital camera is within the communication range of some wireless access point, the flow advances to step S12 to set the first digital camera into off-line state. The flow then goes to step S13 to have camera controller 31 search into own image storage portion 35, the flow then going to step S11 to set the order of displaying the search result so that the hit thumbnails are displayed in the order of the photo taking date and time from the latest.

Following to step S11, the flow advances to step S14 to enable various interruptions. The enabled interruption includes a jump to the display in FIG. 4 caused by the operation of thumbnail button 75 since the function of flow in FIG. 8 is according to such a setting that the first digital camera 1 is turned ON in the playback mode to directly display image 71 as in FIG. 5 if power button 51 is operated.

For the reason above, the flow advances to step S15, in which one image data with the latest photo taking date and time is automatically selected among all of possibly a plurality of hit image data as the result of the search. Next in step S16, image display process is carried out to prepare display image 71 and display the same as in FIG. 5. The image display process will be explained later in detail. The flow in FIG. 8 then terminates to make the first digital camera 1 into the standby state.

Figure 9:
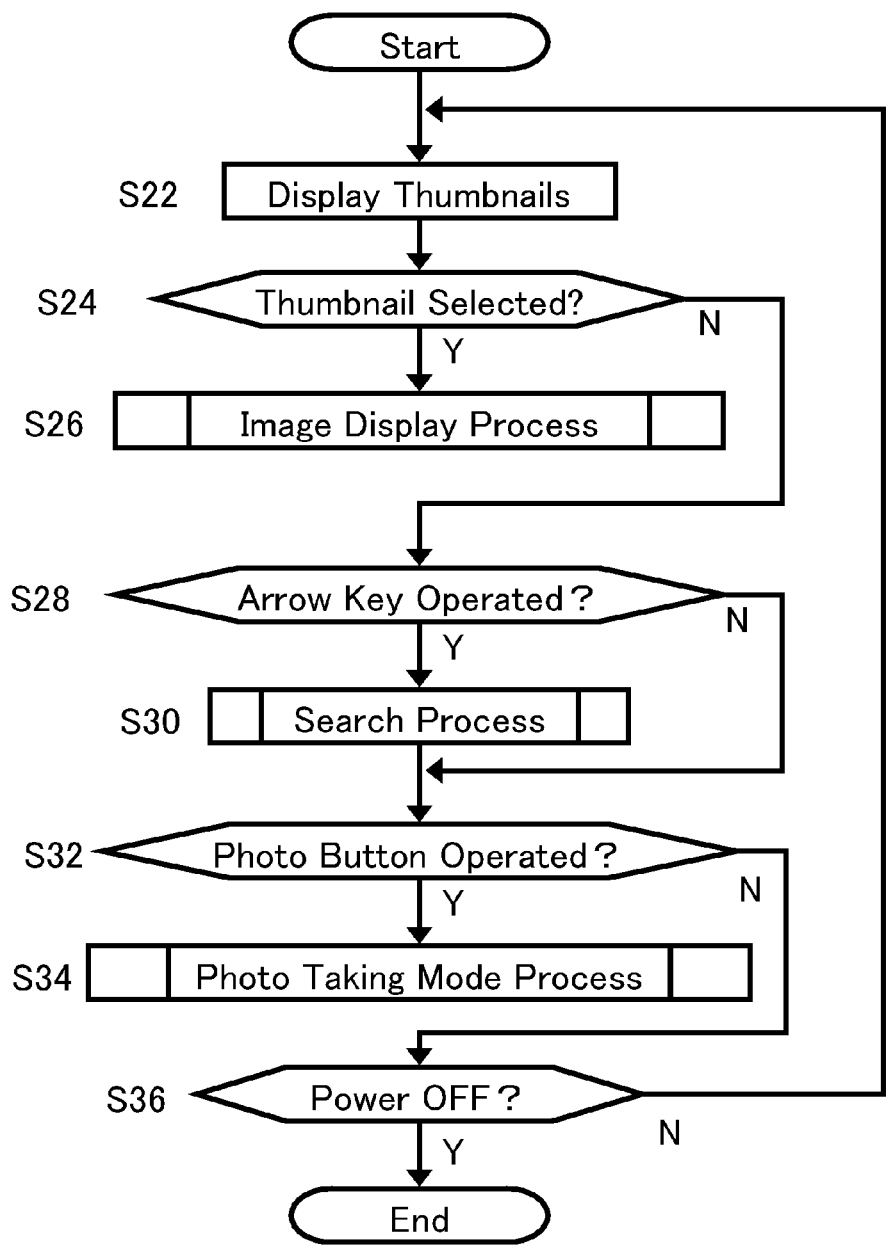
FIG. 9 is a flow chart of the function of camera controller when thumbnail button is pushed in the display condition in FIG. 5.

FIG. 9 is a flow chart of the function of camera controller 31 when thumbnail button 75 is pushed in the display condition in FIG. 5. If the flow of FIG. 9 starts in response the push of thumbnail button 75, thumbnails hit by the search are displayed in step S22 to result in the display of FIG. 4. The display layout in FIG. 4 is the same regardless of whether the search into the images has been done in accordance with search result updating process in S10 or search into own memory in step S13 of the flow in FIG. 8

Next in step S24, it is checked whether or not one of thumbnails 58 is selected within a predetermined time period. And, if a thumbnail selection is detected in step S24, the flow goes to step S26, in which image display process is carried out. On the other hand, if any thumbnail selection is not detected in step S24 within the predetermined time period, the flow goes to step S28.

In step S28, it is checked whether or not any operation relating to a search is done. In detail, it is checked in step S28 whether or not arrow key 54 is operated. If an operation of arrow key is detected in step S28, the flow goes to step S30 to carry out search process, the flow then going to step S32. The search process in step S30 will be explained later in more detail. On the other hand, if any operation for search is not detected in step S28, the flow directly goes to step S32.

In step S32, it is checked whether or not any operation of photo button 59 is done. If some operation of photo button 59 is detected in step S32, the flow goes to step S34 in which the photo taking mode process is carried out. The photo taking mode process will be explained later in more detail.

If any operation of photo button 59 is not detected in step S32, the flow goes to step S36 to check whether or not the first digital camera 1 is turned OFF by operating power button 51. If no power OFF operation is detected in step S36, the flow returns to step S22 to repeat a loop of step S22 to step S36 unless any operation is detected in step S24 or step S32 or step S36. If a new search process is carried out in step S30 during the repetitions of the loop of step S22 to step S36, the display of thumbnails in step S22 is updated in accordance with a new result of the search. On the other hand, if power OFF operation is detected in step S36, the flow goes to the end.

As has been mentioned, the above explanation of FIG. 8 and FIG. 9 is made according to such a setting that the first digital camera 1 is turned ON in the playback mode to directly display image 71 as in FIG. 5 if power button 51 is operated. On the other hand, if the first digital camera 1 is set to be turned ON in the playback mode to display hit thumbnails 58 as in FIG. 4 in response to the operation of power button 51, the flow of FIG. 8 automatically jumps from step S14 to step S22 of FIG. 9. In other words, the flow of FIG. 9 automatically stars following step S14 of FIG. 8.

Figure 10:
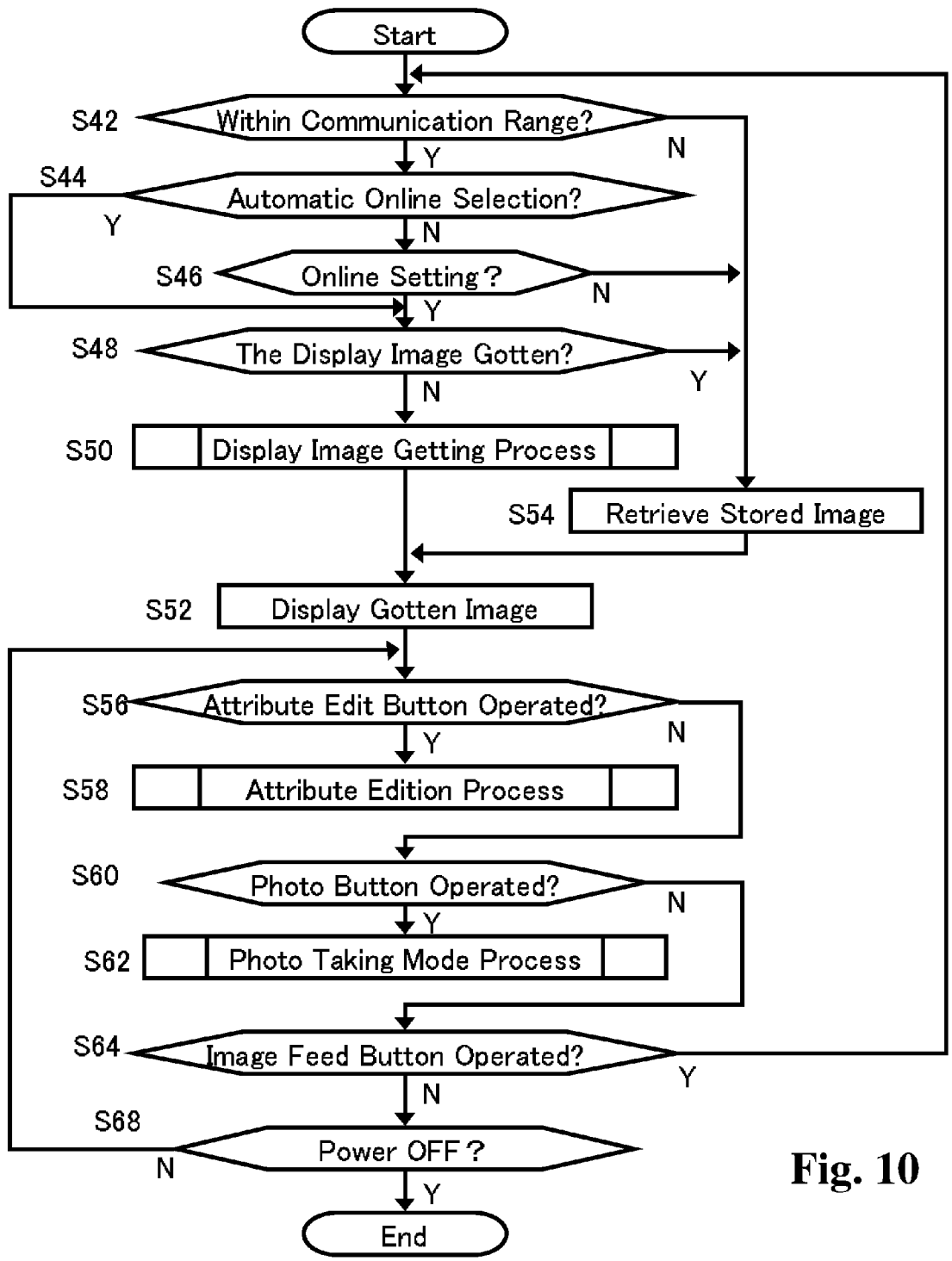
FIG. 10 is a flow chart showing the detail of the image display process in step S16 of FIG. 8 and step S26 of FIG. 9.

FIG. 10 is a flow chart showing the detail of the image display process in step S16 of FIG. 8 and step S26 of FIG. 9. If the flow starts, it is checked in step S42 whether or not the first digital camera 1 is within the communication range of any of wireless access points. If it is determined in step S42 that the first digital camera 1 is within the communication range, the flow advances to step S44 to check whether or not the automatic online selection is set. If not, the flow goes to step S46 to check whether not the online setting is manually selected. If it is determined in step S46 that the online setting is manually selected, the flow then going to step S48. On the other hand, if it is determined in step S44 that the automatic online selection is set, the flow directly goes to step S48.

Next in step S48, it is checked whether or not the selected display image data has been gotten to be kept in image storage portion 35. If not, the flow goes to step S50 in which display image getting process is carried out. In step S48, even if the selected image was once gotten, it is determined that the selected image data has not been gotten if the selected image data once gotten has gone due to be overwritten by another display image.

In the display image getting process in step S50, the connection jumps from URL for displaying hit thumbnails provided by integrated image administration server 6 to URL for displaying the selected image provided by the first picture archiving and communication system 5, the display image data at the latter URL being downloaded to keep in image storage portion 35. Next, in step S52, the display image data gotten through step S52 is displayed on display 40, which results in the display layout in FIG. 5 showing display image 71 with attribute data 53 and 72 to 74.

On the other hand, if it is not determined that the first digital camera 1 is within the communication range of any access point, the flow advances to step S54 to retrieve selected display image data from image storage portion 35. In this case, the selected image data is stored in image storage portion 35 without fail since the search in step S13 is conducted only into image storage portion 35 which is caused by determination in step S5 that the first digital camera 1 is not within the communication range of any access point. The flow then advances from step S54 to step S52, in which the display layout in FIG. 5 is also caused to show display image 71 with attribute data 53 and 72 to 74.

As is apparent from the above, the display layout in FIG. 5 does not alter depending on whether the first digital camera 1 is in the online state or the off-line state except for the tick at online/off-line indicator 52. Thus, the first user can enjoy the display mode with no attention paid to whether the first digital camera 1 is in the online state or the off-line state unless the first user intentionally wants to change the tick at online/off-line indicator 52. Further, since the operation of the first digital camera 1 is the same both in online state and in off-line state, the first user can operate the first digital camera as if it were a conventional digital camera with no special operations in the online state necessary.

Further, if the display layout in FIG. 5 is changed due to an upgrading of the software in the first picture archiving and communication system 5 or the like, the upgraded display software is simultaneously and automatically downloaded to be kept in memory 41. Thus, even in off-line state, the digital camera 1 carries out the display mode according to the upgraded software in memory 41. So, the common display layout between the online state and the off-line state is kept in tune with each other without any difference caused by an upgrading.

The common layout and its simultaneous maintenance between online state and off-line state are not only true in the display image layout of FIG. 5, but also in the thumbnails layout of FIG. 4.

To return to the explanation of the flow, if it is not determined in step S46 that the online setting is manually selected although the first digital camera 1 is within the communication range, there is no need to newly get the display image. Similarly, if it is determined in step 48 that the selected display image data has been gotten to be kept in image storage portion 35, there is no need to further get the display image. So in both cases the flow goes to step S54 to retrieve selected display image data from image storage portion 35.

As has been understood, there is theoretically no need to get the selected display image data if it has been gotten to be kept in image storage portion 35. However, provided that the baud rate of data transmission from the first picture archiving and communication system 5 to the first digital camera 1 is extremely high, such a modification may be possible that the first digital camera 1 is to get the selected display image data by means of step S50 even if it has been gotten into image storage portion 35. This may update the same display image data in image storage portion 35 in accordance with a possible refinement made on the same display image data in the first picture archiving and communication system 5.

It is possible to design the first digital camera 1 so that the first user can predetermine whether or not to carry out step 50 when the selected display image data has been gotten to be kept in image storage portion 35.

After displaying image 71 with attribute data 53 and 72 to 74 in step S24, the flow goes to step S56 to check whether or not attribute edit button 62 is operated. If done, the flow goes to step S58 to carry the attribute edition process. The attribute edition process in step S58 will be explained later in detail. On the other hand, if it is not detected in step S56 that attribute edit button 62 is operated, the flow goes to step S60.

In step S60, it is checked whether or not photo button 59 is operated. If done, the flow goes to step S62 to carry the photo taking mode process. On the other hand, if it is not detected in step S60 that photo button 59 is operated, the flow goes to step S64.

In step S64, it is checked whether or not one of the pair of image feed buttons 76 is operated. Also in step S64, if the image feeding operation is done, a new display image is selected in accordance with the image feeding direction determined by the operated one of the pair of image feed buttons 76. In other words, the last or the next image data in the order set in step S11 of FIG. 8 is selected in dependence on which one of the pair of image feed buttons 76 is operated. Upon the completion of selecting the new display image, the flow returns to step 42 to display the new display image in accordance with the already explained process in step 42 to step S52

Thus, the display image 71, scope section 53, title box 72, photo taking date and time box 73 and tag box 74 are replaced by new display image data and its attributes with the layout of display 40 in FIG. 5 taken over.

If it is not detected in step S64 that any of the pair of image feed buttons 76 is operated, the flow advances to step 68 to whether or not the first digital camera 1 is turned OFF by operating power button 51. If no power OFF operation is detected in step S68, the flow returns to step S56 to repeat a loop of step S56 to step S68 unless any operation is detected in step S56 or step S60 or step S64 or step S68. On the other hand, if power OFF operation is detected in step S68, the flow goes to the end.

Figure 11:
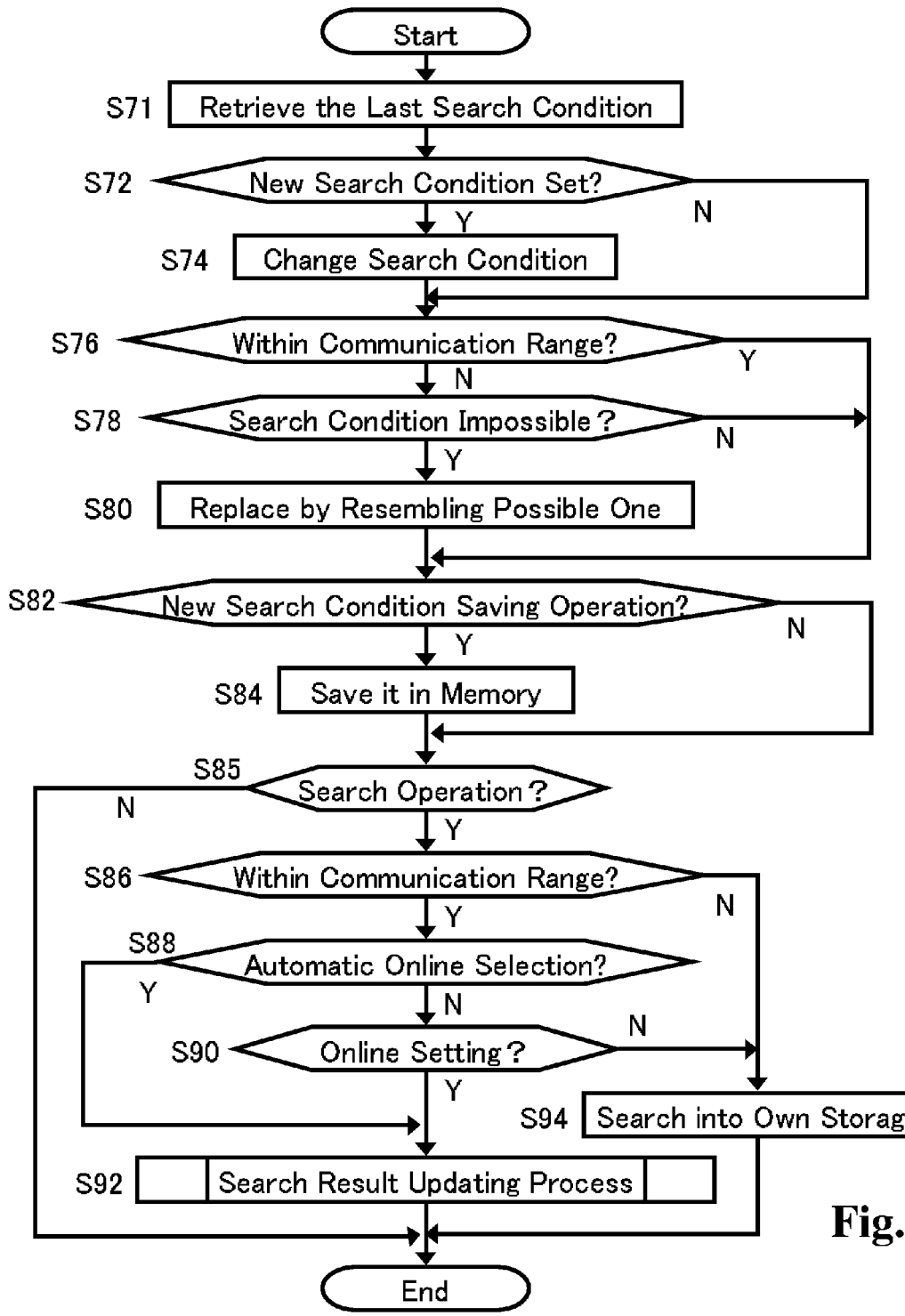
FIG. 11 is a flow chart showing the detail of the image search process in step S30 of FIG. 9.

FIG. 11 is a flow chart showing the detail of the image search process in step S30 of FIG. 9. If arrow key 54 is operated, the flow in FIG. 10 starts to go to step S71 to retrieve the last search condition, which is stored in memory 41. Next, in step 72 it is checked whether or not any new search condition is set by arrow key 54 or numeric keypad 55. If a new search condition is set, the flow goes to step S74 to replace the retrieved last condition by the set new search condition to go to step S76. On the other hand, if it is not detected that any new search condition is set, the flow directly goes to step S76 with the retrieved last search condition kept.

In step S76, it is checked whether or not the first digital camera 1 is within the communication range of any of wireless access points. If it is not detected that the first digital camera 1 is within the communication range, the flow goes to step S78 to check whether or not the set search condition is impossible outside the communication range. In the case of impossible search condition, the flow goes to step S80 to automatically replace the impossible search condition by a possible search condition which resembles the impossible condition. For example, if the search condition includes a tick in the member box or the public box at scope section 53, the tick is automatically changed into the private box or the favorite box, the manner of such automatic change being predetermined in detail if desired. The automatic replacement of search condition can be predetermined to be occur in condition box 56.

Thus, even in a case that no new search condition setting is detected in step S72, there can be a case that the retrieved last search condition is replaced by a new one to automatically follow a change such as the switching from the online state to off-line state. This automatic replacement of search condition, of course, automatically occurs if a new search condition, which is set by arrow key 54 or numeric keypad 55 and detected in step S72, is an impossible search condition in the off-line state.

Thus, the automatic replacement of search condition means an inhibition of setting an impossible search condition in the off-line state when the fist digital camera 1 is outside the communication range of any of wireless access points.

Following step S80, the flow advances to step S82. On the other hand, the flow directly advances to step S82 if it is detected in step S76 that the first digital camera 1 is within the communication range of some wireless access point, or if it is detected in step S78 that the set search condition is possible even outside the communication range.

In step S82, it is checked whether or not an operation is done to save the new search condition. If done, the flow advances to step S84 to save the new search condition in memory 41, the flow then going to step S85. On the other hand, the flow directly goes to step S85 if it is not determined in step 82 that any operation is done to save the new search condition.

In step S85, it is checked whether or not the operation of arrow key 54 done is the pushing down thereof to direct the search. If the operation is the pushing down of arrow key 54, the flow advances to step S86 to check whether or not the first digital camera 1 is within the communication range of any of wireless access points. If within the communication range, the flow advances to step S88 to check whether or not the automatic online selection is set. If not, the flow goes to step S90 to check whether or not the online setting is manually selected. If it is detected in step S90 that the online setting is selected, the flow advances to step S92. On the other hand, the flow directly advanced to step S92 if it is determined in step S88 that the automatic online selection is set.

In step S92, the search result updating process is carried out to get the latest result of the search conducted by integrated image administration server 6 through Internet 4. In more detail, the new search condition is sent to integrated image administration server 6, which in response thereto sends back the new search result to the first digital camera 1. If the search result has been gotten, the flow goes to the end.

On the other hand, if it is not detected in step S86 that the first digital camera is within the communication range of any wireless access point, the flow advances to step S94 to have camera controller 31 search into own image storage portion 35. If the search has been completed, the flow goes to the end. If it is not detected in step S85 that the operation of arrow key 54 done is the pushing down thereof to direct the search, the flow instantly goes to the end since the operation of arrow key 54 done is merely caused in the course of setting search condition.

If it is not determined in step S90 that the online setting is manually selected although the first digital camera 1 is within the communication range, the flow goes to step S94 to have camera controller 31 search into own image storage portion 35. If the search has been completed, the flow goes to the end.

If the flow of FIG. 11 goes to the end in any of the causes above, the flow leads to step S32 in FIG. 9, which repeats the loop of step S22 to step S36 unless any operation is detected in step S24 or step S32 or step S36. So, if an operation of arrow key 54 is detected in step S28, the flow of FIG. 11 is also repeated.

Figure 12:
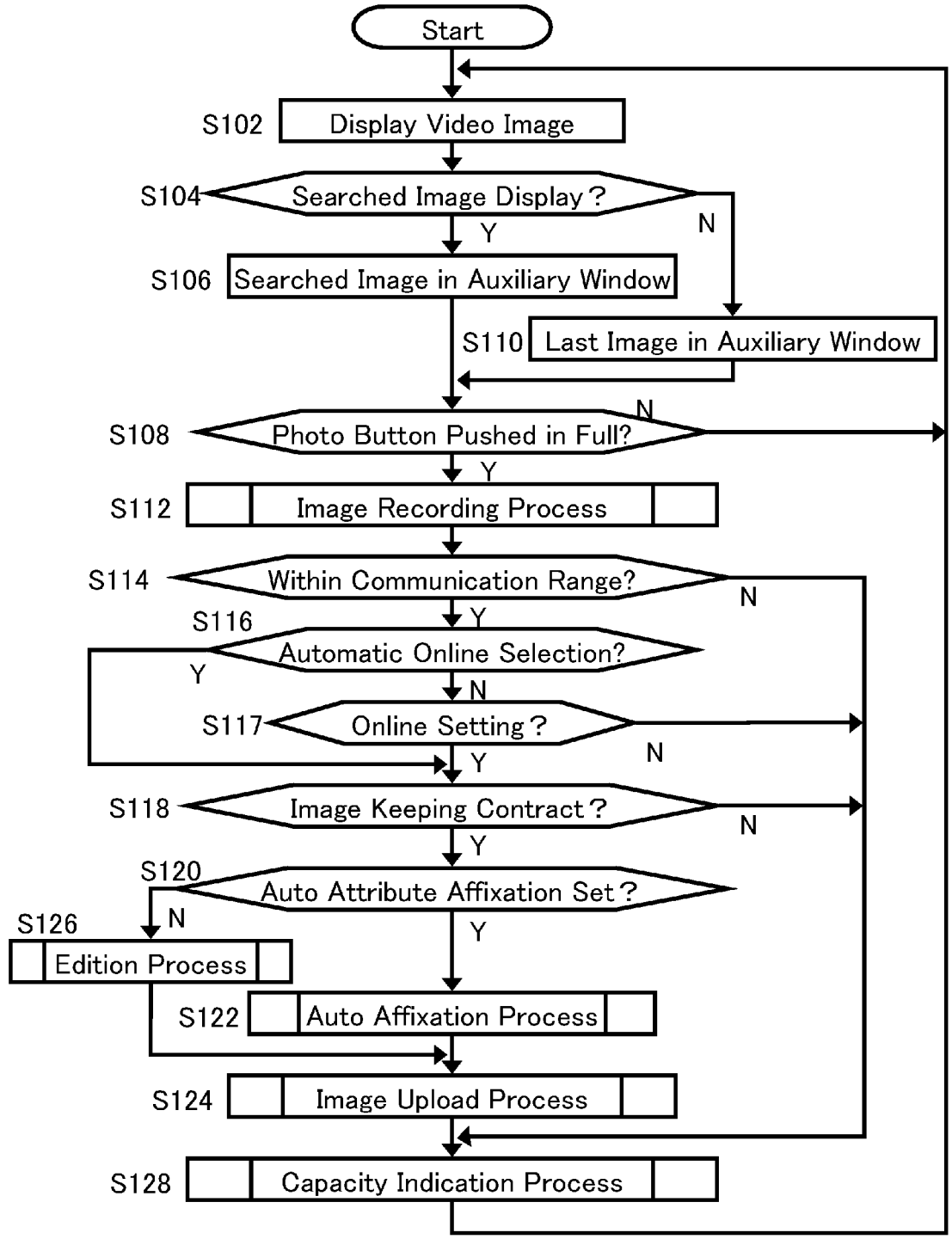
FIG. 12 is a flow chart showing the detail of the photo taking mode process in step S34 of FIG. 9 and step S62 of FIG. 10.

FIG. 12 is a flow chart showing the detail of the photo taking mode process in step S34 of FIG. 9 and step S62 of FIG. 10. If it is detected in step S32 of FIG. 9 or step S60 of FIG. 10 that photo button 59 is pushed in half, the photo taking mode process in FIG. 12 starts to go to step S102 in which display 40 displays video image 91 which is currently taken by image taking portion 33.

Next in step S104, it is checked whether or not the first digital camera 1 is set to display the searched image in the auxiliary window 93. If such a setting is done, the flow advances to step S106 in which the first digital camera 1 displays in auxiliary window 93 the last display image 71 appearing as the result of the search in the playback mode such as in FIG. 5 before switching to the photo taking mode. Then, the flow goes to step S108.

On the other hand, if it is not detected in step S104 that the first digital camera 1 is set to display the searched image in the auxiliary window 93, the flow goes to step S110 in which the first digital camera 1 displays the last taken image in auxiliary window 93. Then, the flow also goes to step S108.

In step S108, it is checked whether or not photo button 59 is pushed in full. If so, the flow goes to step S112 to carry out the image recording process. In more detail, the image data taken by image taking portion 33 is processed by image processor 34 to be recorded in image storage portion 35 in step S112. The image recording process in step S112 will be explained later in more detail. On the other hand, if it is not detected in step S108 that photo button 59 is pushed in full, the flow returns to step S102 to repeat afterward the loop of step S102 to step S108 including step S110 unless photo button 59 in pushed in full.

The flow advances from step S112 to step S114 to check whether or not the first digital camera 1 is within the communication range of any of wireless access points. If within the communication range, the flow advances to step S116 to check whether or not the automatic online selection is set. If not, the flow goes to step S117 to check whether or not the online setting is manually selected. If it is detected in step S117 that the online setting is selected, the flow advances to step S118. On the other hand, the flow directly advanced to step S118 if it is determined in step S116 that the automatic online selection is set.

In step S118, it is checked whether or not the first user makes a contract with the first picture archiving and communication system 5 to keep image taken by the first digital camera 1. If such a contract is made, the flow advances to step S120. Such a contract has normally finished upon buying the first digital camera 1. Thus, as long as the first user is a true owner of the first digital camera 1, the flow advances from step S118 to step S120.

In step S120, it is checked whether or not the first digital camera 1 is so set that attributes such as tags are automatically affix to a taken image data. If the automatic attribute affixation is set, the flow advances to step S122 to carry out the automatic affixation process to affix tags or the like to the taken image data. The automatic affixation process in step S122 will be explained later in more detail. The flow then goes to step S124 to carry out the image upload process in which the image data with attribute data affixed thereto is uploaded to the first picture archiving and communication system 5 through Internet.

On the other hand, if it is not detected in step 120 that the automatic attribute affixation is set in the first digital camera 1, the flow goes to step S126 to carry out the edit process in which attributes are manually affixed or edited. The flow then goes to step S124. The edit process in step S126 is explained later in more detail.

Following step S124, the flown goes to step S128 to carry out the capacity indication process, the flow then returning to step S102 to prepare for the next photography. For terminating the photo taking mode process, view button 61 is operated to cause an interruption for starting the flow of FIG. 8. Alternatively, the first digital camera 1 is turned OFF if power button 51 is operated.

On the other hand, if it is not detected in step S114 that the digital camera 1 is within the communication range, the flow directly advances to step S128. Similarly, if it is not detected in step S117 that the online setting is selected, the flow directly advances to step S128. Further, if it is not detected in step S118 that the first user makes a contract with the first picture archiving and communication system 5 to keep image taken by the first digital camera 1, the flow directly advances to step S128. The capacity indication process will be explained later in more detail.

Figure 13:
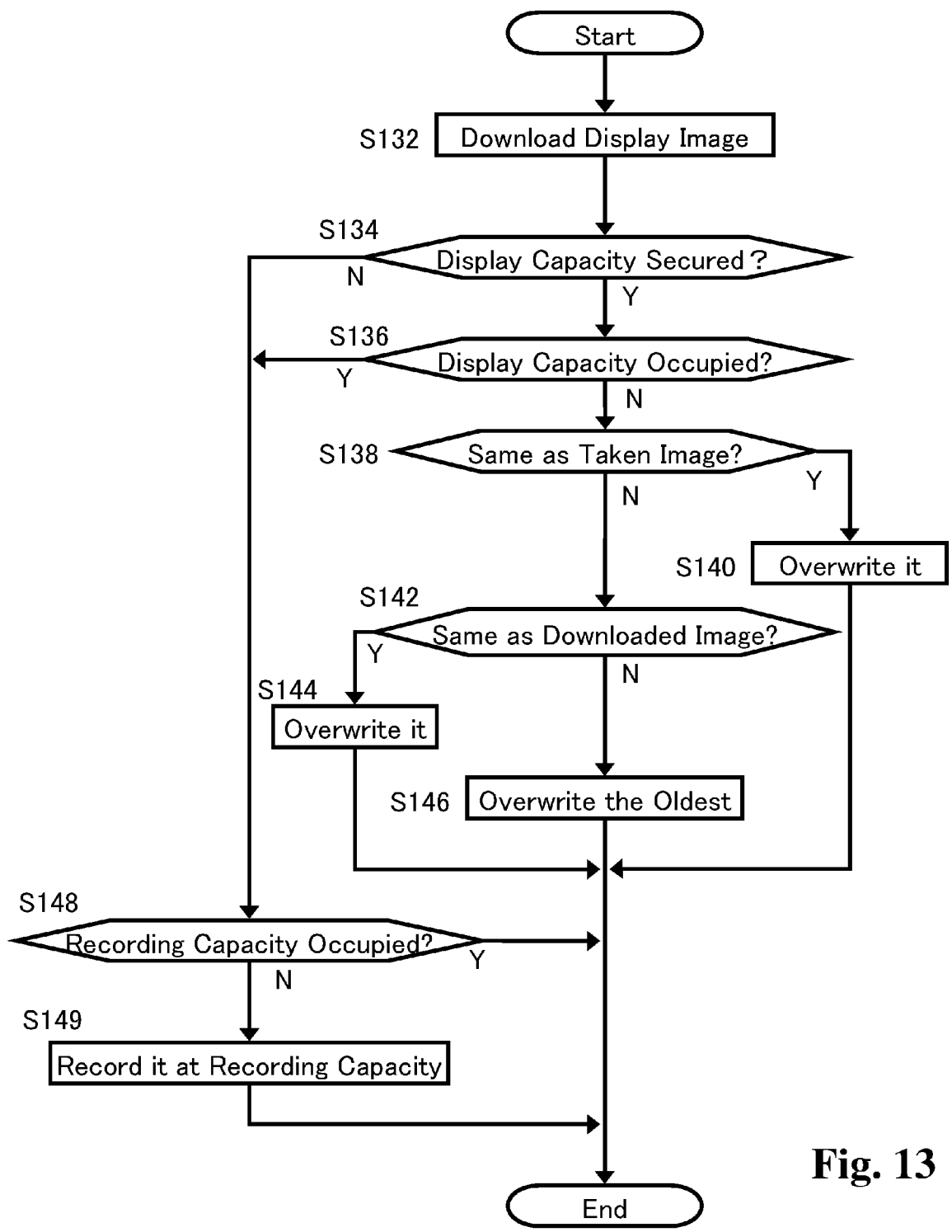
FIG. 13 is a flow chart showing the detail of the display image getting process in step S50 of FIG. 10.

FIG. 13 is a flow chart showing the detail of the display image getting process in step S50 of FIG. 10. If the flow starts, the flow goes to step S132 to download through Internet the display image prepared and kept by the first picture archiving and communication system 5. If the purpose of getting display image is to merely display the gotten image in step S52 of FIG. 10, the sole step S132 is sufficient. However, step S132 of FIG. 13 is followed by steps led by step S134 to determine how to keep the gotten display image.

The total capacity of image storage portion 35 is possible to be divided into a recording capacity for recording newly taken photographs and a display capacity for keeping the downloaded display images. Step S134 is for checking whether or not the display capacity is secured for keeping the downloaded display images.

If it is determined in step S134 that the display capacity is not secured, such determination means that total capacity of image storage portion is not divided form the beginning, but entirely assigned to the capacity for recording newly taken photographs. Or, the determination means that the image data of newly taken photographs overflowing the recoding capacity cut into the display capacity initially secured for keeping the display images to finally consume all the display capacity.

On the other hand, if it is determined in step S134 that display capacity is secured, the flow advances to step S136 to check whether or not the display capacity is occupied by display image date protected from being overwritten by another display data. Such a display image data is protected that is highly expected to be played back soon as has been already mentioned. For example, a display image data for a picture newly taken by the first digital camera is protected unless the first digital camera 1 is not in use over a prescribed period of time, e.g. more than three hours, after the date changes.

If it is not detected in step S136 that the display capacity is occupied by the protected display image date, the flow advances to step S138 to check whether or not the downloaded display image data is the same as display image data created by the first digital camera 1 and left in image storage portion 35. If any, the flow goes to step S140, in which the downloaded display image data overwrites the left same display image data, then the flow going to the end. In other words, this replacement of the same display image data is effective to prevent other display image data from disappearing. On the other hand, if any display image data created by the first digital camera 1 is left in image storage portion 35, the flow goes to step S142.

In step S142, it is checked whether or not the downloaded display image data is the same as display image data previously downloaded and left in image storage portion 35. If any, the flow goes to step S144, in which the downloaded display image data overwrites the left previously downloaded display image data, then the flow going to the end. In other words, this type of replacement of the same display image data is also effective to prevent other display image data from disappearing. If display image data is left in image storage portion 35, step S48 in FIG. 10 functions not to download the same display image data. As has been pointed out, however, steps S142 and S144 are necessary in case the step S50 is carried out for downloading the already downloaded display image data if the baud rate of data transmission is extremely high. If it is not detected in step S142 that the downloaded display image data is the same as display image data previously downloaded and left in image storage portion 35, the flow goes to step S146.

In step S146, the downloaded display image data overwrites the oldest display image data gotten and left in image storage portion 35, then the flow going to the end. This manner of overwriting is effective to prevent newer other display image data from disappearing.

If it is determined in step S134 that the display capacity is not secured, the flow goes to step S148. Or, if it is determined in step S136 that the display capacity is occupied by the protected display image date, the flow also goes to step S148. In step S148, it is checked whether or not the recording capacity for recording newly taken photographs has been fully occupied. If the recording capacity is not occupied, the flow goes to step S149, in which the downloaded display image data is recorded in image storage portion 35 with the use of remaining recording capacity obtained. Of course, the downloaded display image data stored in image storage portion 35 according to the above manner is to disappear any time when a newly taken image data overwrites such a display image data. Thus, in estimating the remaining capacity which will be explained later, the display image data stored in accordance with step S149 is treated as if it does not occupy the recording capacity. On the other hand, if it is determined in step S148 that the recording capacity is fully occupied, the flow goes to the end with the downloaded display image data not recorded in image storage portion 35 at all.

As is apparent from the above, the downloaded display image data is once recorded as many as possible by means of making use of the maximum available capacity of image storage portion 35. However, it is not the first digital camera 1, but the first picture archiving and communication system 5 to essentially fulfill the role of keeping the display image data. In other words, the playback of image on digital camera 1 is to be essentially done by downloading the display image data from the first picture archiving and communication system 5 as needed. Thus, the display image data recorded in image storage portion 35 is allowed to be overwritten by a higher priority of image data any time.

Figure 14:
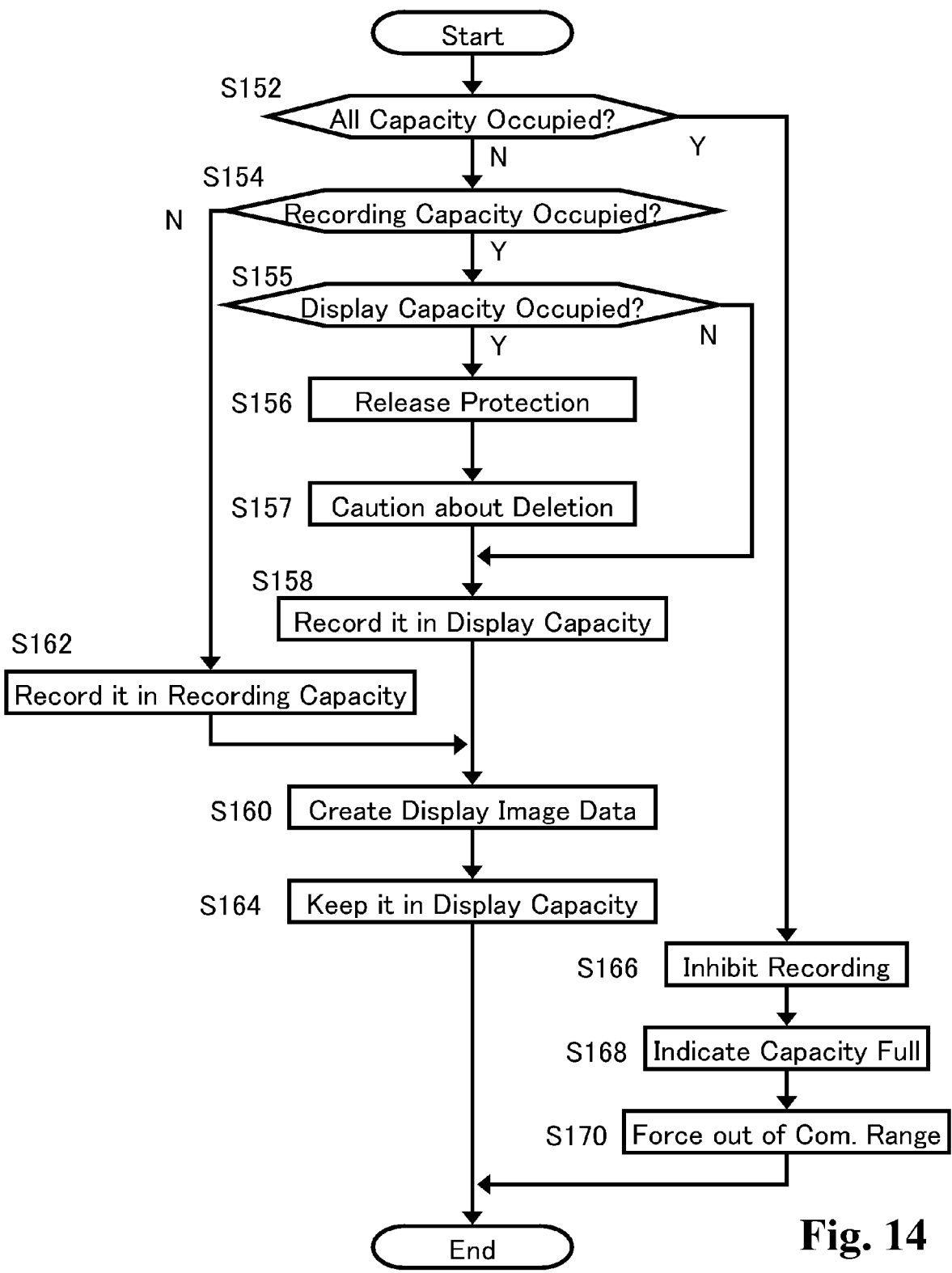
FIG. 14 is a flow chart showing the detail of the image recording process in step S112 of FIG. 12.

FIG. 14 is a flow chart showing the detail of the image recording process in step S112 of FIG. 12. If the flow starts, the flow goes to step S152 to check whether or not all the capacity of image storage portion 35 is absolutely occupied. The case that all the capacity is absolutely occupied means that not only the recording capacity but also the display capacity, which is initially secured to keep the downloaded display images, is occupied by the image data of newly taken photographs. Even if the display capacity is occupied by the display image data, it is not determined in step S152 that all the capacity is absolutely occupied.

If it is not detected in step S152 that all the capacity of image storage portion 35 is occupied, the flow advances to step S154. In step S154, it is checked whether or not the recording capacity initially secured to record newly taken photographs is occupied.

If it is detected in step S154 that the recording capacity is occupied, the flow advances to step S155. In step S155, it is checked whether or not the display capacity initially secured to keep the downloaded display images is occupied. If it is detected in step S155 that the display capacity is occupied, the image data occupying the display capacity in this case is the protected display image data.

So, if it is detected in step S155 that the display capacity is occupied, the flow advances to step S156 to release the kept display image data from protection so that the newly taken image data can overwrite the display image data. This is because that a higher priority is put on the recording of the newly taken photograph than the convenience of possible playback of the display image without accessing the first picture archiving and communication system 5 to download it. Next, a caution about deletion of the display image data is made in step S157, the flow then going to step S158. On the other hand, if it is not detected in step S155 that the display capacity is occupied, the flow directly goes to step S158.

In step S158, the image data of newly taken photograph is stored in the display capacity, which is initially secured for keeping the display image data, the flow then going to step S160. In step S158, the image data of newly taken photograph is overwritten on unprotected display image data in the order of gotten time from the oldest. In the case of coming to step S158 by way of step S157, the image data of newly taken photograph is overwritten on display image data in the order of time when the display image data is released from the protection.

On the other hand, if it is not detected in step S154 that the recording capacity is occupied, the flow advances to step S162 to record the image data of newly taken photograph in the recording capacity which is initially secured for the newly taken photographs. Then, the flow goes to step S160.

In step S160, new display image data is created on the image data of newly taken photograph, which is kept in the display capacity of image storage portion 35 in step S164, the flow then going to the end of the flow.

On the other hand, if it is detected in step S152 that all the capacity of image storage portion 35 is occupied, the flow goes to step S166 to inhibit the imaged data to be recorded in image storage portion 35. Next in step S168, an indication on display 40 is made to inform the use of the incapability of photograph because all the capacity is full.

Further, in step S170, the first digital camera 1 is forced into a condition as if it is outside the communication range before going to the end of the flow. Thus, the flow of FIG. 12 is directed from step S114 to step 128 with the meaningless steps S116 to S124 skipped, which would be otherwise carried out with the digital camera 1 within the communication range.

Figure 15:
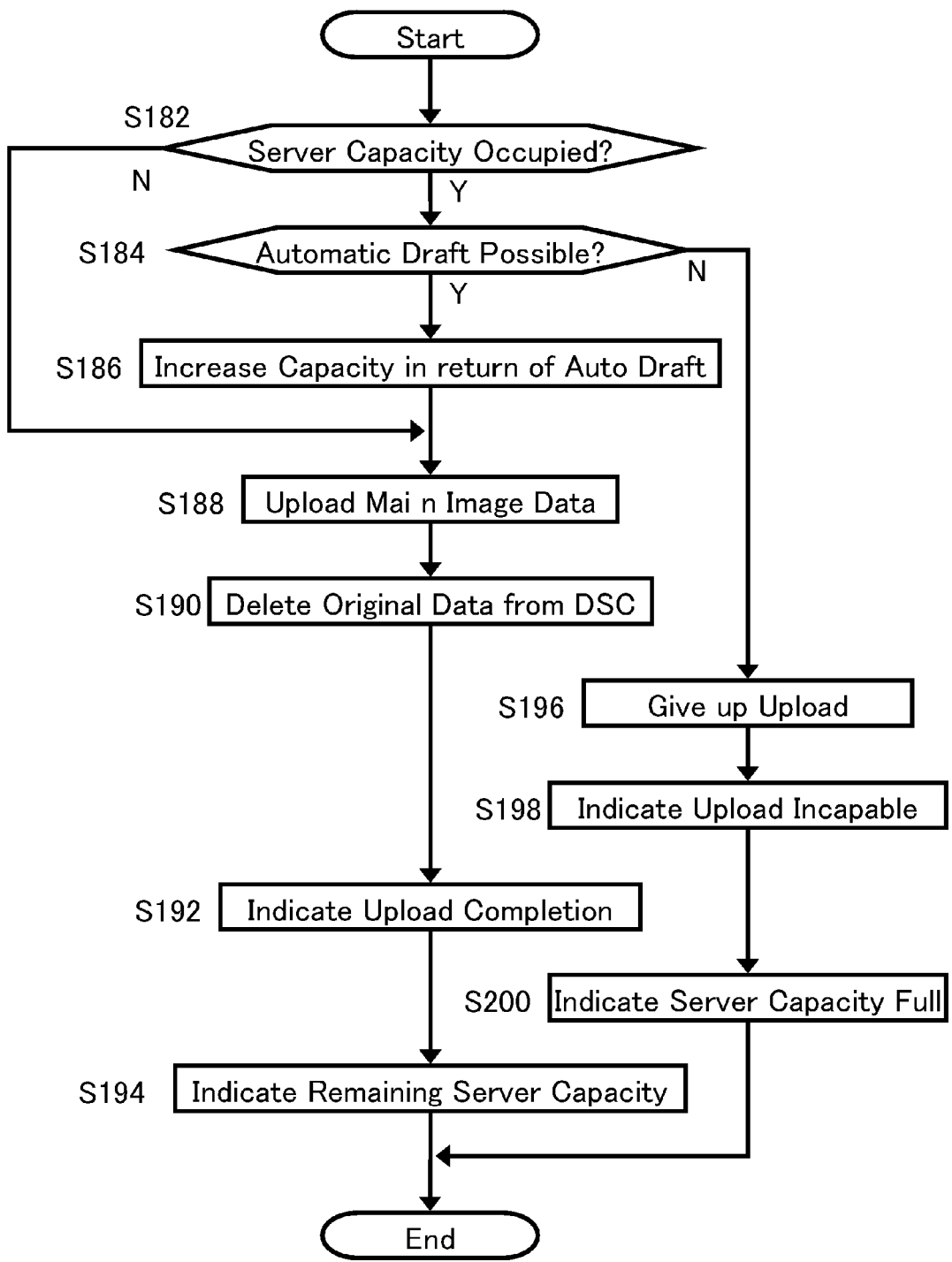
FIG. 15 is a flow chart showing the detail of the image upload process in step S124 of FIG. 12.

FIG. 15 is a flow chart showing the detail of the image upload process in step S124 of FIG. 12. If the flow starts, the flow goes to step S132 to check whether or not the contract capacity in the server assigned by the first picture archiving and communication system 5 is occupied by the uploaded image data with no room of accepting new image data left any more.

If occupied, the flow advances to step S184 to check whether or not the automatic draft is possible in accordance with the contract with the first picture archiving and communication system 5. If the automatic draft is possible, the flow advances to step S186 to increase the contract capacity in return of payment to the first picture archiving and communication system 5 by the automatic draft. The flow then goes to step S188. On the other hand, if it is not detected in step S182 that the contract capacity is occupied, the flow directly goes to step S188.

In step S188, the main image data with its attribute data is uploaded to the first picture archiving and communication system 5 with the original main image data itself deleted in step S190 form image storage portion 35 of the first digital camera 1 if the upload is successful.

Further in step S192, the completion of the upload is indicated on display 40. Next, in step S194, the first digital camera 1 is informed by the first picture archiving and communication system 5 of the remaining contract capacity with the new upload taken into consideration, to thereby indicate the remaining server capacity, the flow then going to the end.

On the other hand, if it is not detected in step S184 that the automatic draft is possible, any new image data by no means can be uploaded the first picture archiving and communication system 5 with the contracted capacity is occupied. So, the flow goes to step S196 to give up the upload, followed by information on display 40 of the upload incapability in Step 198 and of the occupied contract capacity. The flow then goes to the end.

Here, a related function of the first picture archiving and communication system 5 is referred to although it is not carried out by the flow in FIG. 15. Namely, on the bases of newly main image data uploaded from the first digital camera 1, the first picture archiving and communication system 5 creates a display image data of the size suitable for displaying on display 40 of the first digital camera 1 in automatic response to the upload of the main image data to keep the created display image data as well as the main image data for responding to a coming request from the first digital camera 1 to download the display image data.

It is needless to say that the function in FIG. 15 is solely for uploading image data taken by the first digital camera 1 itself. In other words, the first digital camera 1 has no function of uploading any imaged data gotten by downloading from the first picture archiving and communication system 5 for avoiding confusion in duplicate uploading.

Figure 16:
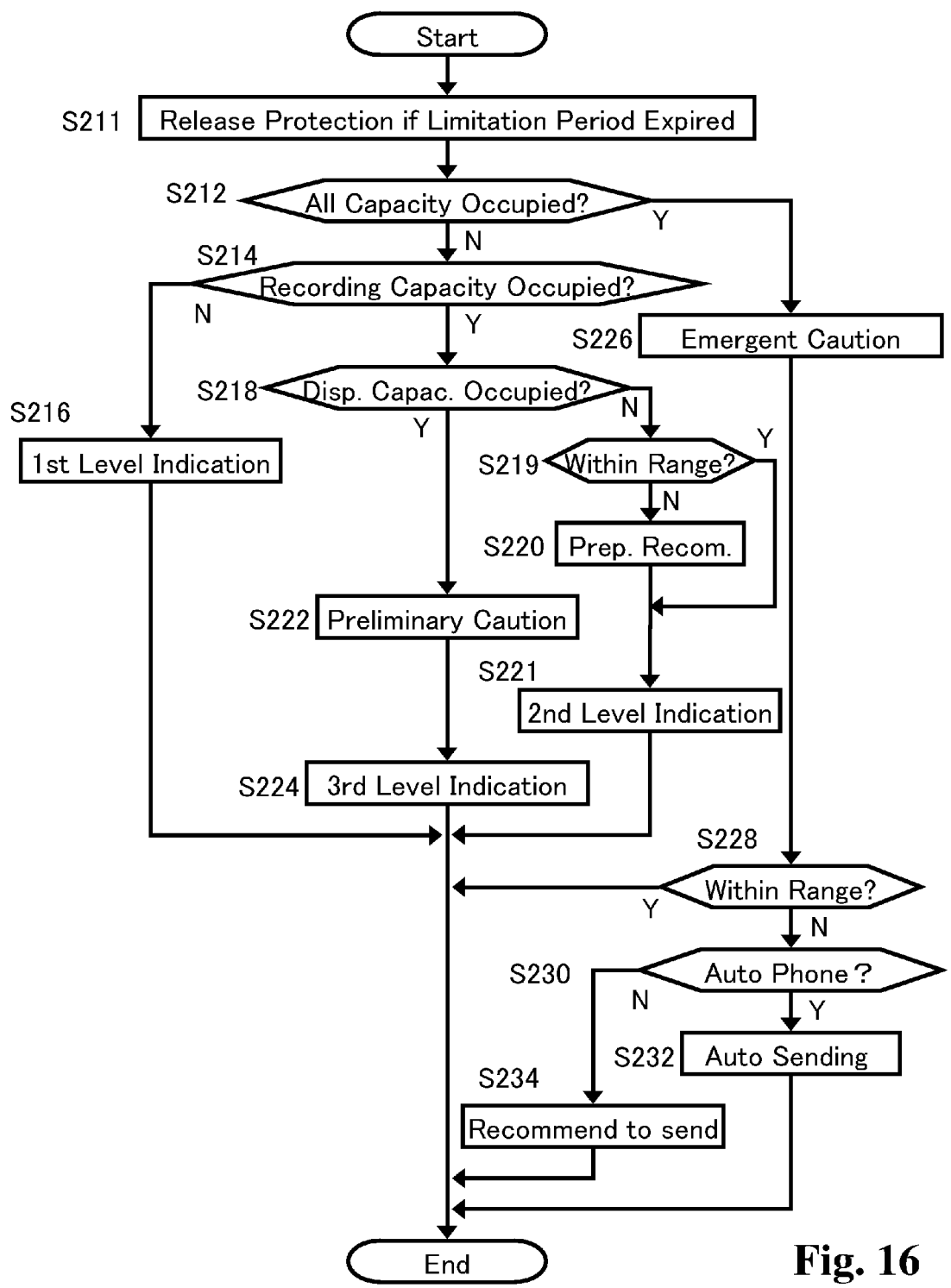
FIG. 16 is a flow chart showing the detail of the capacity indication process in step S9 of FIG. 8 and step S128 of FIG. 12.

FIG. 16 is a flow chart showing the detail of the capacity indication process in step S9 of FIG. 8 and step S128 of FIG. 12. If the flow starts, the flow goes to step S211 to automatically release the kept display image data from protection if its limitation period has expired. As previously mentioned, the display image data is automatically protected under some reasonable condition and time limit to make it possible for the first user to easily play back the image again on the first digital camera 1 without accessing the first picture archiving and communication system 5. For example, the display image data for the photographs taken on the day are protected unless the first digital camera 1 is not in use over a prescribed period of time, e.g. more than three hours, after the date changes. Similarly, the display image data downloaded within the past prescribed period of time is protected as such an image data has provably high possibility of being played back again. The count of lapse of the prescribed period of time is to be reset every time when the display image data is played back. Step 211 is for automatically releasing the display image data from protection if the prescribed period of time has expired without the counting thereof reset.

Next in step S212 it is checked whether or not all the capacity of image storage portion 35 is absolutely occupied. Such a situation that all the capacity is absolutely occupied in step S212 can be caused by the flow going from step S114 directly to step S128 since the first digital camera 1 is not within the communication range.

If it is not detected in step S212 that all the capacity of image storage portion 35 is occupied, the flow goes to step S214 to check whether or not the recording capacity initially secured to record newly taken photographs is occupied. Such a situation that the recording capacity initially secured to record newly taken photographs is occupied can also be caused by the flow going from step S114 directly to step S128 since the first digital camera 1 is not within the communication range.

If it is not detected in step S214 that the recording capacity is occupied, the flow advances to step S216 to make the first level of remaining capacity indication, the flow then going to the end. This indication means the remaining capacity of the recording capacity initially secured to record newly taken photographs. If the first digital camera 1 is within the communication range and the contract capacity of the server is not occupied, the image data of the newly taken photograph is instantly uploaded. Thus, the recording capacity of the recording capacity initially secured to record newly taken photographs is kept empty.

If it is detected in step S214 that the recording capacity is occupied, the flow advances to step S218 to check whether or not the display capacity initially secured to keep the downloaded display images is occupied. If it is detected in step S218 that the display capacity is occupied, the image data occupying the display capacity in this case is the protected display image data.

If it is determined in step S218 that the display capacity is not occupied because the image data kept in the display capacity is not the protected display image data, the flow goes to step S219 to check whether or not the first digital camera 1 is within the communication range of any of wireless access points. If it is detected in step S219 that the first digital camera is outside the communication range, the flow goes to step S220 to recommend the first user to manually send the taken image data in a preparatory manner by way of the mobile phone since the recording capacity is occupied as detected in step S214. However, the first user can take the photograph with the recommendation neglected since the display capacity is remaining.

Step S220 is followed by step S221 in which the second level of remaining capacity indication is made, the flow then going to the end. The second level of remaining capacity indication in step S221 is made in place of the first level of remaining capacity indication in step S216. The second level of remaining capacity means the display capacity which is initially secured to keep the downloaded display images and is to be usable for recording newly taken photographs in place of the display capacity. On the other hand, if it is detected in step S219 that the first digital camera is within the communication range, the flow directly goes to step S221 with the preparatory recommendation in step 220 skipped.

If it is detected in step S218 that the display capacity is occupied, the flow goes to step S222 to make a preliminary caution such as "Capacity full, but shots possible with protected display image data deleted" is given. Next in step S224, the third level of remaining capacity indication is made, the flow then going to the end. The third level of remaining capacity indication means that the photograph itself can be taken by cutting into the display capacity with the protected display image data overwritten. The third level of remaining capacity indication in step S224 is made in place of the first level of remaining capacity indication in step S216.

The remaining capacity indications in steps S216, S221 and S224 each defer from the others in their meanings, respectively. So, each indication is made with unique color or font or size or location different form the others to distinguish it from the others.

On the other hand, if it is detected in step S212 that all the capacity of image storage portion 35 is absolutely occupied, the flow goes to step S226 to make an emergency caution. Next, in step S228, it is checked whether or not the first digital camera 1 is within the communication range. If not, the flow advances to step S230 to check whether or not the digital camera 1 is set into a condition of automatic cooperation with the mobile phone. If in such a condition, the flow goes to step S232 to have the mobile phone automatically call the server through Internet 4 to send the taken image data from the first digital camera 1 to the first picture archiving and communication system 5, the flow then going to the end.

On the other hand, if it is not detected in step S230 that the digital camera 1 is set into a condition of automatic cooperation with the mobile phone, the flow goes to step S234 to recommend the first user on display 40 to instantly send the taken image data by means of manual operation of the mobile phone, the flow then going to the end.

The function of the first digital camera 1 in sending image data by way of the mobile phone which is automatically done in step S232 or manually done by the first user at the sight of the recommendation made in step S220 or step S234 is similar to the image upload process carried out in FIG. 15 except that the mobile phone replaces wireless access point 3. Namely, the first digital camera 1 carries out the flow in FIG. 15 caused by one of steps S232, S220 and S234 with wireless access point 3 is replaced by the mobile phone.

If it is determined in step S228 that the first digital camera 1 is within the communication range of any of wireless access points, the flow instantly goes to the end since this situation is caused by such a fact that the contract capacity in the server is occupied which makes it impossible to send the taken image data even if the first digital camera 1 is within the communication range.

Figure 17:
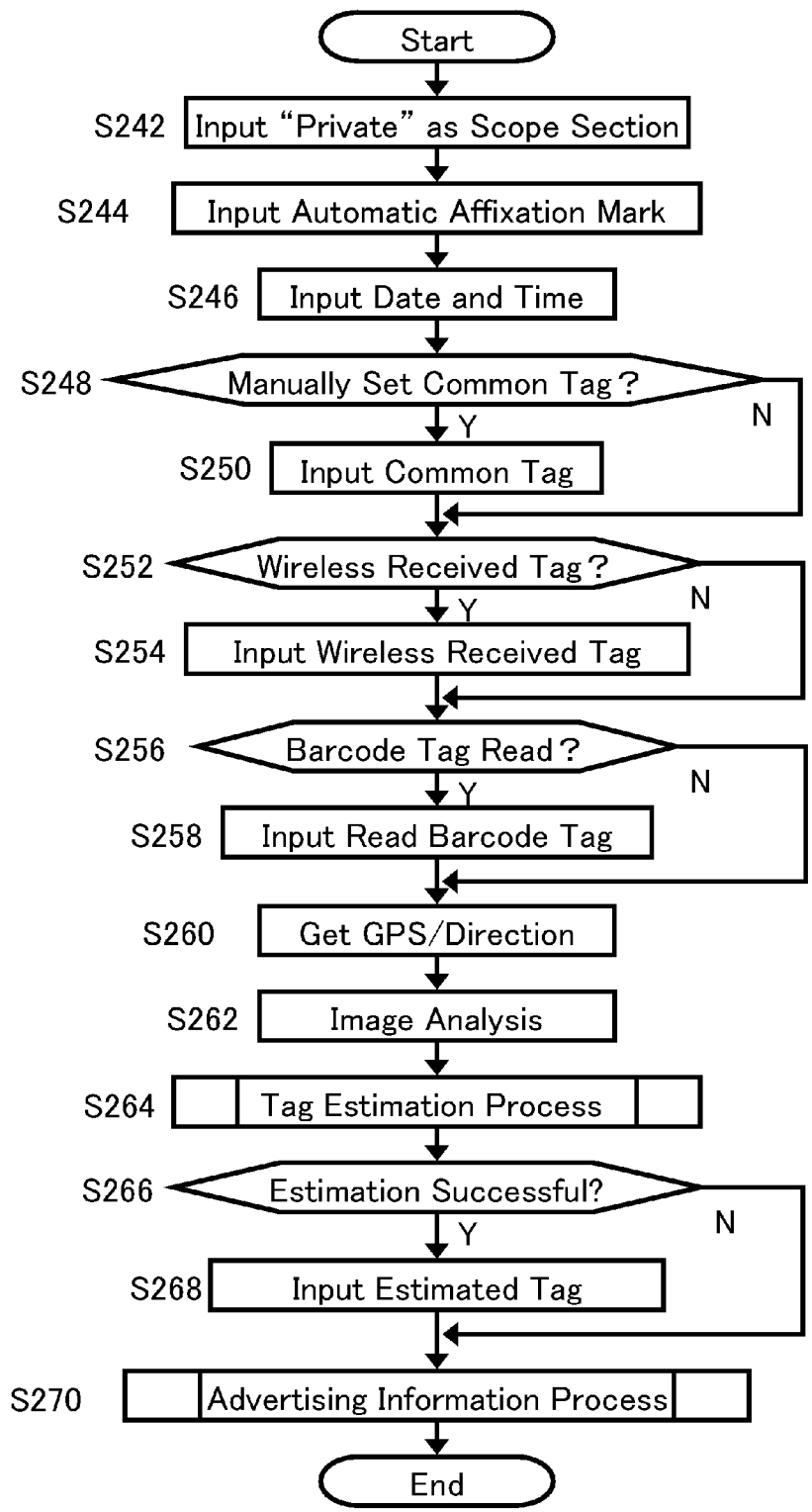
FIG. 17 is a flow chart showing the detail of the automatic attribute affixation process in step S122 of FIG. 12.

FIG. 17 is a flow chart showing the detail of the automatic attribute affixation process in step S122 of FIG. 12. If the flow starts, the flow goes to step S242 to automatically input the attribute of scope section at "private". Next, in step S244 a mark is input for indicating that the attribute affixation above is made automatically. Such a mark may be put as the form of a general tag or as a special form of data. Or the mark is input with the use of the area for the title, which is initially made blank upon the automatic attribute affixation.

The above mentioned mark indicating the automatic attribute affixation is to distinguish the attribute affixed without any proof by the first user from the attribute which the first user affixed by its own will. Thus, the attribute without proof can be easily picked up due to the mark upon editing the attribute. Step S244 is followed by step S246 to automatically input date and time.

Upon completion of the input above, the flow advances to step S248 to check whether or not any common tag is manually set in advance so as to be automatically input to all of a predetermined series of photographs. Such a common tag may be set for inputting to all the photographs taken by the first digital camera 1 without fail. Or, a different common tag may be set each time when an event such as a travel is planed. If any common tag is detected in step S248, the flow advances to step S250 to automatically input the common tag, the flow then going to step S252. On the other hand, if any common tag is not detected in step S248, the flow directly goes to step S252.

In step S252, it is checked whether or not any tag information is received through wireless communication form an object in a notable site where the first use is visiting. If any received tag information is detected in step S252, the flow advances to step S254 to automatically input the received tag, the flow then going to step S256. On the other hand, if any received tag information is not detected in step S252, the flow directly goes to step S256.

In step S256, it is checked whether or not any barcode tag information is read from a taken image data of an object in a notable site where the first use is visiting. If any barcode tag information is detected in step S256, the flow advances to step S258 to automatically input the tag information read from the barcode, the flow then going to step S260. On the other hand, if any barcode tag information is not detected in step S256, the flow directly goes to step S260.

In step S260, information is gotten from GPS and direction sensor 44. Further, in step S262, image analysis is carried out to extrapolate an object taken. And, in step S264, tag estimation process is carried out for trying to estimate a tag on the basis of the information gotten in steps S260 and S262 by consulting with a lookup table storing various relationships of tags with the combinations of the GPS and direction information and the extrapolated object information.

Next, in step S266, it is checked whether or not any suitable tag is estimated. If the estimation is successful, the flow advances to step S268 to automatically input the estimated tag information, the flow then going to step S270. On the other hand, if it is not detected that any suitable tag is estimated, the flow directly goes to step S270. The case that any suitable tag is not estimated is caused not only by the failure in the tag estimation process in step S264, but by the failure in getting necessary information in step S260 or step S262.

In step S270, the advertising information process is carried out. In the advertising process, tags gotten in step S254 or S258 are processed if such tags are viewed as advertising information form a hotel, shop or the like located in the notable site. In more detail, the advertising process carried out as the function of the first digital camera 1 investigates into all the automatically gotten tags to pick up seemingly advertising tags for encrypting it into data which cannot be spread as a meaningful tag against the will of the first user even if uploaded with the image data, but recognizable in the advertisement utilizing process explained later. Thus, the advertising tags are so encrypted that they can be decrypted by the function of the first digital camera 1.

Figure 18:
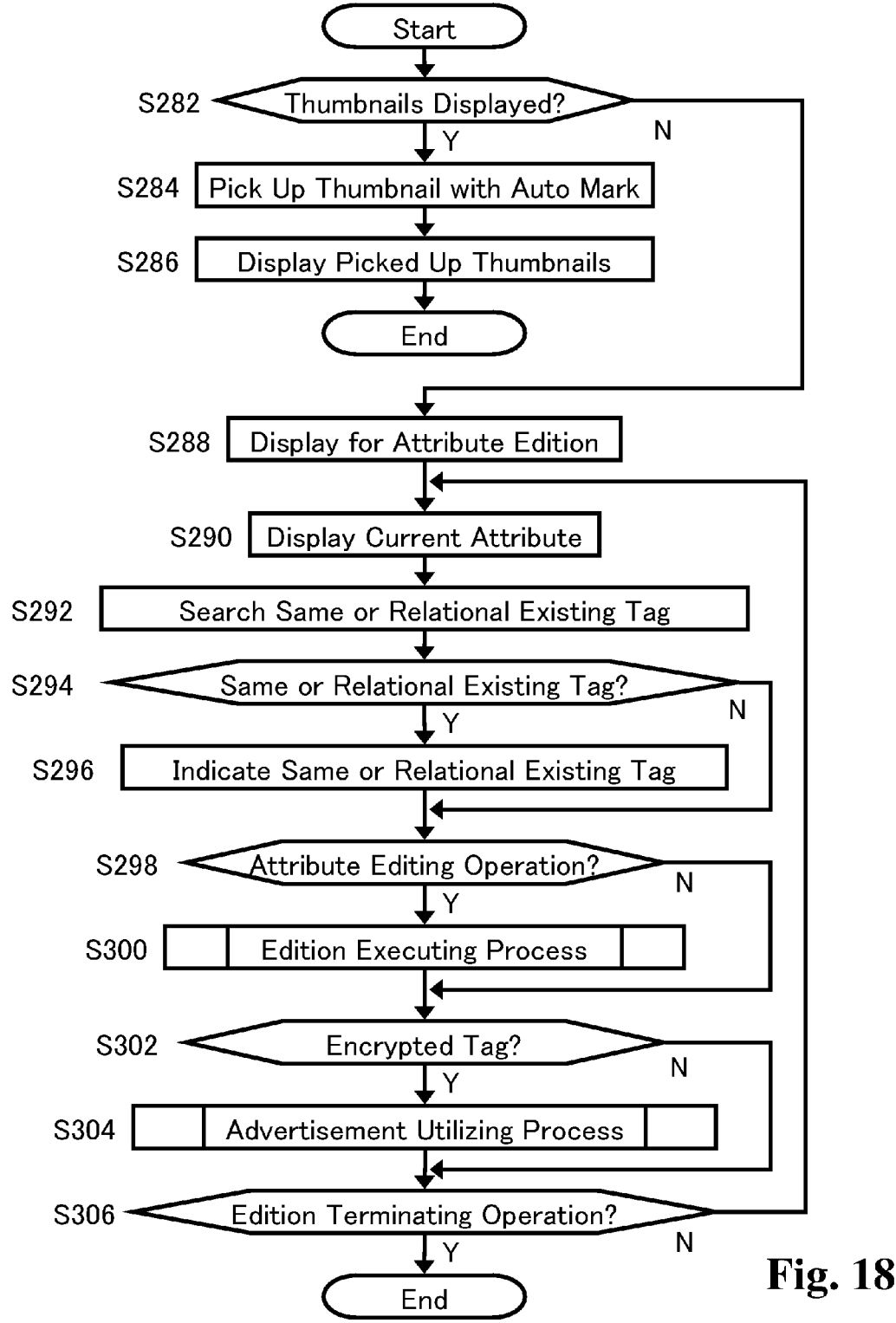
FIG. 18 is a flow chart showing the detail of the attribute edition process in step S58 of FIG. 10 and step S126 of FIG. 12.

FIG. 18 is a flow chart showing the detail of the attribute edition process in step S58 of FIG. 10 and step S126 of FIG. 12. The flow in FIG. 18 also includes the function caused by attribute edit button 62 pushed in the condition shown in FIG. 4.

If attribute edit button 62 is pushed, the flow starts to go to step S282 to check whether or not attribute edit button 62 is pushed with thumbnails displayed as in the manner of FIG. 4. If it is determined in step S282 that attribute edit button 62 is pushed with thumbnails displayed, the flow goes to step 284 to pick up thumbnails with the mark input in step S244 in FIG. 17 which indicates that the attribute affixation is made automatically without any proof by the first user. Next, in step S286, the picked up thumbnails are displayed, the flow then going to the end with leaving the display of the picked up thumbnails. Thus, if one of such thumbnails is selected, the display window of FIG. 5 is caused through the functions of the flow in FIG. 10.

If it is not detected in step S282 that attribute edit button 62 is pushed with thumbnails displayed, attribute edit button 62 is considered to be pushed under the display condition in FIG. 5. Thus, the flow in this case goes to step S288 to cause the display window for attribute edition as in FIG. 6. The current attribute is also displayed in step S290. In the case of image data with the automatic attribute affixation mark, automatically input attribute put in accordance with the function of FIG. 17 is displayed. Thus, the display in FIG. 6 with affixed tag window 82 is caused.

Next, in step 292, the existing tag same as or relational to the affixed tag is searched through the communication with integrated image administration server 6. The relational tag means a tag which is not the same as the affixed tag, but is synonymous to the affixed tag or the like. Next, in step S294, it is checked whether or not any same or relational tag is found.

If it is detected in step S294 that the same or relational tag is found, the flow goes to step S296 to indicate the found same or relational tag in both affixed tag window 82 and existing tag window 83 in FIG. 6, the flow then going to step S298. On the other hand, if it is not detected in step S294 that the same or relational tag is found, the flow directly goes to step S298. In this case, nothing is indicated in existing tag window 83.

In more detail, the function in step S296 adds underline to a tag in affixed tag window 82 in FIG. 6 if the tag is the same as an existing tag, which is to be indicated in existing tag window 83 with corresponding underline. With respect to a relational tag found among existing tags, the found relational tag is indicated in existing tag window 83 without under line so as to be distinguishable form the tag identical with the tag in affixed tag window 82.

In step 298, it is checked whether or not attribute edit operation is done. If it is detected in step S298 that the attribute edit operation is done, the flow goes to step S300 to carry out the edition executing process, the flow then going to step S302. On the other hand, if it is not detected in step S298 that the attribute edit operation is done, the flow directly goes to step S302. The details of the attribute edit process will be explained later.

In step S302, it is checked whether or not any encrypted tag is left unprocessed in affixed tag window 82. If any, the flow advances to step S304 to carry out the advertisement utilizing process, the flow then going to step S306. On the other hand, if it is not detected in step S302 that any encrypted tag exists, the flow directly goes to step S306. The details of the advertisement utilizing process will be explained later.

In step S306, it is checked whether or not edition terminating operation is done, the flow going to the end if such an operation is to be done. On the other hand, if it is not detected in step S306 that edition terminating operation is done, the flow returns to step S290 to repeat the loop of step S290 to step 306 unless it is detected in step S306 that edition terminating operation is done.

If the flow of FIG. 18 goes to the end, the flow returns to the condition of display in FIG. 5 in the case that the flow of FIG. 18 is carried out as step 58 of FIG. 10. On the other hand, if the flow of FIG. 18 goes to the end as the function of step S126 of FIG. 12, the flow advances to step S124 for carrying out the image upload process.

Figure 19:
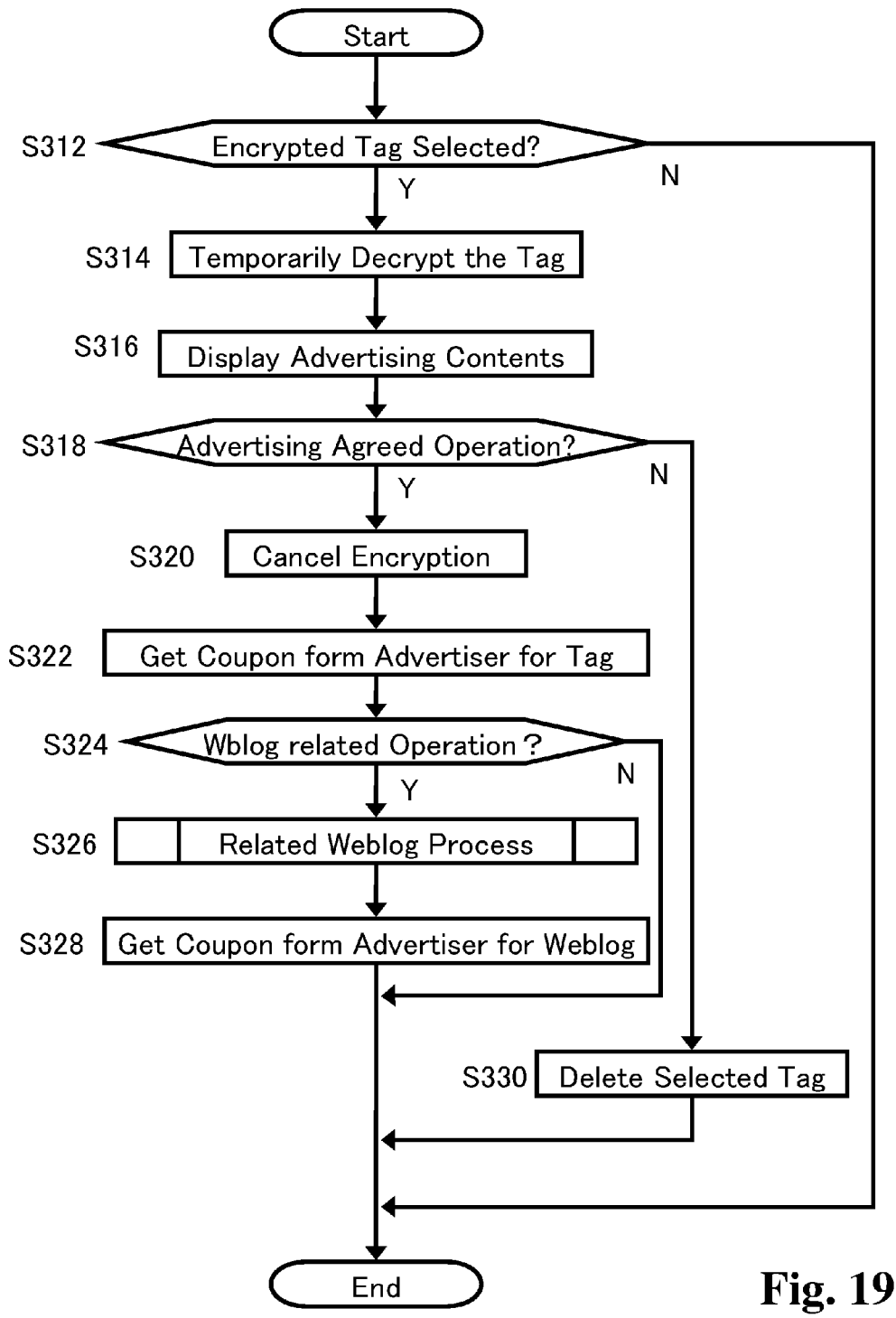
FIG. 19 is a flow chart showing the detail of the advertisement utilizing process in step S304 of FIG. 18.

FIG. 19 is a flow chart showing the detail of the advertisement utilizing process in step S304 of FIG. 18. If the flow starts, the flow goes to step S312 to check whether or not an operation is done within a predetermined period of time to select one of the encrypted tags left unprocessed. In other words, it is checked whether or not one is selected among encrypted tag or tags left unprocessed in affixed tag window 82 in FIG. 6 by manual operation of arrow key 54 or numeric keypad 55.

If it is detected in step S312 that the one encrypted tag is selected within the time period, the flow advances to step S314 to temporarily decrypt the tag. The decrypted tag is displayed in step S316 with the use of existing tag window 83 in display 40 for the first user to confirm the contents of the advertising, which includes the name of the hotel or shop, advantages or the like. Next, in step S318, a query is displayed on display 40 to ask whether or not to agree the advertisement to be affixed to the image data as a normal tag, and it is checked whether or not an agreement operation is done in response to the query within a predetermined period of time. If the agreement operation is confirmed in step S318, the flow goes to step S320 to permanently cancel the encryption of the tag so that the tag may be affixed to the image in a form of a normal tag indicating the name of the hotel or the like, which can be hit during the tag search by anyone. Thus, if the name of the hotel is hit as a tag for example, the photograph of the hotel taken by the first user serves as the advertisement of the hotel.

Step 320 is followed by step S322, in which the fist user gets electronic coupon form the advertiser such as the hotel or the shop in exchange for the cancellation of the encryption in step S320. The electronic coupon can be instantly used at the hotel or the shop since the first user taking the photograph is naturally close to the hotel or the shop.

Next, in step S324 a query is displayed on display 40 to ask whether or not to input Weblog on the photograph of the hotel or the shop making the advertisement, and it is checked whether or not an operation related to Weblog is done in response to the query within a predetermined period of time. If the operation is confirmed in step S324, the flow goes to step S326 to carry out the related Weblog process. The related Weblog process is to provide a link between the uploaded image data and Weblog related to the advertiser so that the first user or anyone viewing the photograph can input Weblog on the photograph of the hotel or the shop. After completion of the related Weblog process, the flow goes to step S328, in which the fist user gets electronic coupon form the advertiser in exchange for the related Weblog process in step S326. It should be noted that the electronic coupon though the related Weblog process is non-transferable and becomes valid after the Weblog is actually input. Further, the advertiser can void the coupon if the input Weblog turns out to be a slur or a mere adulation. Further, since the Weblog is accompanied by the identification of the writer, Weblog out of malice or coupon hunting repeated by the same writer would be ignored.

If it is not detected in step S324 that any operation related to Weblog is done within the predetermined period of time, the flow instantly goes to the end. If it is not detected in step S318 that any agreement operation is done within the predetermined period of time, the flow goes to step S330 to delete the tag selected in step S312, the flow then going to the end. If it is not detected in step S312 that any operation is done within a predetermined period of time to select one of the encrypted tags, the flow instantly goes to the end. goes to step S330 to delete the tag selected in step S312, the flow then going to the end.

Figure 20:
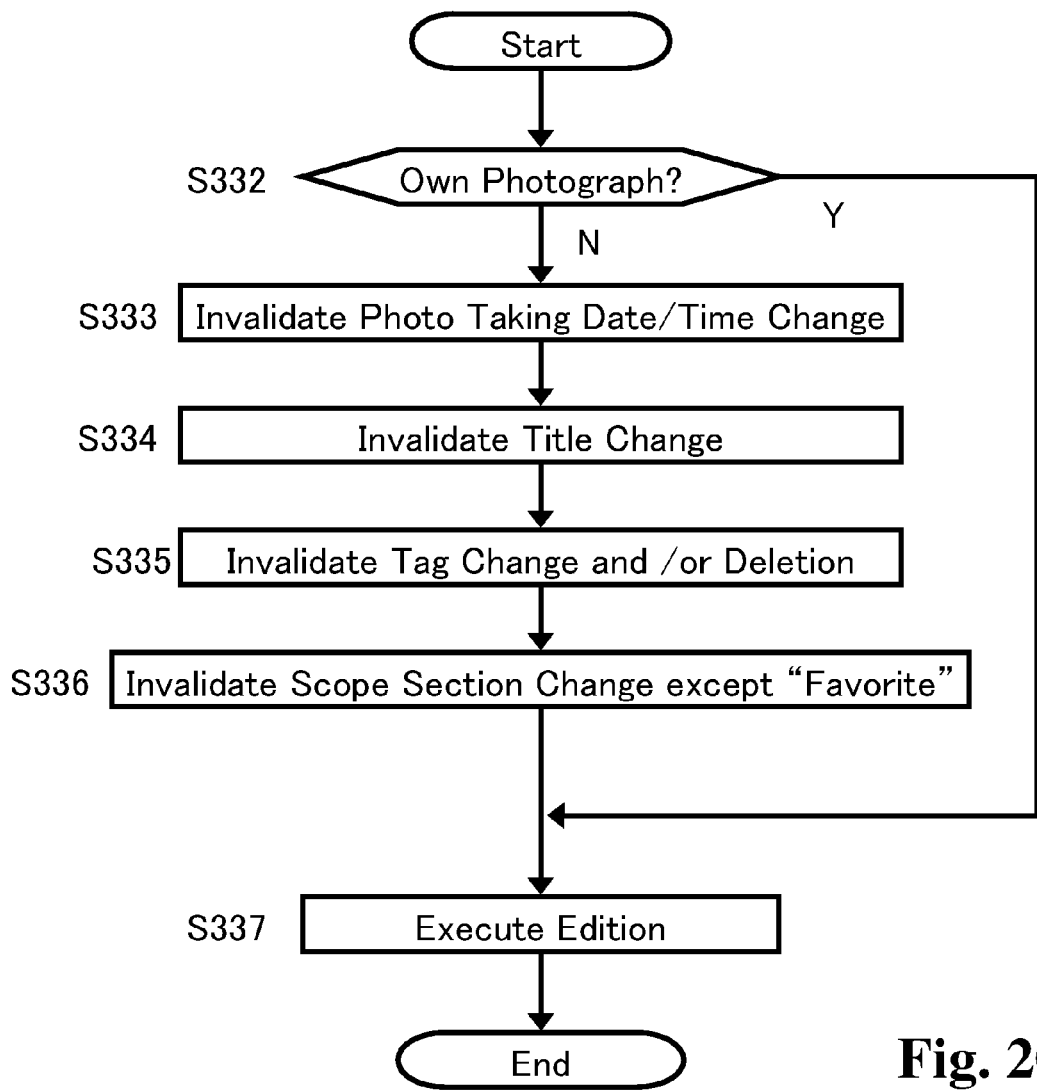
FIG. 20 is a flow chart showing the detail of the edition executing process in step S300 of FIG. 18.

FIG. 20 is a flow chart showing the detail of the edition executing process in step S300 of FIG. 18. If the flow starts, step S332 comes first to check whether or not the image under attribute edition is of the own photograph. If not, the flow goes to a series of steps led by step S333 for avoiding possible confusion otherwise caused in error by an operation to change attribute which only the creator can change At first, in step S333, any operation to change data in photo taking date and time box 73 in FIG. 6 is made invalid. It is needless to say in its nature that photo taking date and time should not be changed. However, the change as to own photograph is made possible by means of a special operation for a limited purpose of putting own photographs in order. On the contrary, any change in photo taking date and time is absolutely inhibited by step S333 as to photographs taken by others.

Next, in step S334, any operation to change data in title box 72 in FIG. 6 is made invalid. Further, in step S335, any operation to change or delete data in affixed tag box 82 in FIG. 6 is made invalid. As to affixed tag box 82, however, an operation to add tag for own use is possible since the addition of search keys does not cause any negative influence on the photographs taken by others. Then, the flow advances to step S336, in which any operation to change scope section 53 except "favorite" box is made invalid. Finally, in step S337, any change in attribute caused by operation which is not made invalid is executed to realize the edition of attribute, the flow then going to the end.

On the other hand, if it is detected in step S332 that the image under attribute edition is of the own photograph, the flow directly goes to step S337 without any invalidation steps to realize changes in attribute caused by all the operations, the flow then going to the end.

Figure 21:
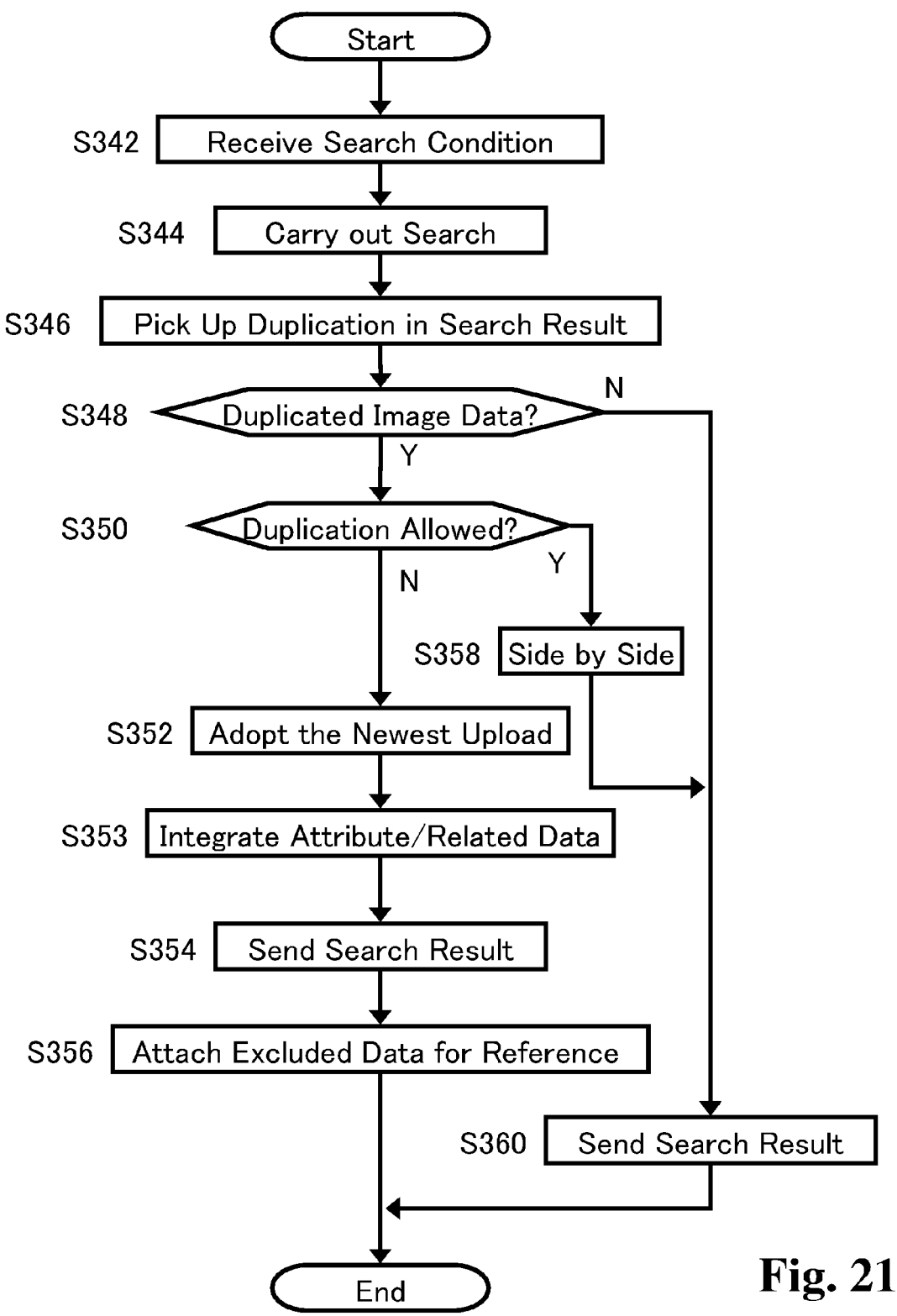
FIG. 21 is a flow chart showing the search function carried out by integrated image administration server in cooperation with the search result updating process of the first digital camera carried out in step S10 of FIG. 8 or step S92 of FIG. 11.

FIG. 21 is a flow chart showing the search function carried out by integrated image administration server 6 in cooperation with the search result updating process of the first digital camera 1 carried out in step S10 of FIG. 8 or step S92 of FIG. 11. If the flow of the first digital camera 1 comes into step S10 of FIG. 8 or step S92 of FIG. 11, the flow of FIG. 21 of integrated image administration server 6 starts to go to step S342. In step S342, the search condition given by the first digital camera is received to carry out the search in step S344.

In conducting the search in step S344, the scope is not limited within the first picture archiving and communication system 5, but is extended into the second picture archiving and communication system 10 or other all possible picture archiving and communication systems even if the first digital camera 1 contracts with the first picture archiving and communication system 5 only.

If the search is completed, the flow advances to step S346 to pick up duplication of the same image data within the search result. Such duplication is caused if the first user has uploaded the same image data to a plurality of the picture archiving and communication systems. Step S348 checks whether or not any duplicated image data is picked up in step S346 to go to step S350 if the duplication is picked up. In step S350, it is checked whether or not the order from the first digital camera 1 is to allow the duplication. If the duplication is not allowed, the flow goes to step S352 to adopt one image data with the newest uploading date with the other image data excluded from the search result. The adoption carried out in step 352 can be based on an alternative rule other than the newest uploading date, such as the largest image size.

Next, in step 353, the attribute data and the related data as to the adopted image data is integrated. In other words, attribute data and other related data such as Weblog originally affixed to the excluded duplication image data are linked with the adopted image data. Thus, all of the attribute data and the related data as to the same image data are integrally linked to the adopted image data without fail even if the duplicate image data itself is excluded from the search result.

Next in step S354, the search result including the adopted image data from the duplication and other image data free from duplication issue are sent to the first digital camera 1. Further, in step S356, the excluded image data because of the duplication is also sent to the first digital camera 1 for reverence with the link to the image data sent in step S354 provided. Thus, the flow of the function in integrated image administration server 6 goes to the end.

On the other hand, if it is detected in step S350 that the order from the first digital camera 1 is to allow the duplication, the flow goes to step S358 to arrange the duplicate image data side by side. In this case, the uploading date and time is unified into the newest throughout all the duplicate image data for the purpose of keeping the side by side order even if the search result is sorted in the order of the uploading date and time, which otherwise would make the duplicate image data apart on the basis of the real uploading data and time. Then the flow goes to step S360 to send the duplicate image data as well as other image data to the first digital camera 1, the flow thus going to the end.

If it is not detected in step S348 that any duplicated image data is picked up in step S346, the flow instantly goes to step S360 to send the search result to the first digital camera 1, the flow then going to the end.

By receiving the search result sent through the functions above, the first digital camera 1 can display the thumbnails 58 arranged in accordance with the layout in FIG. 4 as the search result.

Here, the explanation is advanced to the function of the first personal computer 7. The first personal computer 7 has basically the similar functions as those in the first digital camera 1 such as image recording, image searching, image displaying and image uploading functions. Further, the first personal computer 7 has function of downloading, from the first picture archiving and communication system 5, the main image data of full-size or another image data, which is of a greater size than that of the display image data for the first digital camera 1, for the purpose of displaying on the first monitor 8 or printing by the first home printer 16.

Figure 22:
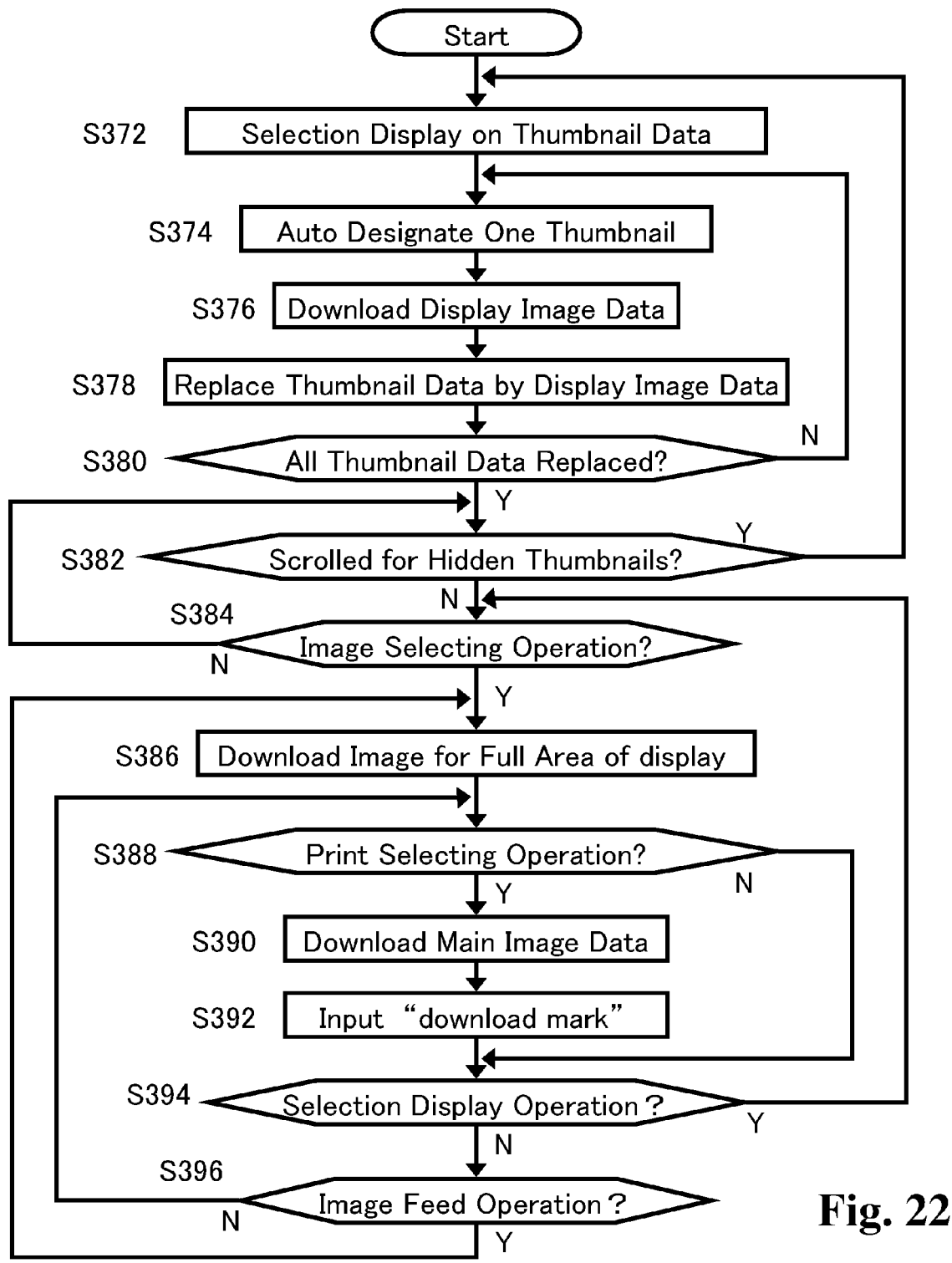
FIG. 22 is a flow chart of a function or a controller in a first personal computer.

FIG. 22 is a flow chart of the function of the controller in the first personal computer 7 having the above functions. The flow of FIG. 22 starts when the first personal computer 7 has carried out the image search process similar to that in FIG. 11 and the thumbnail data as the search result is received from integrated image administration server 6 functioning in accordance with FIG. 21.

If the flow starts, step S372 displays the results of the search so that the hit images may be viewed at a glance for selection on the first monitor 8 in the similar manner to that in FIG. 4. Initially, such selection display of a plurality of images is on the thumbnail data which is only available at this stage. Since the area of the first monitor 8 is much greater than that of display 40 of the first digital camera 1, the area for each thumbnail is enlarged in proportion to the difference in area size of the monitor. However, the image is simply enlarged on the thumbnail data of the same number of pixels at this stage, resolution of the image is low. Thumbnails which cannot be initially displayed on the first monitor can be viewed by scrolling the display.

Next, in step S374, one of the thumbnails is automatically designated in accordance with a predetermined order, which causes the Internet connection to URL of the corresponding display image data prepared for displaying on display 40 and kept in the first picture archiving and communication system 5, the display image data being gotten through automatic download. The downloaded display image data replaces the corresponding thumbnail data on the first monitor 8 in step S378. In contrast to that the area size assigned to one display image in the area of first monitor 8 is equal to that to one enlarged thumbnail, the number of pixels of the display image data is much greater than that of the thumbnail image data. Thus, the replacement of image data in step S378 causes improvement of the resolution of display.

Then the flow advances to step S380 to check whether or not all the thumbnail image data on the first monitor 8 are replaced by corresponding display image data. If not, the flow returns to step S374 to automatically designate the next thumbnail in the predetermined order. Thus, the steps S374 to S380 is repeated until step S380 detects that all the thumbnail image data are replaced by corresponding display image data.

If it is determined in step 380 that all of the thumbnail image data are replaced by corresponding display image data, the flow advances to step S382 to check whether or not a scroll operation to view other thumbnails is done within a predetermined time period. If done, the flow returns to step S372 to display thumbnails which have not appeared on the first monitor 8 before the scroll operation. If the display in step S372 caused by the scroll operation consists of a mixture of newly appearing images and already existing images, the already existing images are displayed on the basis of display image data having replaced the corresponding thumbnail image data. Thus, every time when scroll operation for new thumbnails is detected in step S382, the flow returns to step S372 for carrying out steps S374 to S380 for replacing data of newly appearing thumbnails by corresponding display image data.

Though not shown in FIG. 22, a step may be inserted between step S372 and S374 to check whether or not all of the thumbnail image data are replaced by corresponding display image data. And, if it is determined in the additional step that all of the thumbnail image data are replaced by corresponding display image data respectively, the flow directly goes to step S382.

If it is not detected in step S382 that a scroll operation is done within a predetermined time period, the flow goes to step 384 to check whether or not an image selecting operation is done to display the selected one image in the full area of the first monitor 8. If not, the flow returns to step 382 to thereafter repeat steps S382 and S384 unless one of the scroll operation or image selecting operation is done.

If it is detected in step S384 that an image selecting operation is done within a predetermined time period, the flow goes to step 386 to download the data of the selected image, which is of a size including sufficient number of pixels suitable for display in the full area of the first monitor 8.

Next is step S388, it is checked whether or not a print selecting operation is done within a predetermined time period. If a print selecting operation is done, the flow goes to step S390 to download the main image data of the full-size, which is of the greatest number of pixels among a plurality of sizes of images for the same photograph. Then the flow goes to step S392 to input "download mark" as its attribute. This is to distinguish the downloaded full-size image data from the full-size image data taken by the first digital camera 1 and not uploaded yet. In other words, the full-size image data with "download mark" cannot be uploaded. Thus, a full-size image data taken by another and downloaded is automatically prevented from being uploaded in error due to the "download mark". The downloaded full-size image data is sent to the first home printer 16 to make print under control of the first personal computer 7.

Step S392 is followed by step S394, while the flow directly goes from step S388 to step S394 if it is not detected in step S288 that a print selecting operation is done within a predetermined time period. In step S394, it is checked whether or not the selection display operation is done within a predetermined time period.

If it is detected in step S294 that the selection display operation is done within the predetermined time period, the flow returns to step S372 to display again the plurality of images at a glance for selection. Thus, the flow repeats form step S372 to step S394 as long as it is detected in step S294 that the selection display operation is done within the predetermined time period.

On the other hand, if it is not detected in step S294 that the selection display operation is done within the predetermined time period, the flow goes to step S396 to check whether or not the image feed operation is done within the predetermined time period. If the image feed operation is detected, the next or the last image in the order of display in step S372 is selected in response to the direction of image feeding given by the operation, the flow then returns to step S386, in which the data of the newly selected image, which is of a size including sufficient number of pixels suitable for display in the full area of the first monitor 8, is downloaded.

On the other hand, if it is not detected in step S396 that the image feed operation is done within the predetermined time period, the flow returns to step S388. Thus, the steps S388 to S396 are repeated with the display of the image downloaded in step S386 maintained unless the operation is detected in step S394 or step S396.

In response to an interruption caused by some other operation of the first personal computer 7, the flow can go out of the flow of FIG. 22 in any time to jump into the function directed by the operation.

Figure 23:
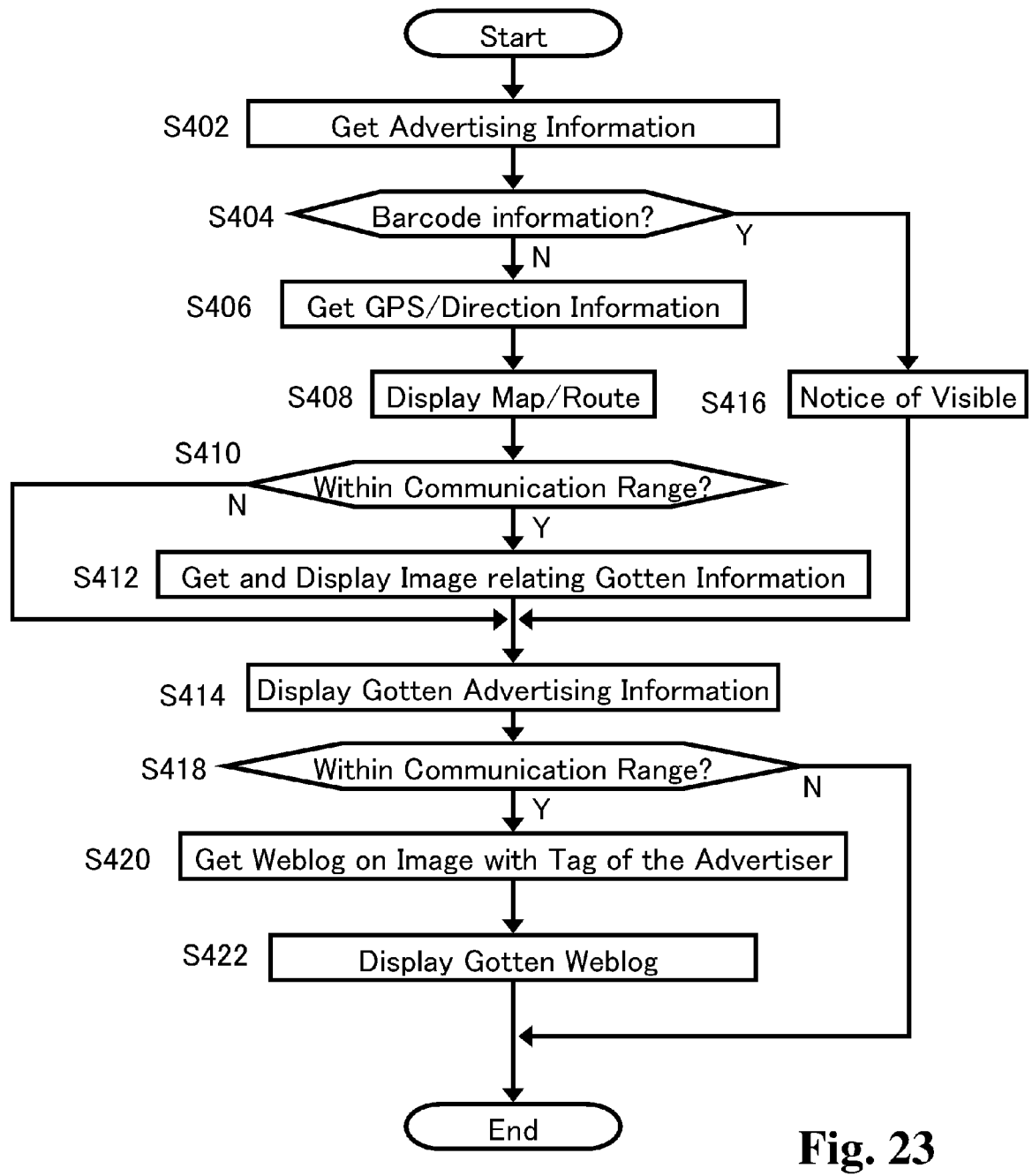
FIG. 23 is a flow chart of the function of camera controller of the first digital camera relating to advertisement.

FIG. 23 is a flow chart of the function of camera controller 31 of the first digital camera 1 relating to advertisement. The flow of FIG. 23 relates to the function for treating advertisement to be affixed to the image as the tag in the advertisement utilizing process in FIG. 19 or Weblog input in relation to the image. The information to be treated by the flow of FIG. 23 is mainly the advertising information relating to tag affixed by others or of the Weblog input by others in relation to the image.

The flow of FIG. 23 automatically starts when the first digital camera 1 comes into the communication range of the advertiser such as a shop with the first digital camera 1 is set into a condition of accepting the advertisement. Or, the flow also automatically starts when the bar code advertisement is read by image taking portion 33 of the first digital camera 1. If the first digital camera in the photo taking mode is set into a condition of accepting the advertisement, advertisement image is displayed on auxiliary window 93 of display 40 of FIG. 7 as well as video image 91. Also, in the playback mode of FIG. 5, advertisement image is displayed at the position corresponding to auxiliary window 93 of display 40 in FIG. 7 as well as display image 71.

If the flow automatically starts in the above manner, step S402 gets the advertisement information by way of one or both of local wireless communicator 39 or image taking portion 33 reading barcodes. The gotten advertising information includes a shop name tag to be affixed to the image data. Next in step S404, it is checked whether or not the gotten information includes barcode information.

If it is not detected in step S404 that gotten information includes barcode information, the information is considered to be gotten only through local wireless communicator 39, which can receive an advertisement of the neighboring shop not necessarily in the vision of the first user in contrast that a barcode would be gotten form the image of the shop which the first user is actually watching. So, the flow goes to step S406 to get information through GPS and direction sensor 44. Next, in step S408, the positions of and relative relationship between the advertise shop and the first user are determined on the basis of the information gotten in steps S402 and S406 to display the map and route for the first user to get to the shop.

The next step S410 checks whether of not the first digital camera 1 is within the communication range of a wireless access point. It is normally expected that the advertising shop sending the advertising information through its own wireless communication system is also a general wireless access point capable of wireless communication through Internet. However, the check in step S410 is necessary since the advertiser is not necessarily serving as such a general wireless access point but a local wireless communication system capable of sending the advertising information only.

If it is detected in step S410 that the first digital camera 1 is within the communication range of a wireless access point, the flow advances to step S412 to search though Internet an image to which a tag identical with the tag sent form the advertising shop is affixed. And, if any, the first digital camera 1 displays the image on display 40. Thus, not only the advertising information directly sent from the advertising shop, but also relating image searched through Internet is gotten, which makes it easier for the first user to find the shop. The flow then advances to step S414.

On the contrary, if it is not detected in step S410 that the first digital camera 1 is within the communication range of a wireless access point, the flow directly goes to step S414. By the way, if it is detected in step S404 that the gotten information includes barcode information, the flow goes to step S416 since it means that the first user is in front of to the advertising shop and trains the first digital camera 1 on it. In step S404, accordingly, the first digital camera makes a notice on display 40 or an announce to inform the first user that the advertising shop is visible in front of the first user, the flow then going to step S414. In this case, the steps for map and route or image display relating to the shop are skipped since they are not necessary.

In step S414, the advertising information gotten in step S402 is displayed on display 40. The advertising information is created by the advertiser such as a shop itself on its own position. The flow then goes to step 418 to check whether or not the first digital camera 1 is within the communication range of any of wireless access points.

If within the communication range, the flow advances to step S420 to jump to URL for Weblog input on the image to which the tag relating to the shop such as its name is affixed. The gotten Weblog is displayed on display 40 in step 422, the flow then going to the end. The displayed Weblog may include introductions or recommendations or impression of the shop input by customers visiting the chop, which seem toward the shop. The Weblog is updated by the general public on a daily basis, which may include sincere criticisms against the shop. But, it is the shop itself to have all the responsibility of the contents of Weblog. In other words, the attractiveness of the shop itself finally controls the contents of Weblog, which is more powerful advertisement than that prepared by the shop by itself.

Steps S418 to S422 are not only function succeeding step S414 but also can function more generally. In other words, in FIG. 23, Steps S418 to S422 are triggered by a receipt of the shop name tag gotten by way of one or both of local wireless communicator 39 or image taking portion 33 when the first user actually visits the neighborhood of the shop. However, steps S418 to S422 can be generally triggered when the shop name tag is gotten in any way including a case that the tag is hit through a search through Internet on the basis of some keyword relating to area or category of business. Thus, the first user can read the Weblog on the shop even if he or she does not actually visit the neighborhood of the shop. In other words, such Weblog can serve as a good traveler's book on an occasion of planning a travel at home.

The above described embodiments relate to the system including digital cameras such as the first digital camera 1 and second digital camera 2 each having local wireless communicator 39. However, the present invention is not limited to such a system, but is applicable to a system including mobile phones each with digital camera such as the first digital camera 1 built-in. One embodiment in this case is to simply integrate mobile phone with the first digital camera 1, the function of which can be easily understood in accordance with the explanation above for the first and second embodiments.

In such an integrated embodiment is advantageous in functional cooperation between the first digital camera 1 and the mobile phone, especially the functions of steps lead by S226 in FIG. 16. In other words, there is no necessity of connecting the first digital camera 1 to the mobile phone with cable or local wireless communication system in case a necessity of connecting Internet by way of the mobile phone caused due to the first digital camera 1 going out of communication range of the wireless access point. This is because that the first digital camera 1 and the mobile phone are in communication with each other every time as an integral device.

Another embodiment is to integrate mobile phone with the first digital camera 1 with such a modification made that the access to Internet by way of wireless access point is replaced by that by way of phone line regardless of whether or not the integrated device is within the communication range of a wireless access point. In other words, the local wireless communicator 39 does not communicate with Internet, but receives only local information such as notable site tag or advertising tag. In such a modified embodiment, the functions of the local wireless communicator 39 through Internet in the description of the first and second embodiments are understood as the functions of the phone line communicator of the mobile phone.

As is apparent from the above, "digital camera" generally means not only a digital camera separated form mobile phone, but also mobile phone integrated with the digital camera unless the description is specially directed to only one of them with clear identification.

What is claimed is:

1. A digital camera having communication function comprising:
   an image taking portion arranged to capture an image of a picture;
   a wireless communicator arranged to send digital image data derived from the image taking portion to outside of the digital camera and to receive digital image data from outside of the digital camera;
   a display arranged to display digital image data;
   an image storage portion arranged to store digital image data derived from the image taking portion and digital image data received through the wireless communicator, wherein the digital image data stored in the image storage includes full size image data depending on the image taking portion, whose size is greatest among a plurality of sizes of images for the picture, display image data whose size is in a satisfactory quality for viewing the picture on full display, and is smaller than the full size image data among the plurality of sizes of images for the same picture, and thumbnail data whose size is in an insufficient quality, which is lower than the satisfactory quality, for viewing on the full display and utilized to designate the picture to be viewed on the full display in place of the thumbnail display; and
   a storage controller arranged so that at least part of the full size image data, which has been already sent to the outside of the digital camera as a backup and remains in the image storage portion of the digital camera, is deleted from the image storage portion before the display image data is deleted if new digital image data is to be stored in the image storage portion for keeping the display image data for the satisfactory viewing on the full display without the necessity of retrieving the full size image data for the same picture from the outside even if the full size image data has been deleted from the image storage portion.

2. The digital camera according to claim 1, wherein the storage controller is arranged to allow the display image data to be replaced with the new digital image data when a condition is satisfied.

3. The digital camera according to claim 1, wherein the new digital image data includes one of digital image data derived from the image taking portion and digital image data received through the wireless communicator.

4. The digital camera according to claim 1, wherein the storage controller is arranged to treat the digital image data received through the wireless communicator in the same manner as the digital image data derived from the image taking portion.

5. The digital camera according to claim 1 further comprising a display controller arranged to treat the digital image data received through the wireless communicator in the same manner as the digital image data retrieved from the image storage portion, whereby the display with the wireless communicator effective is equal to the display with the wireless communicator ineffective.

6. The digital camera according to claim 1 further comprising a capacity indicator arranged to indicate information relating to a room for the image storage portion to store new digital image data, wherein the capacity indicator is arranged to make an indication if an extra room for the new digital image data can be secured by replacing the stored display image data.

7. The digital camera according to claim 1, further comprising a search key affixing controller arranged to affix a search key to the digital image data as an attribute thereof and a search key indication controller arranged to indicate, on the display in a comparative manner, the affixed search key and a received search key received through the wireless communication, wherein the received search key includes a search key related to the affixed search key and the affixed search key itself if any.

8. A digital camera having communication function comprising:
   an image taking portion arranged to capture an image of a picture;
   a wireless communicator arranged to send digital image data derived from the image taking portion to an outside server and to receive digital image data from the outside server;
   a display arranged to display digital image data;
   an image storage portion arranged to store digital image data derived from the image taking portion and digital image data received through the wireless communicator;
   a storage controller arranged to control the digital image data in the image storage portion in relation to the sending and receiving of the digital image data through the wireless communicator;
   a search key affixing controller arranged to affix a search key to the image data of the picture to be sent to the outside server as an attribute of the sent image data;
   a key controller arranged to send the affixed search key to an outside server on Internet through the wireless communicator to have the outside server automatically pick up related search keys among search keys preexisting in the outside server on the basis of the affixed search key, and arranged to receive the related search keys from the outside server through the wireless communicator; and
   a search key indication controller arranged to indicate, on the display in a comparative manner, the affixed search key and the related search keys received from the outside server wherein the related search keys include the affixed search key itself if the affixed search key has been preexisting in the outside server.

9. The digital camera according to claim 8, wherein the search key indication controller is arranged to indicate on the display a search key which is in common between the affixed search key and the received search key.

10. The digital camera according to claim 8, wherein the search key affixing controller is arranged to copy one of the received search keys as a new affixing search key.

11. The digital camera according to claim 8 further comprising a manual operating portion, wherein the search key affixing controller is responsive to the manual operating portion in affixing the search key.

12. The digital camera according to claim 8, wherein the search key affixing controller is arranged to automatically affix the received search key received through the wireless communicator.

13. The digital camera according to claim 8 further comprising a search controller arranged to send the search key to an outside server on Internet through the wireless communicator to have the outside server carry out the search on the sent search key, wherein the search controller is further arranged to receive a search key from an entity located near the digital camera through the wireless communicator and send the search key to the outside server on Internet through the wireless communicator.

14. A digital camera having communication function comprising:

an image taking portion arranged to capture an image of a picture;

a wireless communicator arranged to send digital image data derived from the image taking portion to outside of the digital camera and to receive digital image data from outside of the digital camera;

a display arranged to display digital image data;

an image storage portion arranged to store digital image data derived from the image taking portion and digital image data received through the wireless communicator;

a storage controller arranged to control the digital image data in the image storage portion in relation to the sending and receiving of the digital image data through the wireless communicator;

a search controller, which is made capable of receiving a search key automatically originating from an outside entity when the digital camera comes close to the outside entity, so that the search key received from the outside entity is sent to an outside server on Internet through the wireless communicator to have the outside server carry out the search for information of the outside entity on the sent search key, wherein the outside entity is independent from the digital camera and separated from the outside server; and a search result controller arranged to receive a search result from the outside server through the wireless communicator for displaying the received search result about the outside entity on the display.

15. The digital camera according to claim 14, wherein the search result includes digital image data relating to the outside entity.

16. The digital camera according to claim 14, wherein the search result includes Weblog relating to the outside entity.

17. The digital camera according to claim 14, wherein the outside entity includes an advertiser, and wherein the search result includes advertisement of the advertiser.

18. The digital camera according to claim 14, wherein the outside entity includes a notable site, and wherein the search result includes digital image data of photographs of the notable site taken by others, which is of some help of taking a new photograph of the same notable site.

19. The digital camera according to claim 14, wherein the search controller is arranged to receive the search key by means of one of wireless communication and optical barcode reading when the digital camera comes close to the outside entity.

* * * * *